(12) United States Patent
Kwon

(10) Patent No.: US 12,388,918 B2
(45) Date of Patent: Aug. 12, 2025

(54) FOLDABLE MOBILE PHONE

(71) Applicant: Sang Chul Kwon, Annandale, VA (US)

(72) Inventor: Sang Chul Kwon, Annandale, VA (US)

( * ) Notice: Subject to any disclaimer, the term of this patent is extended or adjusted under 35 U.S.C. 154(b) by 366 days.

(21) Appl. No.: 18/123,250

(22) Filed: Mar. 17, 2023

(65) Prior Publication Data

US 2023/0247120 A1 Aug. 3, 2023

Related U.S. Application Data

(63) Continuation of application No. 17/362,971, filed on Jun. 29, 2021, now Pat. No. 11,616,867, which is a continuation of application No. PCT/US2019/069016, filed on Dec. 30, 2019.

(60) Provisional application No. 62/806,558, filed on Feb. 15, 2019, provisional application No. 62/786,540, filed on Dec. 30, 2018.

(51) Int. Cl.
| | | |
|---|---|---|
| *H04B 1/38* | (2015.01) | |
| *H04M 1/02* | (2006.01) | |
| *H04M 1/72454* | (2021.01) | |

(52) U.S. Cl.
CPC ....... *H04M 1/0243* (2013.01); *H04M 1/0216* (2013.01); *H04M 1/72454* (2021.01)

(58) Field of Classification Search
CPC ............. H04M 1/0214; H04M 1/0216; H04M 1/0222; H04M 1/0243; H04M 1/0268
See application file for complete search history.

(56) References Cited

U.S. PATENT DOCUMENTS

| | | | |
|---|---|---|---|
| 8,229,500 B2 | 7/2012 | Joo | |
| 9,619,061 B2 | 4/2017 | Lee et al. | |
| 10,534,534 B2 * | 1/2020 | Cheong | G06F 1/1616 |
| 11,360,001 B2 | 6/2022 | West | |
| 2010/0138680 A1 | 6/2010 | Brisebois | |
| 2013/0021491 A1 | 1/2013 | Lee et al. | |
| 2014/0218321 A1 * | 8/2014 | Lee | G06F 1/1652 |
| | | | 345/173 |
| 2014/0342781 A1 | 11/2014 | Sakurazawa | |
| 2015/0153171 A1 | 6/2015 | Zhou et al. | |
| 2021/0173533 A1 | 6/2021 | Kim et al. | |
| 2021/0311683 A1 * | 10/2021 | Jin | G06F 3/013 |

FOREIGN PATENT DOCUMENTS

| | | |
|---|---|---|
| WO | WO2014/148688 A1 | 9/2014 |
| WO | WO2015034135 A1 | 3/2015 |

* cited by examiner

*Primary Examiner* — Tuan Pham
(74) *Attorney, Agent, or Firm* — Goldilocks ZONE IP LAW

(57) ABSTRACT

The invention relates to a method includes selecting a plurality of call-related icons on a first display in a folded state and switching the mobile phone to an open state, a screen of the second display is divided according to the number of call-related icons selected by the user, and each application corresponding to the selected call-related icon is displayed on the divided second display.

19 Claims, 55 Drawing Sheets

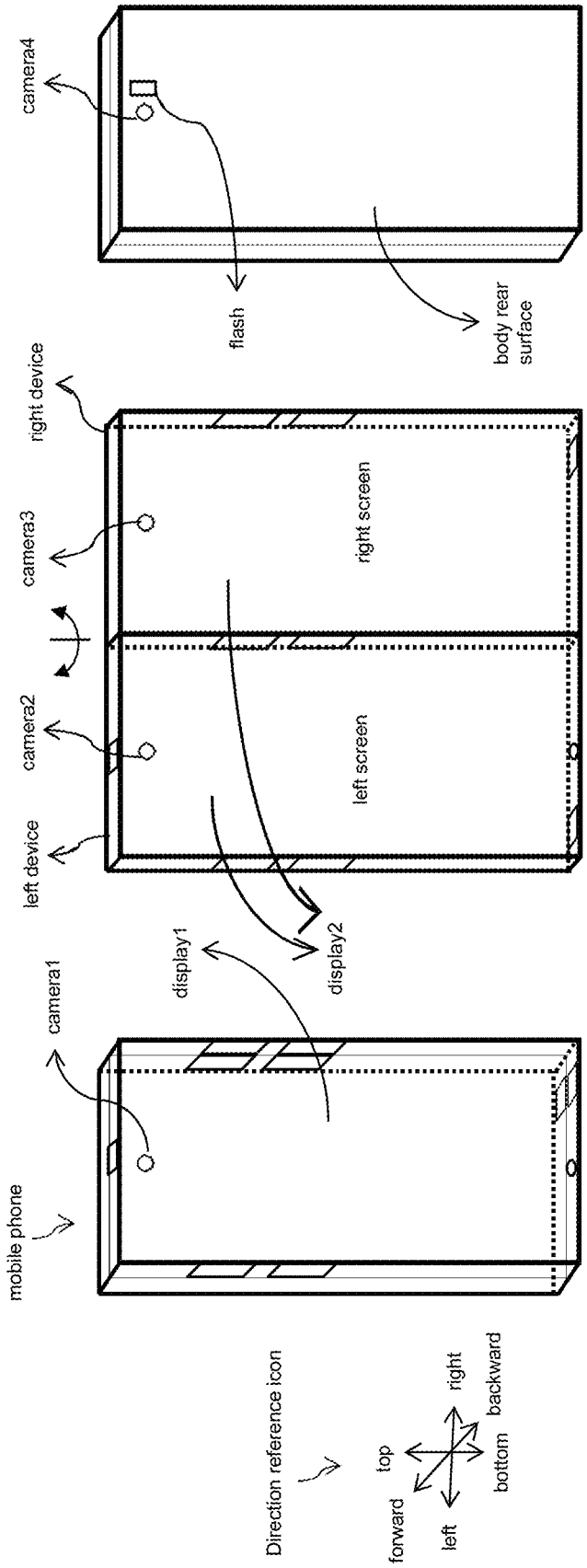

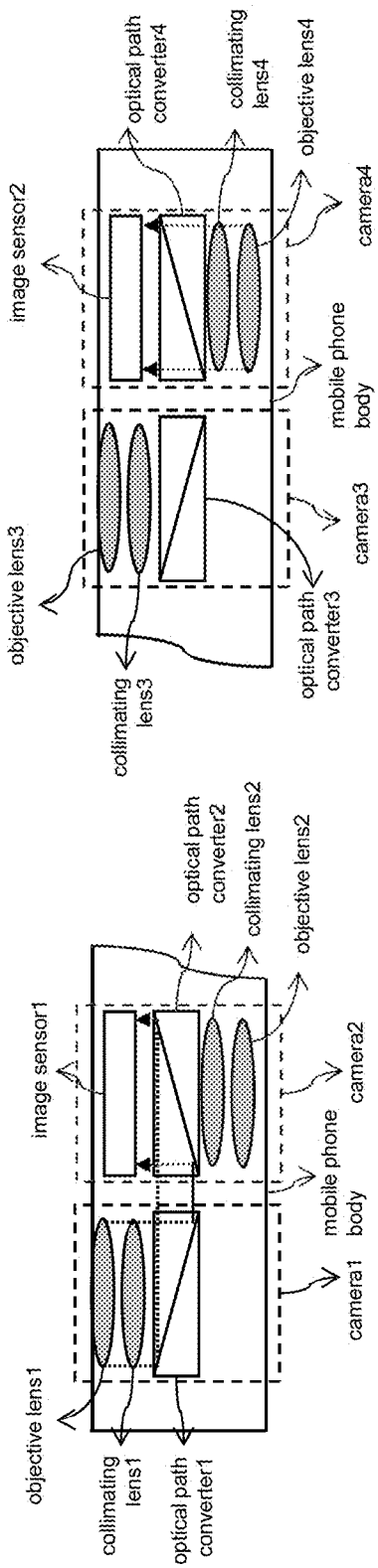
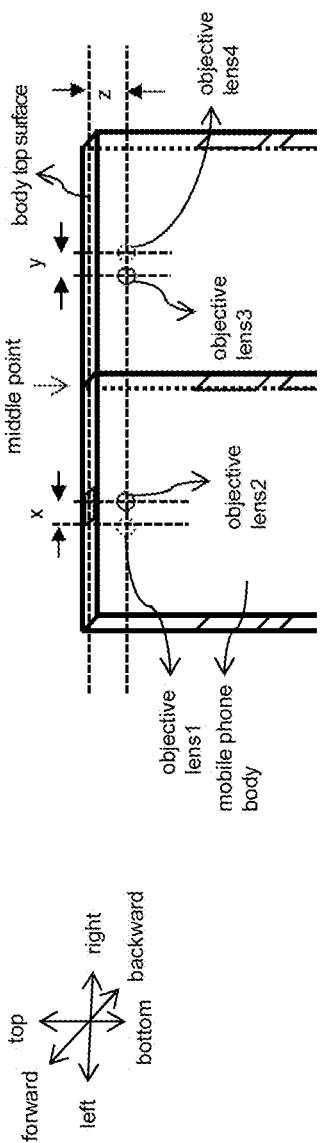
FIG. 2A
FIG. 2B
FIG. 2C

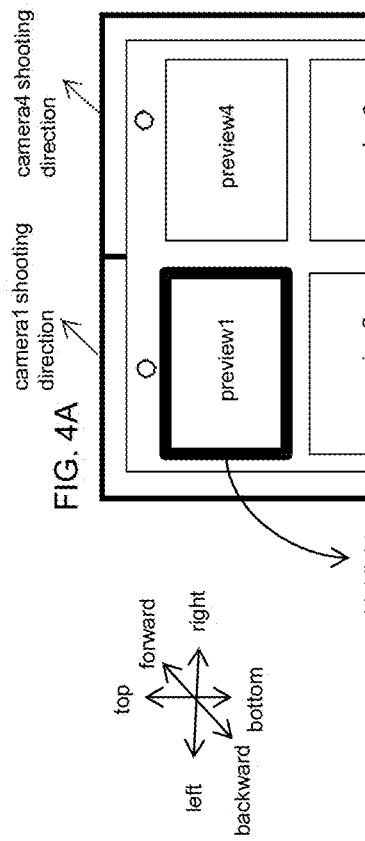
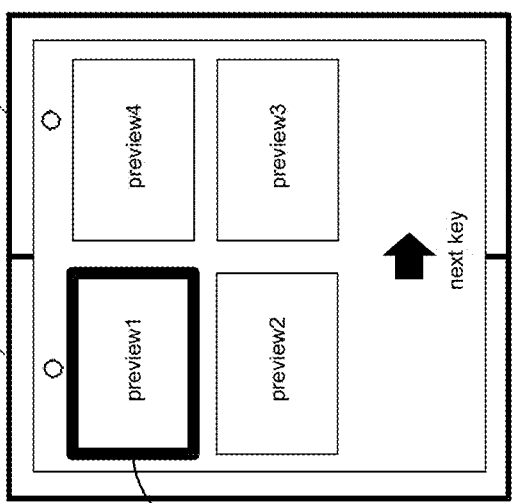
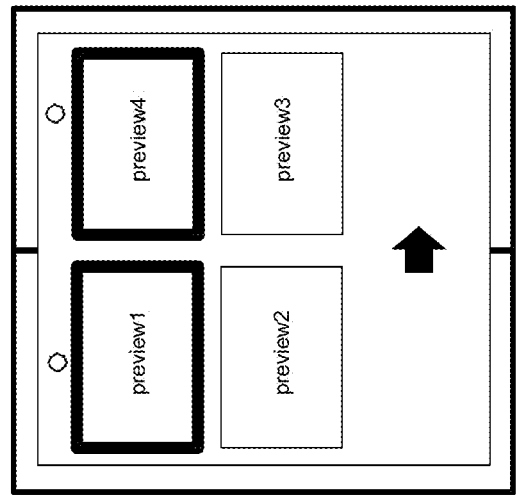
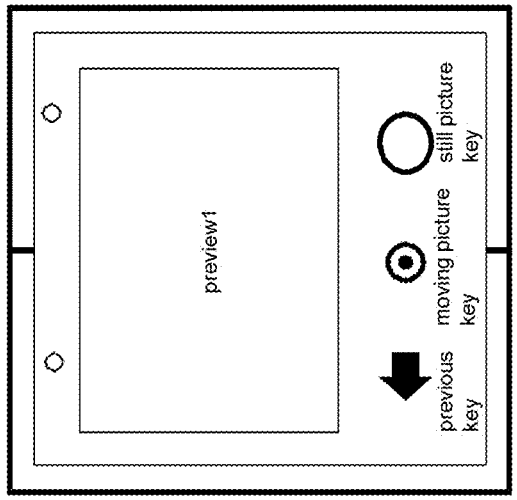
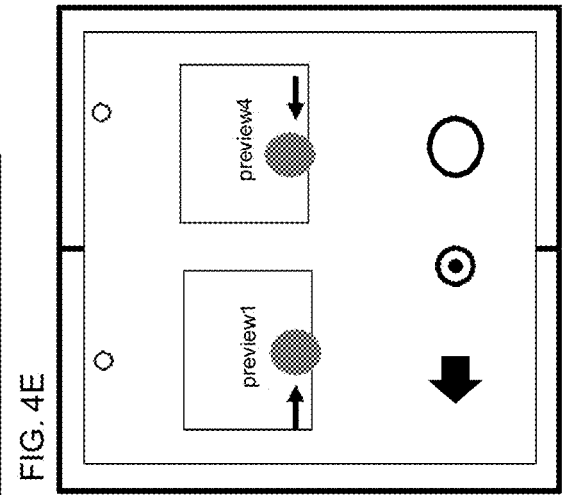

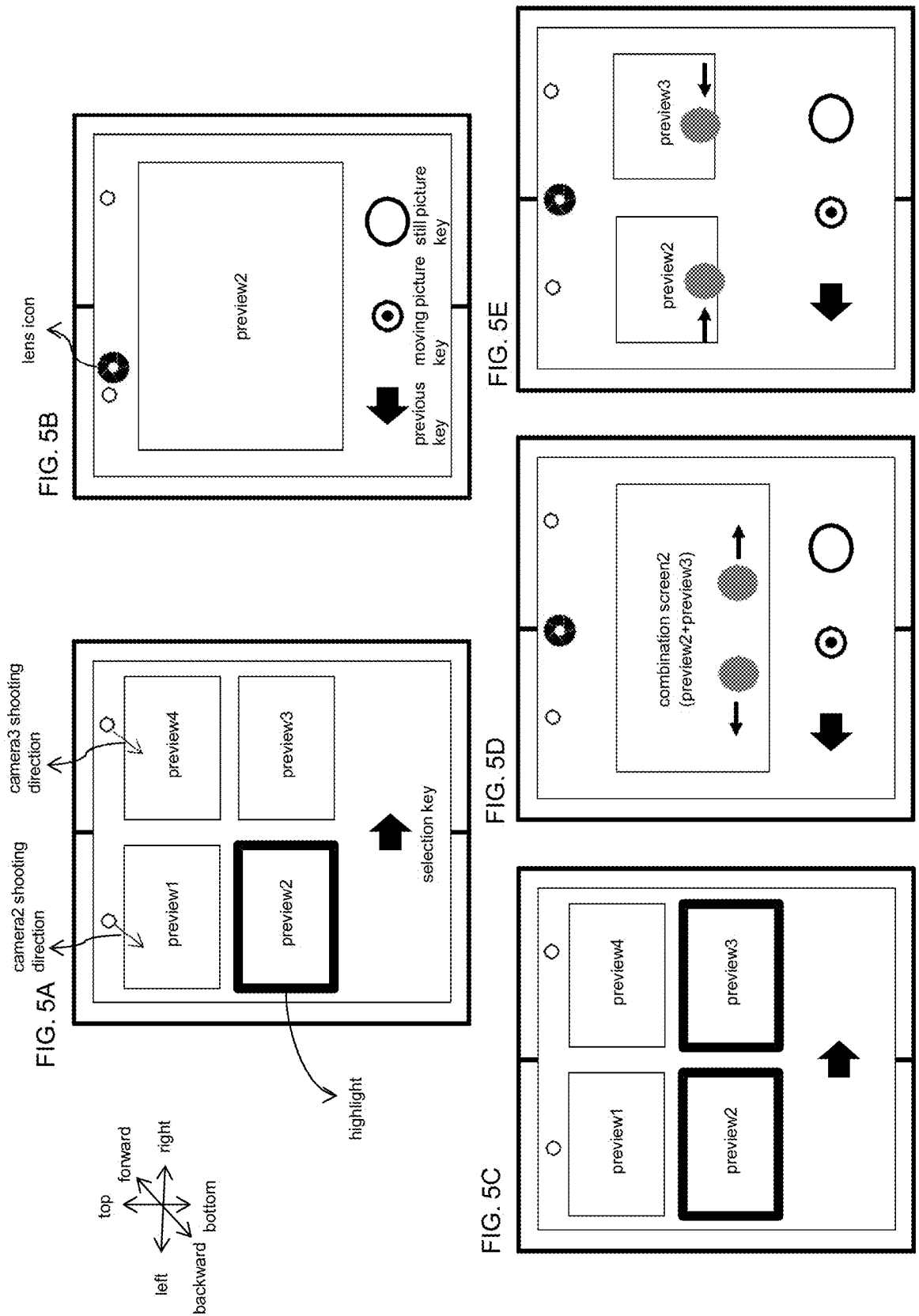

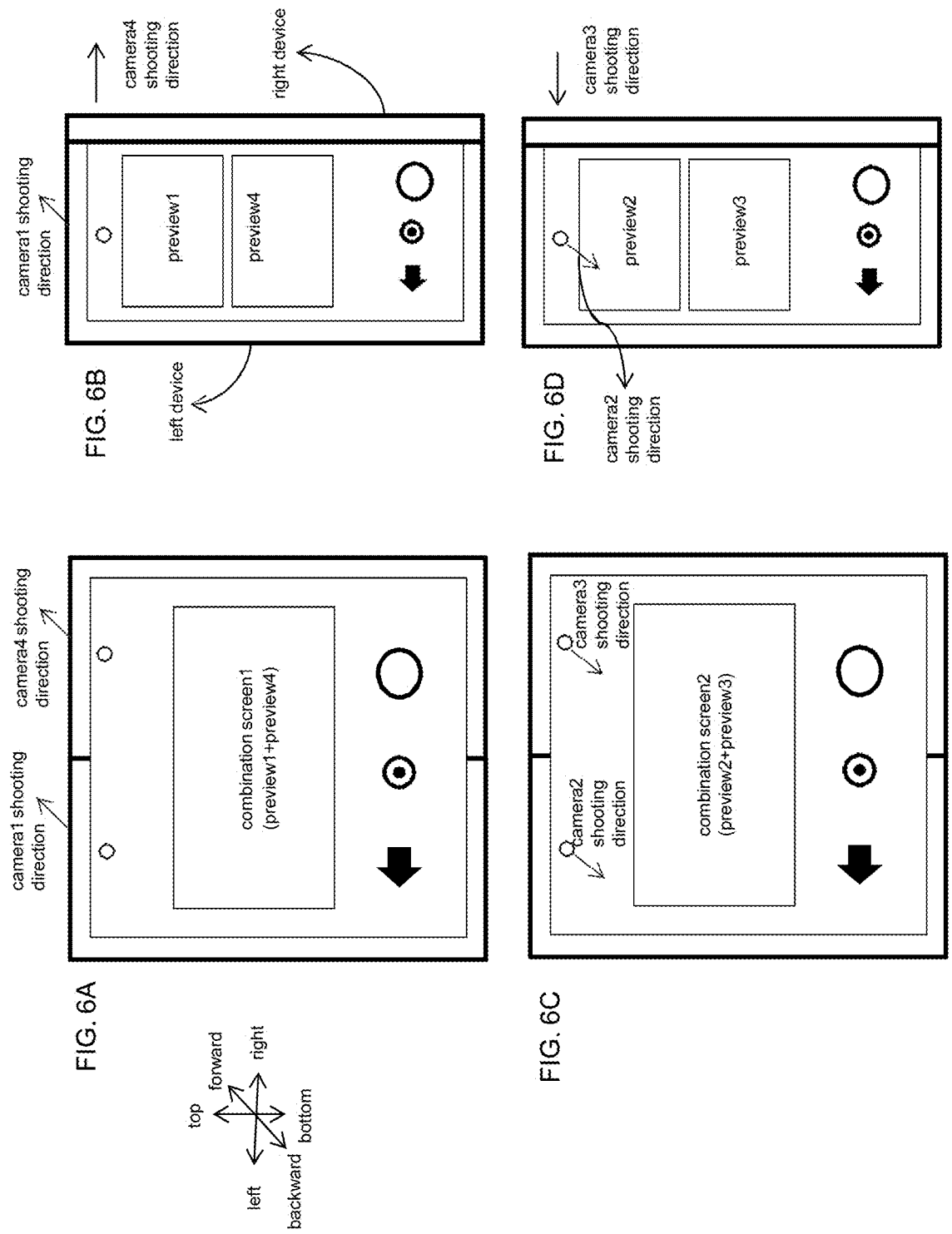

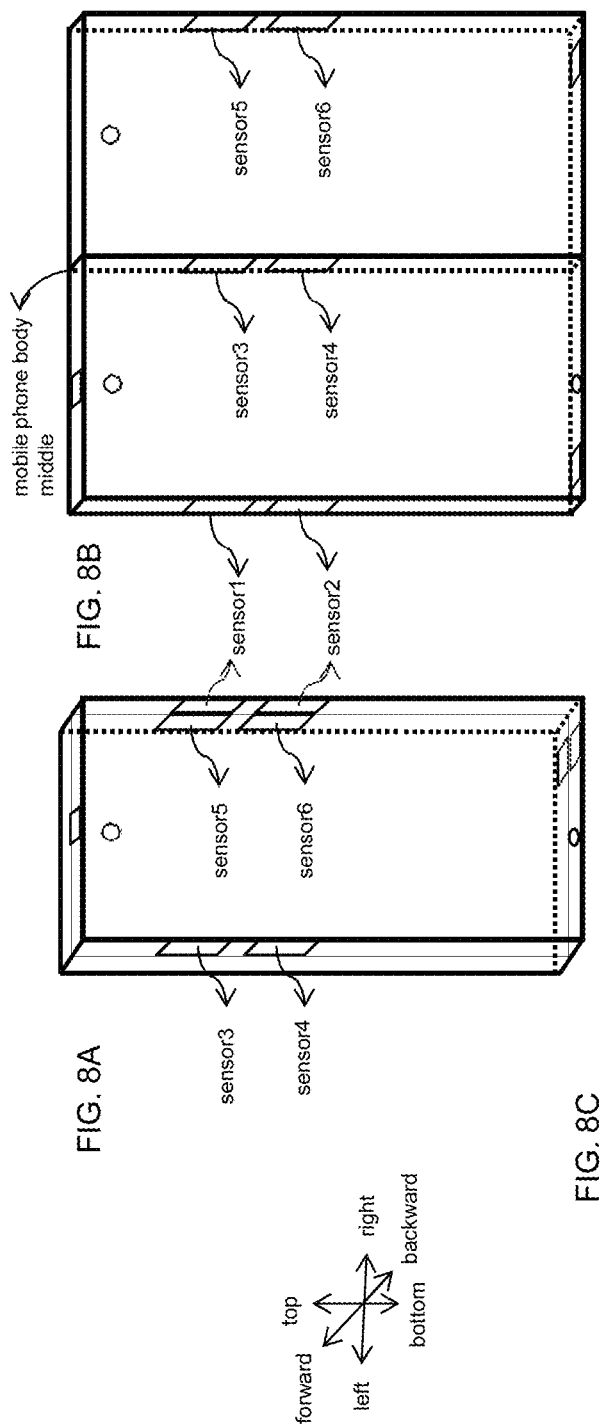

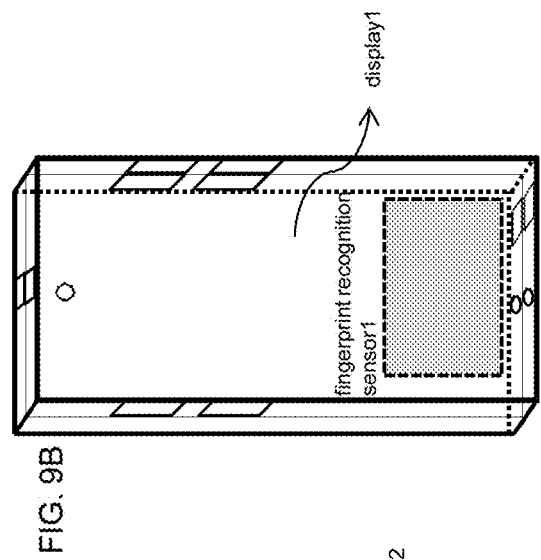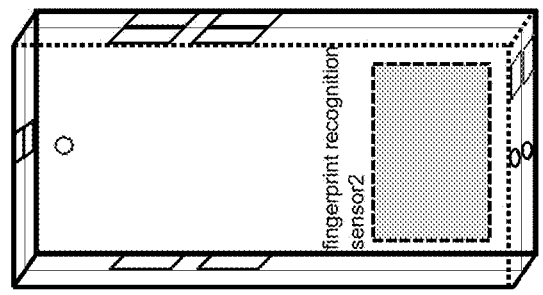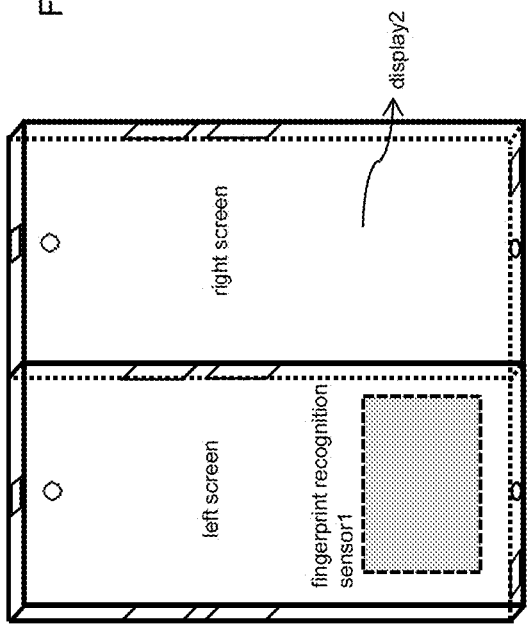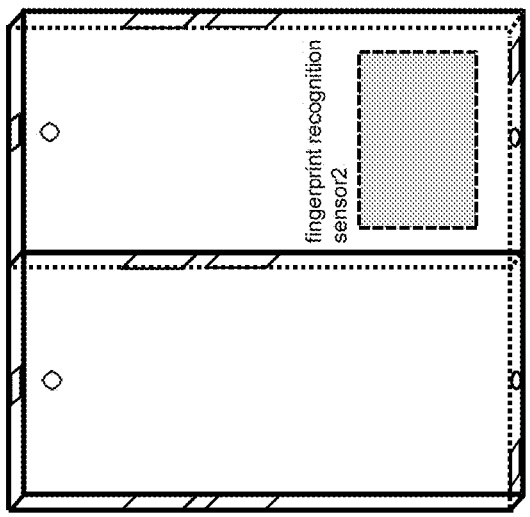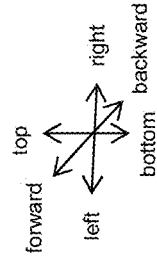

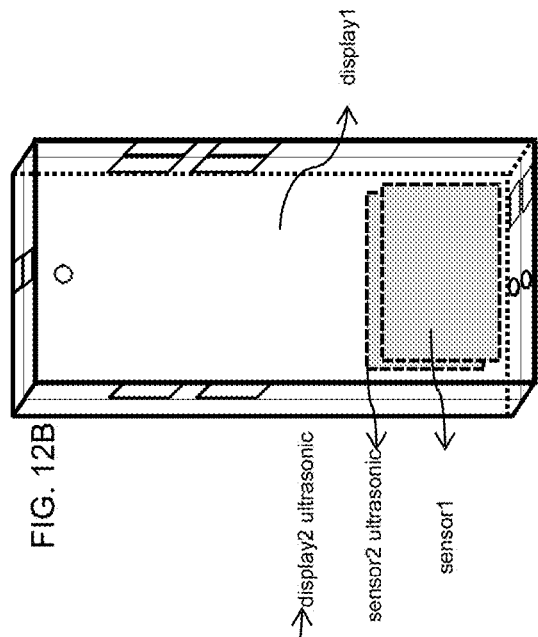
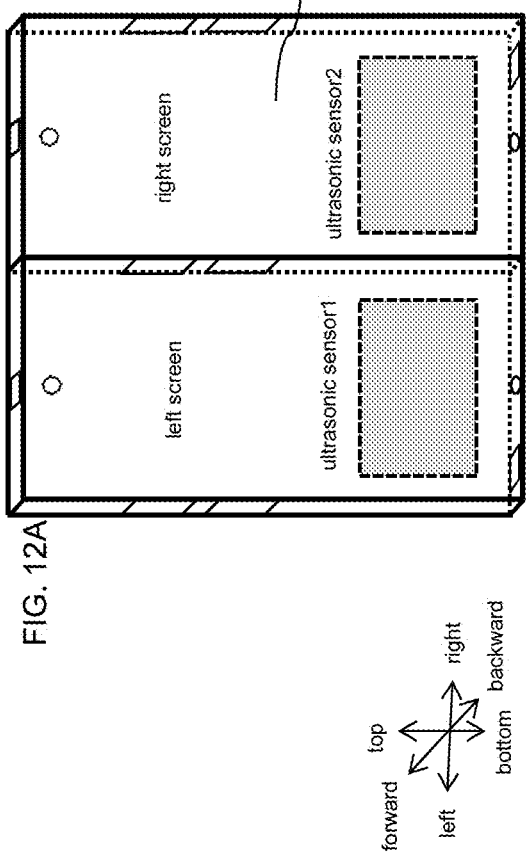
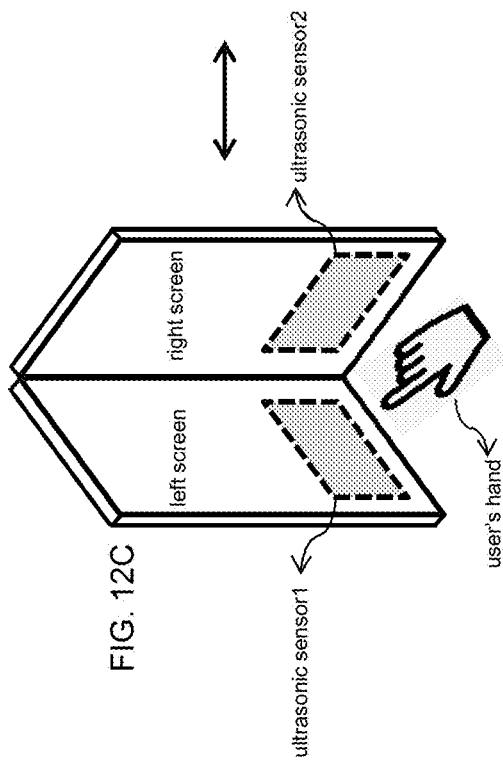

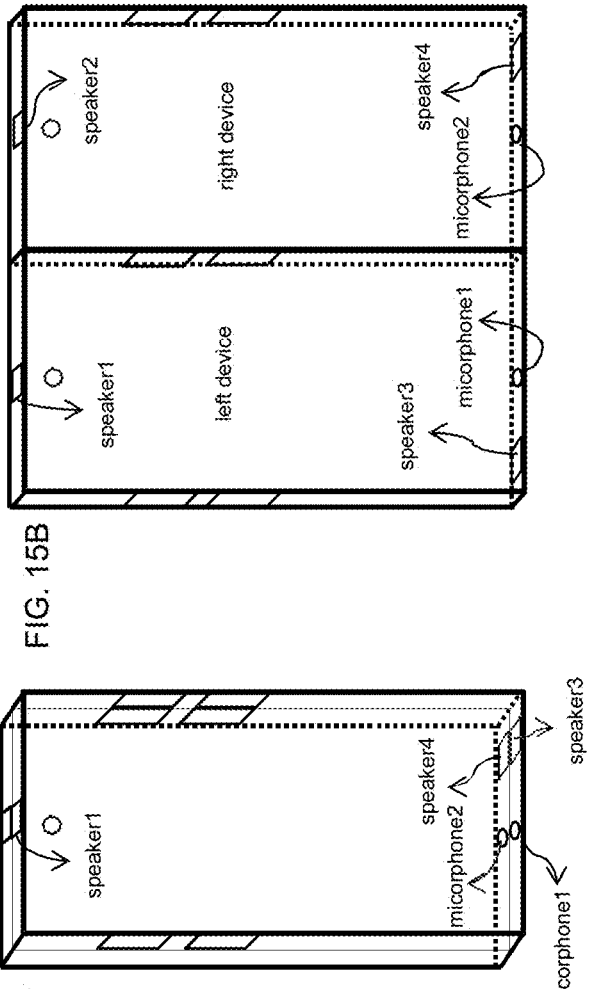

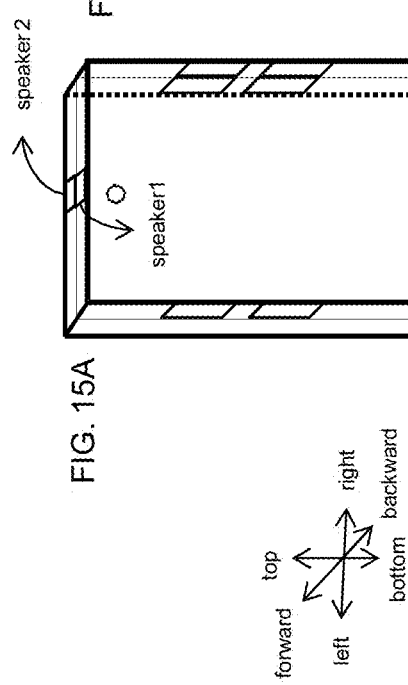

FIG. 15C

| devices | location | operation |
|---|---|---|
| speaker1 | Open state - left device/top/center<br>Folded state - backward device/top/center | call incoming sound output<br>call incoming sound output |
| speaker2 | Open state - right device/top/center<br>Folded state - forward device/top/center | call incoming sound output<br>inactive |
| speaker3 | Open state - left device/bottom/left side<br>Folded state - forward device/bottom/right side | multimedia audio output (Stereo-L)<br>multimedia audio output (Mono) |
| speaker4 | Open state - right device/bottom/right side<br>Folded state - backward device/bottom/right side | multimedia audio output (Stereo-R)<br>multimedia audio output (Mono) |
| microphone1 | Open state - left device/bottom/center<br>Folded state - backward device/bottom/center | call outgoing sound input<br>call outgoing sound input |
| microphone2 | Opening state - right device/bottom/center<br>Folded state - forward device/bottom/center | call outgoing sound input<br>call outgoing sound input | call rejection icon call reception icon play icon call end icon

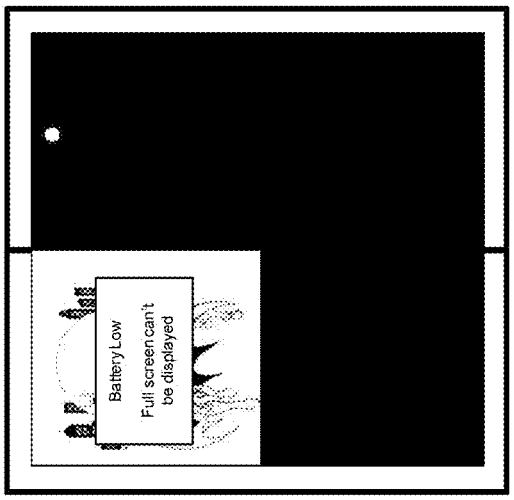
FIG. 21A  battery residual information
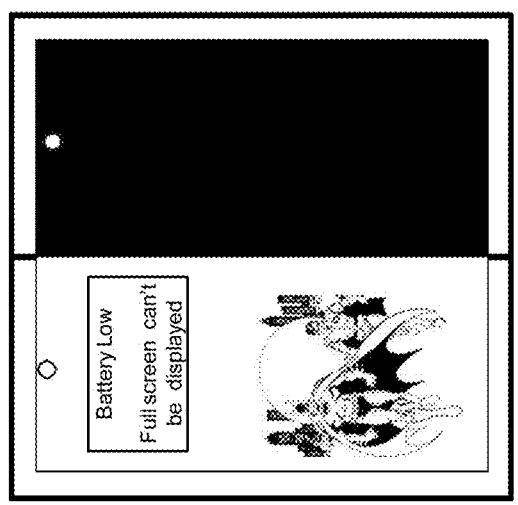
FIG. 21B
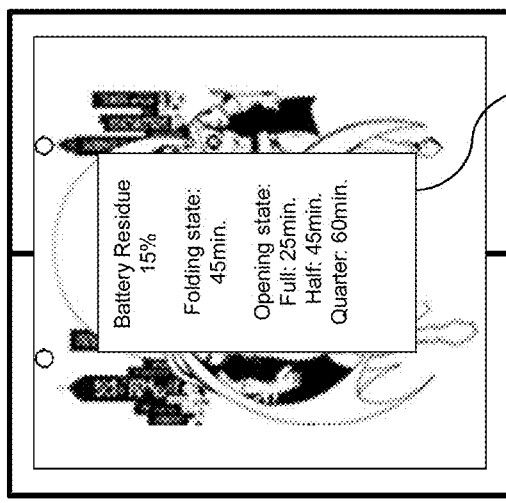
FIG. 21C
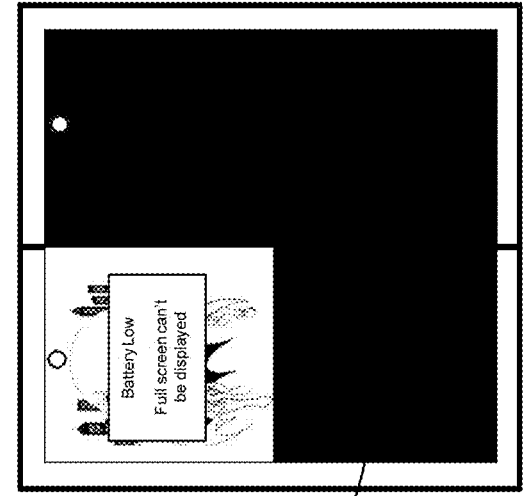
FIG. 21F
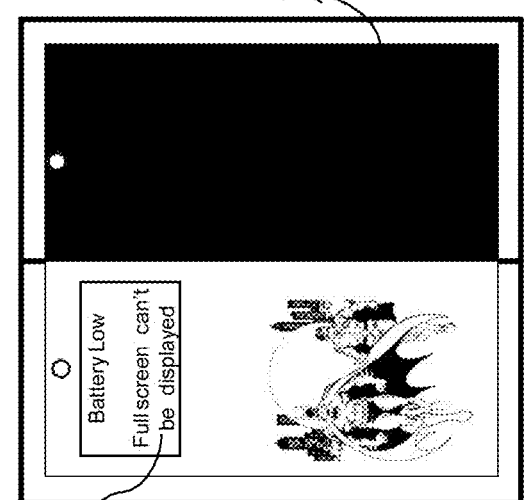
FIG. 21E
FIG. 21D

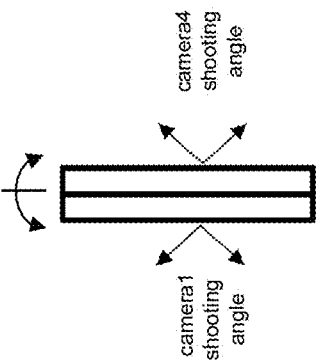
FIG. 34C
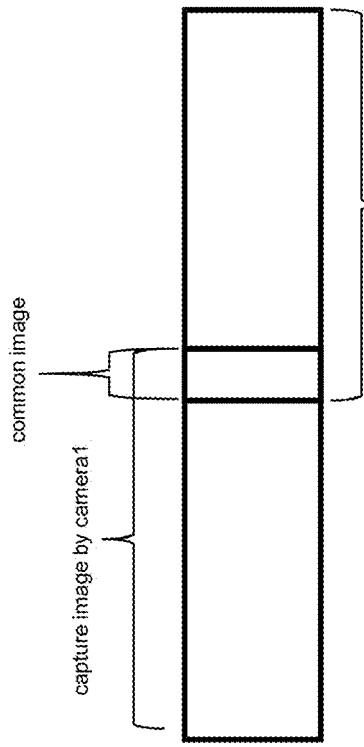
FIG. 34E
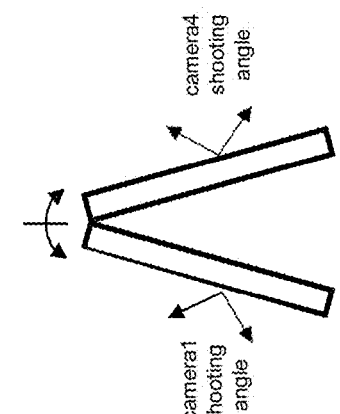
FIG. 34B
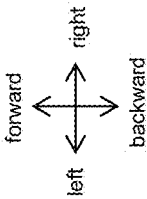
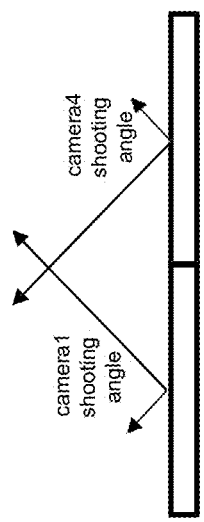
FIG. 34A
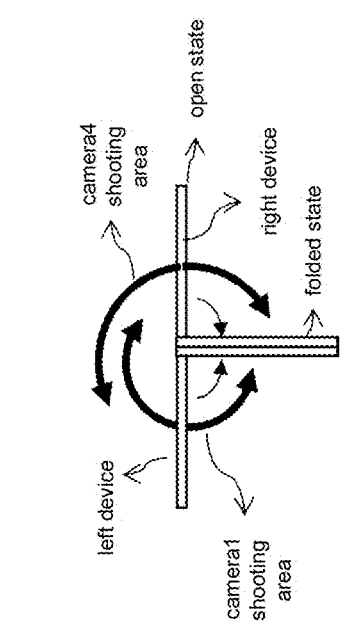
FIG. 34D

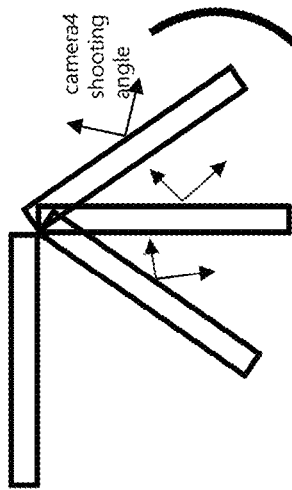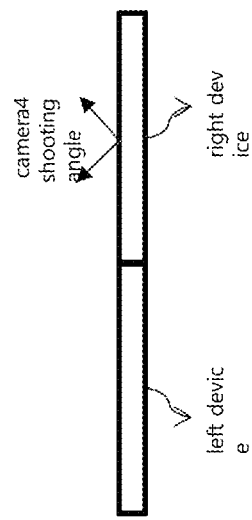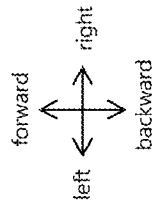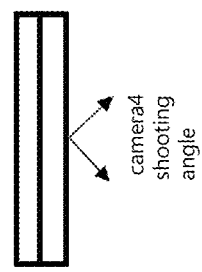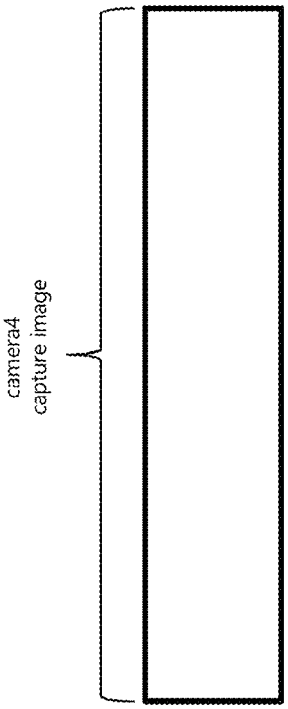

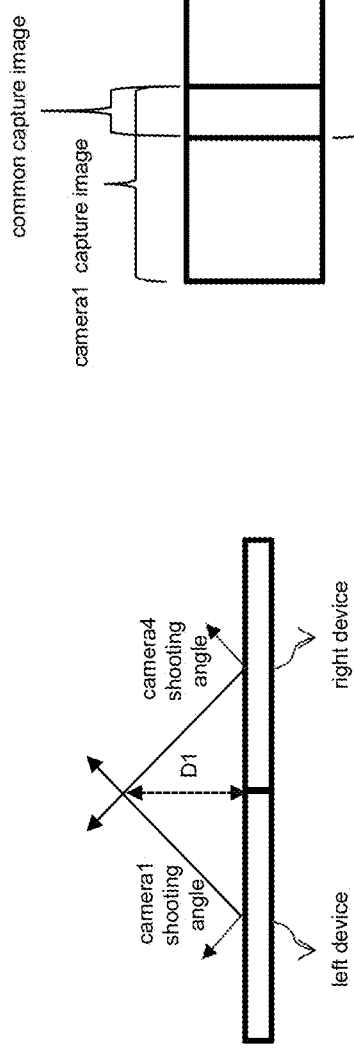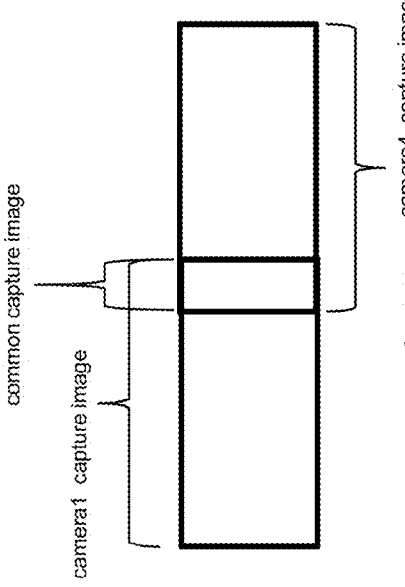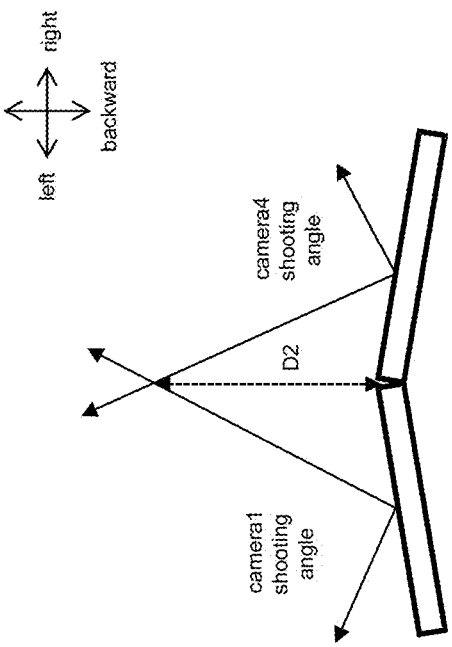
FIG. 38A
FIG. 38B
FIG. 38C
FIG. 38D

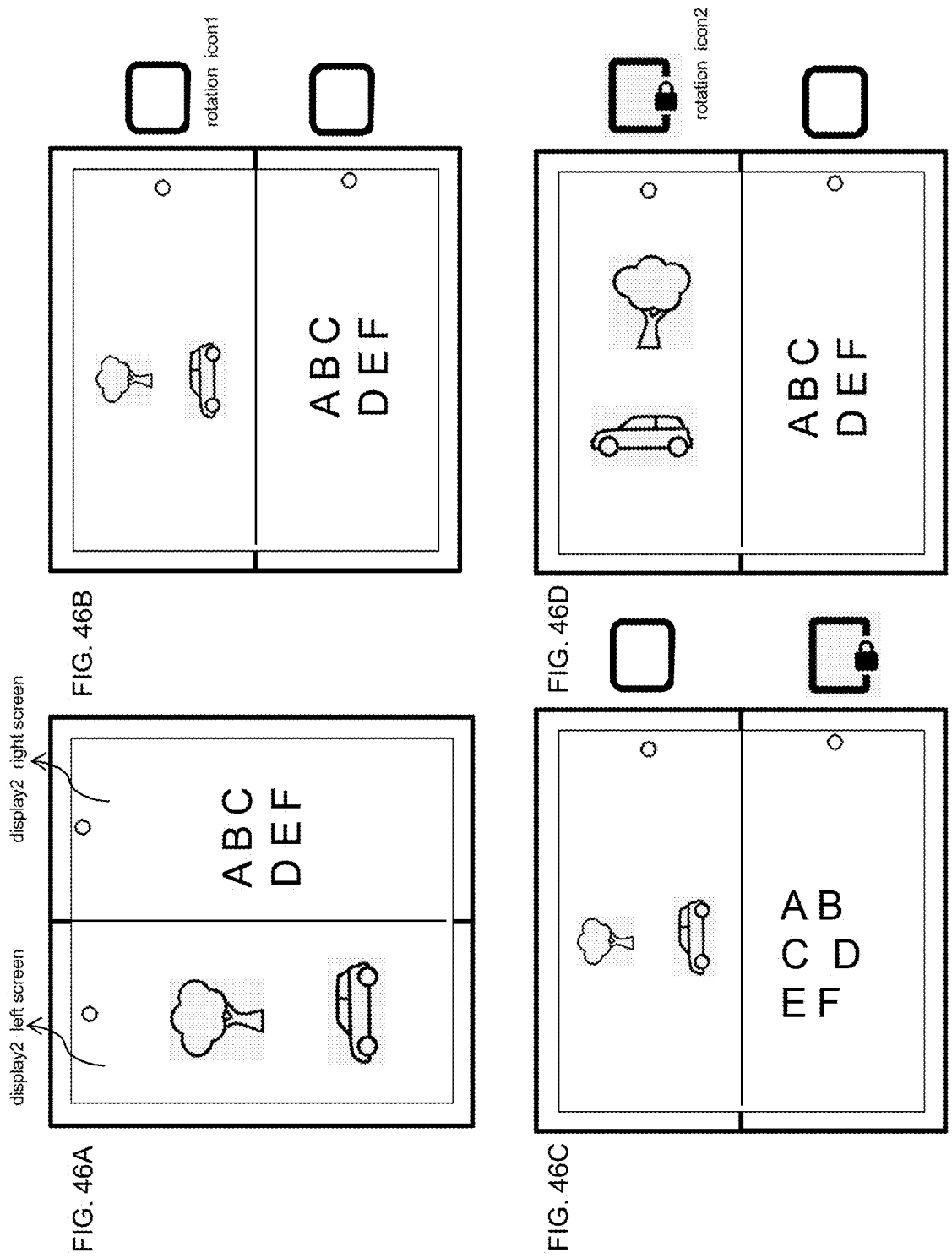

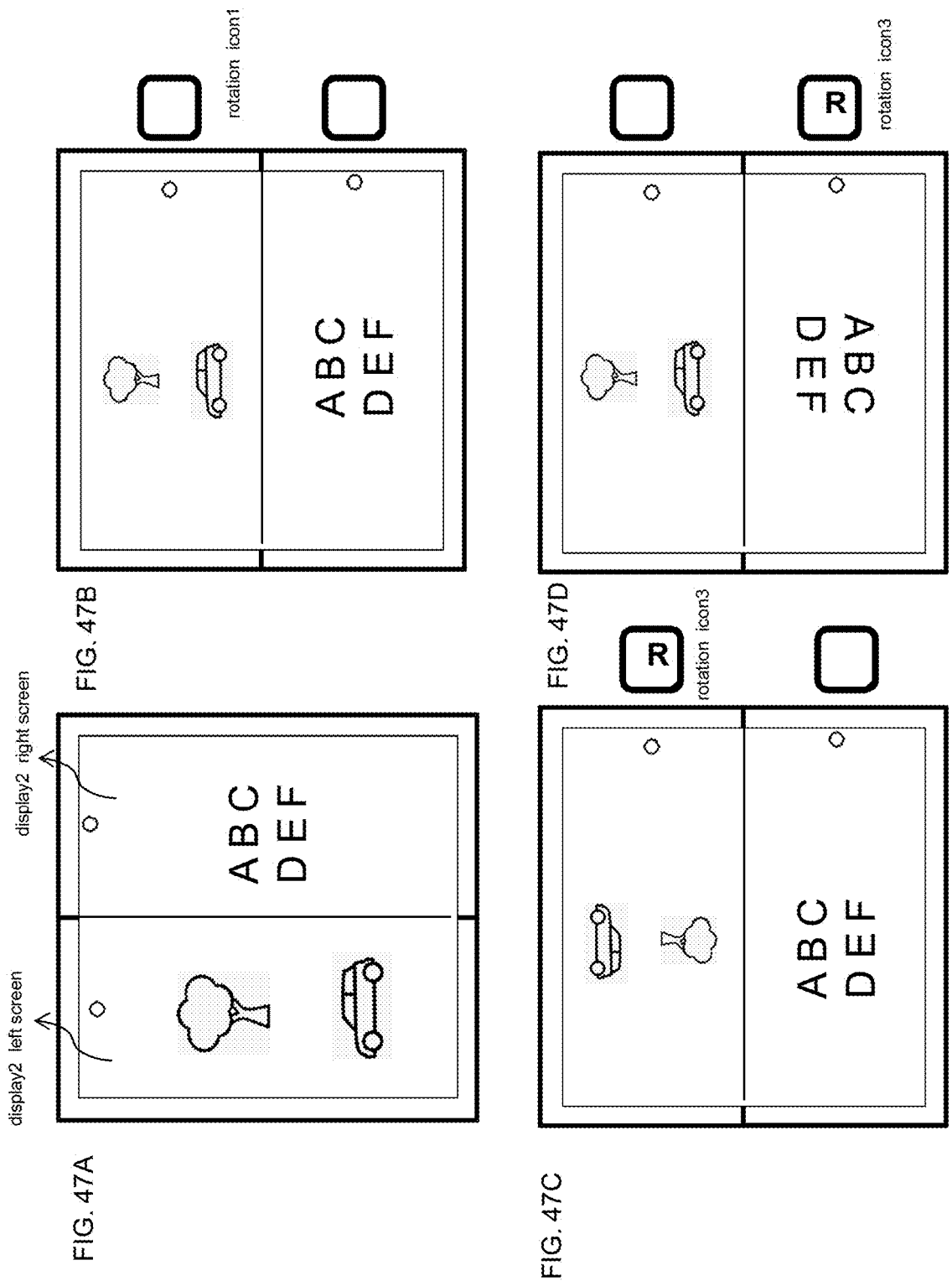

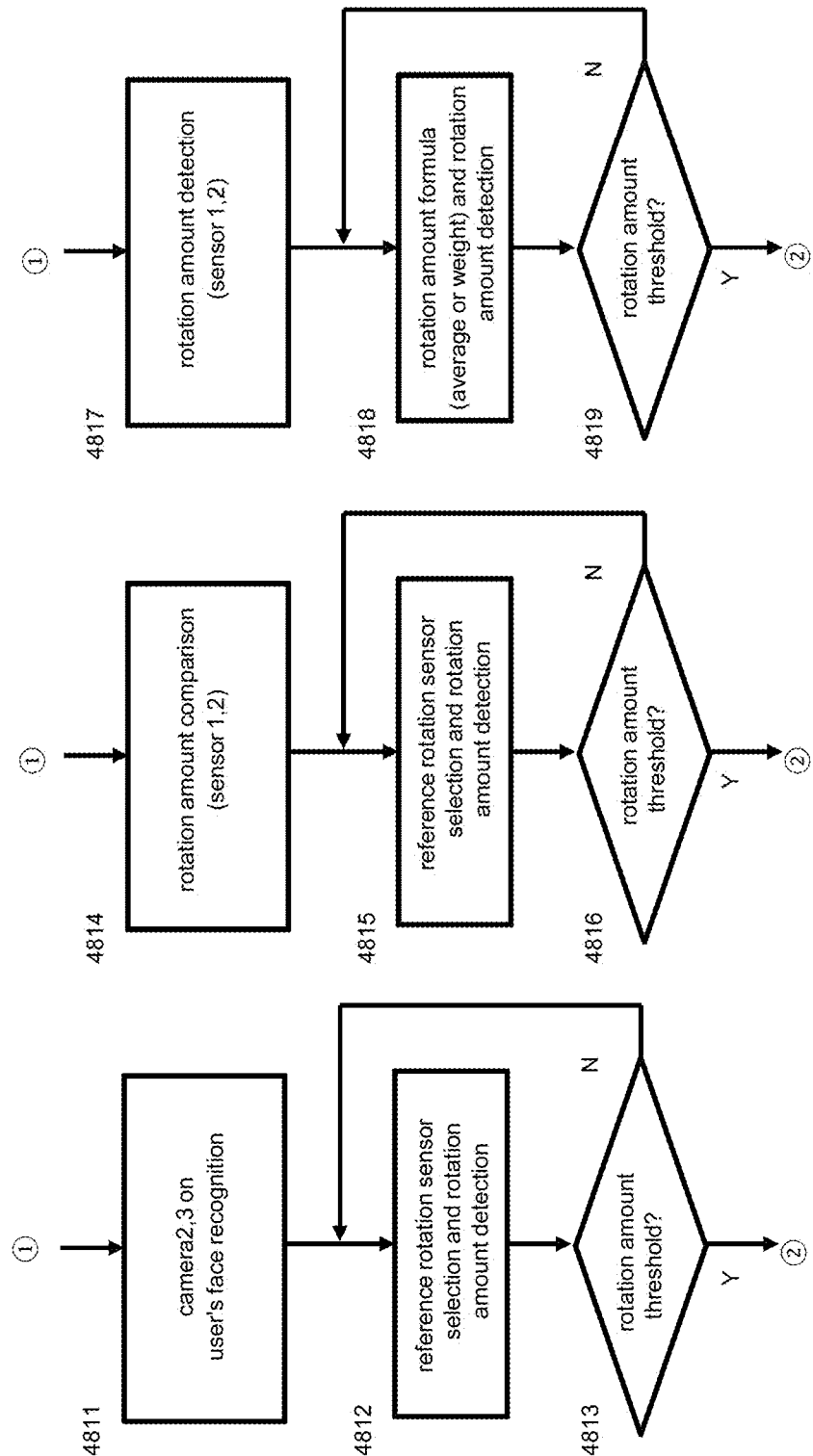

FIG. 50

Drawing Numerical Reference

| | | | | | | |
|---|---|---|---|---|---|---|
| mobile phone | 100 | next key | 166 | shooting angle of camera 1 | 232 | charging block | 298 |
| mobile phone body | 102 | previous key | 168 | shooting angle of camera 4 | 234 | camera block | 300 |
| body top surface | 104 | moving picture key | 170 | shooting area of camera 1 | 236 | external memory block | 302 |
| body rear surface | 106 | still picture key | 172 | shooting area of camera 4 | 238 | sensor block | 304 |
| camera 1 | 108 | memory | 174 | captured image of camera 1 | 240 | battery block | 306 |
| camera 2 | 110 | 3D object | 176 | captured image of camera 4 | 242 | speaker block | 308 |
| camera 3 | 112 | 3D image | 178 | common captured image | 244 | display device 1 | 310 |
| camera 4 | 114 | preview 1 | 180 | microphone 2 | 246 | display device 2 | 312 |
| display 1 | 116 | preview 2 | 182 | call reception icon | 248 | output device | 314 |
| display 2 | 118 | preview 3 | 184 | call rejectionl icon | 250 | input device | 316 |
| display 1 left screen | 120 | object 1 | 186 | call end icon | 252 | antenna | 318 |
| display 2 right screen | 122 | object 2 | 188 | call-related icon | 254 | ultrasound image | 320 |
| left device | 124 | sensor 1 | 190 | play icon | 256 | user's hand | 328 |
| right device | 126 | sensor 2 | 192 | preview 1 frame | 258 | cloud | 330 |
| flash | 128 | sensor 3 | 194 | preview 4 frame | 260 | robot's hand | 332 |
| objectice lens 1 | 130 | sensor 4 | 196 | folding angle | 262 | hand gestures | 334 |
| collimating lens 2 | 132 | sensor 5 | 198 | residual information | 264 | pen drawing | 336 |
| optical path converter 1 | 134 | sensor 6 | 200 | warning message(battery low) | 266 | ultrasonic sensor 1 | 338 |
| image sensor 1 | 136 | middle of mobile phone body | 202 | warning message(open more) | 268 | ultrasonic sensor 2 | 322 |
| objective lens 2 | 138 | fingerprint recognition sensor 1 | 204 | timer setting icon | 270 | ultrasonic sensor 3 | 324 |
| collimating lens 2 | 140 | fingerprint recognition sensor 2 | 206 | main chip | 272 | ultrasonic sensor 4 | 326 |
| optical path converter 2 | 142 | fingerprint recognition sensor 3 | 208 | RF front-end block | 274 | control icon | 340 |
| objective lens 3 | 144 | fingerprint recognition sensor 4 | 210 | 5G modem block | 276 | pen drawing | 342 |
| collimating lens 3 | 146 | target object | 212 | 4G modem bock | 278 | screen content | 344 |
| optical path converter 3 | 148 | speaker 1 | 214 | security block | 280 | table | 346 |
| image sensor 2 | 150 | speaker 2 | 216 | internal memory block | 282 | rotation sensor 1 | 348 |
| objective lens 4 | 152 | speaker 3 | 218 | image block | 284 | rotation sensor 2 | 350 |
| collimating lens 4 | 154 | speaker 4 | 220 | AI engine block | 286 | rotation icon 1 | 352 |
| optical path converter 4 | 156 | microphone 1 | 222 | CPU block | 288 | rotation icon 2 | 354 |
| 3D image processor | 158 | dual screen icon | 224 | audio block | 290 | rotation icon 3 | 356 |
| preview 4 | 160 | single screen icon | 226 | video block | 292 | | |
| combination screen 1 | 162 | camera 5 | 228 | display block | 294 | | |
| combination screen 2 | 164 | middle of landscape screen | 230 | connectivity block | 296 | | |

FOLDABLE MOBILE PHONE

CROSS-REFERENCE TO RELATED APPLICATION(S)

The present application is a continuation of application Ser. No. 17/362,971, filed on Jun. 29, 2021 and International Application No. PCT/US2019/069016, filed on Dec. 30, 2019, which claims the benefit of U.S. Provisional Application No. 62/786,540, filed Dec. 30, 2018, entitled, "foldable mobile phone," and U.S. Provisional Application No. 62/806,558, filed Feb. 15, 2019, entitled, "foldable mobile phone," the entire disclosures of which are hereby incorporated by references.

TECHNICAL FIELD

The present disclosure relates to an electronic device. More particularly, the present disclosure relates to a foldable mobile phone that enables to fold a first device and second device.

BACKGROUND

With advances in mobile communication and processor technologies, electronic devices such as mobile terminals and smartphones can support not only conventional call functions but also various advanced functions. Such an electronic device may be equipped with a display including a touch panel to output images generated by various functions. The electronic device may output images associated with various applications, web browsers, and video content on the display.

An electronic device may display various data with a foldable device. In particular, the image displayed on the electronic device may also be displayed on both sides of the foldable device by use of cameras installed on the foldable device. The foldable device enables to display multiple views simultaneously. The image output on the display of an electronic device may be sent to an external device in peer-to-peer (P2P) mode through wireless local area communication like Wi-Fi, and the foldable device may display the received image at the same time as the electronic device. As such, the mirroring technology may be very effective for a user who wishes to view images that are created by an electronic device with a small display by use of a device with a foldable display.

However, the existing mirroring technology, which transmits the image output on the display of the electronic device to the external device as it is, may not be suitable for achieving multitasking. For example, while the user is viewing video content using the external device, when a popup window for a social networking service (SNS) message is output on the electronic device, the popup window may also be output on the display of the external device. Output of the popup window on the external device would not be in accord with the intent of the user wishing to view video content on a larger screen.

SUMMARY

Aspects of the present disclosure address at least the above-mentioned problems and/or disadvantages and provide at least the advantages described below. Accordingly, an aspect of the present disclosure is to provide an electronic device that can not only share at least a portion of the image output on the display with an external device but also handle a different action on the display in a multitasking fashion.

In accordance with an aspect of the present disclosure, an electronic device is provided. The electronic device may include a mobile phone body, a first screen displayed on the left device of the mobile phone, a second screen displayed on a right device of the mobile phone, the right device separated from the left device, a communication circuit positioned inside the mobile phone, a transceiver positioned inside the body and electrically connected to the left device, the right device, and the transceiver, and a memory positioned inside the body and electrically connected to the at least one processor. The memory may store instructions that, when executed by the at least one processor, cause the at least one processor to display a first screen image on the left device, display a second screen image on the right device at least partially simultaneously with the displaying of the first screen image on the left device, provide data associated with one of the first screen image and the second screen image to display to an third screen on an opposite side of the first screen or the second screen such that a screen image at least partially identical to one of the first screen image and the second screen image may be displayed on the third screen and or fourth screen of the mobile phone.

In accordance with another aspect of the present disclosure, an electronic device is provided. The electronic device includes a housing, a first display positioned on a first portion of the housing, a second display positioned on a second portion of the housing, the second display separated from the first display, a transceiver positioned inside the housing, at least one processor positioned inside the housing and electrically connected to the first display, the second display, and the transceiver, and a memory positioned inside the housing and electrically connected to the at least one processor. The memory may store instructions that, when executed by the at least one processor, cause the at least one processor to display a first screen image on the first display, display a second screen image on the second display at least partially simultaneously with the displaying of the first screen image, provide data associated with a third screen image to the transceiver at least partially simultaneously with the displaying of the first screen image and the second screen image, and control the transceiver to transmit the data to an third display such that the third screen image is displayed of the mobile phone.

In accordance with another aspect of the present disclosure, an electronic device is provided. The electronic device includes a housing, a display positioned inside the housing, a transceiver positioned inside the housing, at least one processor positioned inside the housing and electrically connected to the display and the transceiver, and a memory positioned inside the housing and electrically connected to the at least one processor. The memory may store instructions that, when executed by the at least one processor, cause the at least one processor to display a first screen image on a first area of the display, display a second screen image on a second area of the display at least partially different from the first area at least partially simultaneously with the displaying of the first screen image, provide data associated with one of the first screen image and the second screen image to the transceiver at least partially simultaneously with the displaying of the first screen image and the second screen image, and control the transceiver to transmit the data to an external device having a display such that a screen image at least partially identical to one of the first screen image and the second screen image is output on the third display of the mobile phone.

In accordance with another aspect of the present disclosure, a method of image display and transmission for a foldable phone is provided. The method includes displaying a first screen image on a first display, displaying a second screen image on a second display at least partially simultaneously with the displaying of the first screen image, and transmitting data associated with one of the first screen image and the second image to an external device having a display such that a screen image at least partially identical to one of the first screen image and the second screen image is output on the display of the external device, wherein the second display is separated from the first display.

A virtual universe is a computer-simulated environment, such as, without limitation, Second Life®, Entropia Universe, The Sims Online®, There, Red Light Center, EverQuest®, Ultima Online®, Lineage®, and World of Warcraft®. A virtual universe is typically represented using three dimensional (3-D) graphics and landscapes.

Metaverses, also referred to as virtual universes or worlds, are computer-based simulated environments intended for its users to inhabit, traverse, and interact via avatars, which are personas or representations of the users of the metaverse, and generally take the form of two-dimensional or three-dimensional human or fantastical representations of a person's self. Metaverses, are now most common in massive multiplayer online games, such as Second Life (a trademark of Linden Research, Inc. in the U.S., other countries or both), the Sims Online (a trademark of Electronic Arts Inc. in the U.S., other countries, or both), and World of Warcraft (a trademark of Blizzard Entertainment, Inc. in the U.S., other countries, or both). A feature of such applications is that are persistent, i.e., the virtual worlds exist continuously, even when a given user is not logged in. Avatars in these types of metaverses, which can number well over a million, have a wide range of business and social experiences.

Current metaverse applications allow a user to cause an avatar to take a photograph or video of a nearby scene using, e.g., keystrokes. The photographs or video can then be saved to an avatar's inventory for instance. This however requires the user to be logged in and active in the metaverse.

Further, in some embodiments, at least one of the first display and the second display may include a 3D display device or function. Further, the 3D display device may comprise a 3D display configured for displaying 3D digital image, one or more 3D patterns, and so on.

Further, in an embodiment, at least one of the first display and the second display may include a 3D and/or holographic display configured for displaying one or more images, patterns, and art associated with 3D and/or holographic contents, data, and so on.

Further, in some embodiments, at least one of the first display and the second display may include a holographic display device. Further, the holographic display device may comprise a holographic display configured for displaying holographic digital image, one or more holographic patterns, and so on.

In an aspect of the invention, there is a method of providing communication in a virtual universe (VU) comprising: instantiating and assigning an information channel to a first client of the VU; associating at least one additional client of the VU to the information channel; and, conveying data placed on the information channel to the first client and the at least one additional client.

In an aspect of the present invention, a virtual universe related image may be displayed on a first display and real world related image may be displayed on a second display.

A first and/or second display(s) can have a function to display 3D and/or holographic image.

The invention relates to an in particular three-dimensional display device, or a three-dimensional display, which may for example be designed as a stereoscopic display device, a light-field display device or a holographic display device. In particular, the invention relates to a holographic display device, in particular to a first or second display, representing a two- and/or three-dimensional scene. The invention furthermore relates in a particular embodiment to a holographic display device with single-parallax encoding.

In another aspect of the invention, there is a method of providing communication is a virtual universe (VU) having a plurality of clients. The method includes instantiating an information channel in the VU and associating a subset of the plurality of clients with the information channel based upon a characteristic that is common to each client of the subset of the plurality of clients. The method also includes presenting data that is placed on the information channel to each client of the subset of the plurality of clients.

In another aspect of the invention, there is a computer program product comprising a computer usable medium having a computer readable program embodied in the medium. The computer readable program, when executed on a computing device, is causes the computing device to associate a virtual universe (VU) with an information of the VU. The information may include at least one of text data and audio data, and the characteristic is at least one of: a geographic location within the VU, a profile parameter, and an inventory item that is common to each client of the subset of the plurality of clients.

In another aspect of the invention, there is a method for communicating in a virtual universe (VU). The method includes providing a computer infrastructure structured and arranged to: assign a VU information channel to a first VU client; associate a plurality of VU clients to the VU information channel, wherein the plurality of VU clients includes the first VU client; receive data from one of the plurality of clients via the information channel; and, transmit the data to the plurality of clients other than the one of the plurality of clients.

The users in the virtual universe interact, inhabit, and traverse the virtual universe through avatars. Avatars represent users and are controlled or associated with users. A user can view objects and other avatars within a given proximity of the user's avatar. The virtual universe grid software determines which objects and other avatars are within the given proximity of the user's avatar according to the geometries and textures that are currently loaded in the user's virtual universe client. The virtual universe grid determines the length of time that a user views an object or other avatar in proximity of the user based on processing the data sent to each virtual universe client. However, current virtual universe systems do not enable tracking of objects and avatars within a range of one or more selected objects. Moreover, the illustrative embodiments recognize that objects are typically rendered in a virtual universe in a static or predetermined manner regardless of the real world identity of the users controlling the avatars within range of the objects being rendered.

It is understood that in addition to being implemented as a system and method, the features may be provided as a program product stored on a computer-readable storage medium, which when run, enables a computer system to provide a metaverse application with a foldable phone. To this extent, the computer-readable storage medium may include program code, which implements the processes and systems described herein when executed by a computer system. It is understood that the term "computer-readable storage medium" comprises one or more of any type of physical embodiment of the program code. In particular, the computer-readable storage medium can comprise program code embodied on one or more portable storage articles of manufacture (e.g., a compact disc, a magnetic disk, a tape, etc.), on one or more data storage portions of a computing device, such as memory and/or a storage system.

The illustrative embodiments provide a computer implemented method, apparatus, and computer program product for constructing a customized virtual world. In one embodiment, a set of entities to be rendered within the customized virtual world is identified. An entity is a location within the customized virtual world. A representation associated with a target style for each entity in the set of entities is selected to form a set of selected representations. A customized virtual world is constructed using the set of selected representations. The set of representations are rendered within the customized virtual world.

In still another embodiment, a customized virtual world having a set of portals responsive to a query is received. A set of client virtual world software platforms installed at a data processing system associated with a user is identified to form a set of available client platforms. The customized virtual world is rendered with the set of portals on a display device. Each portal in the set of portals associated with a platform in the set of available client platforms is activated. Each portal in the set of portals associated with a platform that is absent from the set of available client platforms is Therefore, one illustrative embodiment provides a computer implemented method, apparatus, and computer usable program product for modifying objects in a virtual universe. A user priority controller determines a real world identity of a set of users controlling a set of avatars in response to detecting a presence of the set of avatars within a viewable field of an object in a virtual universe. The user priority controller receives user information describing characteristics of the set of users from a set of user information sources based on the real world identity of each user in the set of users. The user priority controller generates a temporary and dynamic rule to control modification of the object based on the user information. The user priority controller modifies the object in accordance with the temporary and dynamic rule to increase visibility of the object to an avatar in the set of avatars. The temporary and dynamic rule initiates implementation of a set of geometric and texture modifications for dynamically modifying the object in accordance with the temporary and dynamic rule.

In a feature of the present disclosure, an electronic device is provided that can not only share at least a portion of the image output on the display with an external device but also handle a different action on the display in a multitasking fashion. There is also provided a method of displaying and transmitting images, enabling the electronic device to perform image sharing and another action in a multitasking fashion.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 1A-1D illustrate a camera arrangement and operation of the foldable mobile phone according to various embodiments of the present disclosure;

FIGS. 2A-2C illustrate a camera structure according to various embodiments of the present disclosure;

FIGS. 4A-4E illustrate camera user interface for capturing forward direction image of the foldable phone according to various embodiments of the present disclosure;

FIGS. 5A-5E illustrate camera user interface for capturing backward direction image of the foldable mobile phone according to various embodiments of the present disclosure;

FIGS. 6A-6D illustrate user interface when capturing forward direction, backward direction and side direction of the foldable mobile phone according to various embodiments of the present disclosure;

FIGS. 8A-8C illustrate arrangement of side sensors and the operation thereof for foldable mobile phone according to various embodiments of the present disclosure;

FIGS. 9A-9D illustrate arrangement and operation of single ultrasonic fingerprint recognition sensor of the foldable mobile phone according to various embodiments of the present disclosure;

FIGS. 12A-12C illustrate ultrasonic sensor arrangement and gesture recognition operation of foldable mobile phone according to various embodiments of the present disclosure;

FIGS. 15A-15C illustrates speaker/microphone arrangement and the operations for the foldable mobile phone according to various embodiments of the present disclosure;

FIGS. 21A-21F illustrate operation in the battery low state for the foldable mobile phone according to an embodiment of the present disclosure;

FIGS. 34A-34E illustrate panorama shooting by using two cameras for the foldable mobile phone according to an embodiment of the present disclosure;

FIGS. 36A-36D illustrate panorama shooting method by using a single camera for the foldable mobile phone according to an embodiment of the present disclosure;

FIGS. 38A-38D illustrate wide photographing for the foldable mobile phone according to various embodiments of the present disclosure;

FIGS. 39A-36C illustrate user interface in wide photographing for the foldable mobile phone according to an embodiment of the present disclosure;

FIGS. 46A-46D illustrate device rotation control for the foldable mobile phone according to various embodiments of the present disclosure;

FIGS. 47A-47D illustrate device rotation control for the foldable mobile phone according to various embodiments of the present disclosure;

FIGS. 48A-48D illustrate a flowchart for device rotation control method for the foldable mobile phone according to various embodiments of the present disclosure;

FIG. 50 illustrates numeral references for the foldable mobile phone according to an embodiment of the present disclosure.

DESCRIPTION OF EXEMPLARY EMBODIMENTS

Figure 3:
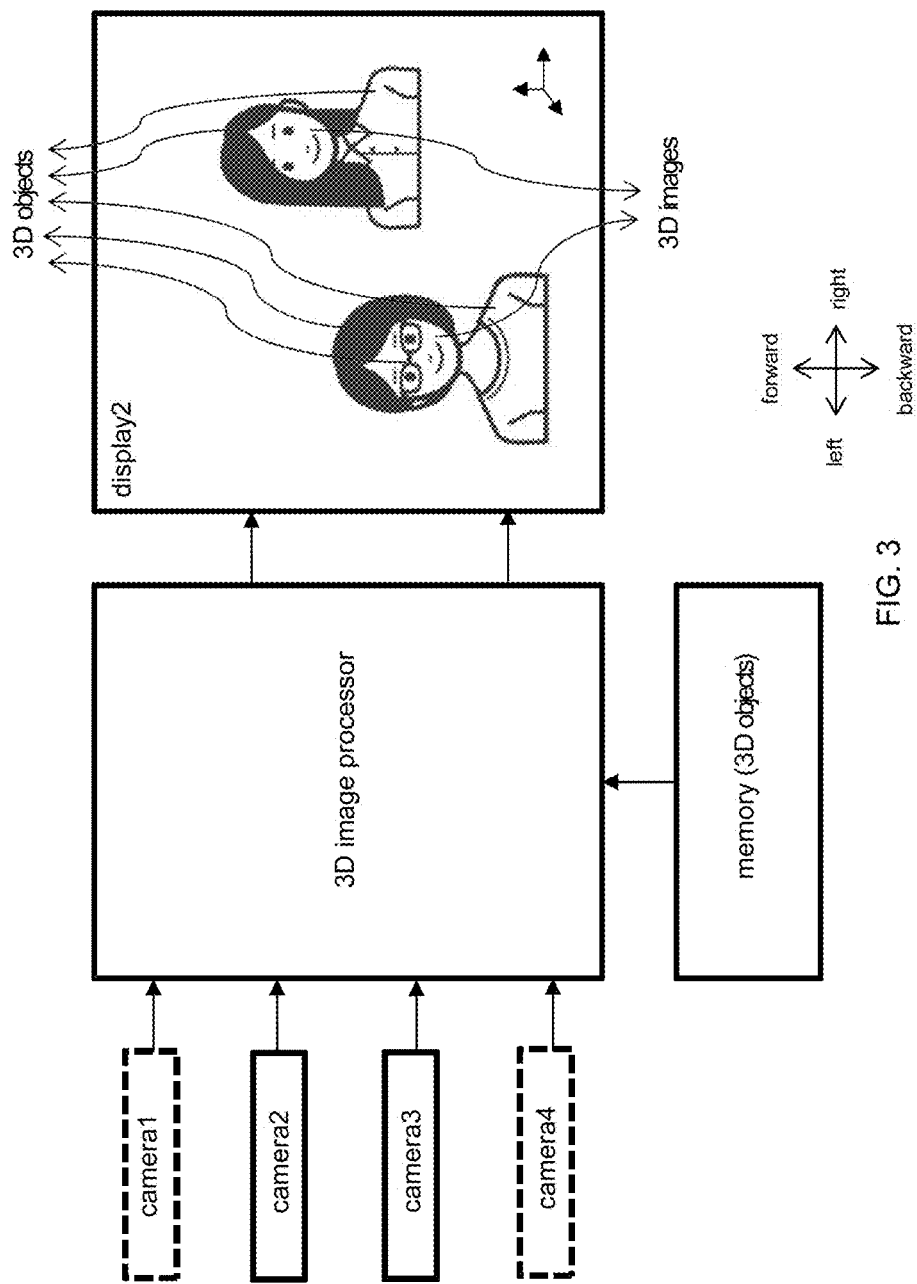
FIG. 3 illustrates a backward direction 3D image capturing and combination of 3D objects according to various embodiments of the present disclosure.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention. In addition, a 'left' or a 'right' are used for the purpose of explanation about various components, and the components are not limited the terms a 'left' or a 'right,' but may be used for a 'upper' or a 'lower,' respectively.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. The spirit of the invention may be expanded to its modifications, replacements or equivalents in addition to what is shown in the drawings.

Throughout the drawings, like reference numerals will be understood to refer to like parts, components, and structures.

Foldable mobile phone may include a left (upper) device and a right (lower) device those are foldable with each other and each device may have a camera and a display in both a rear and a front side of the devices. As the user may fold or open the mobile phone thus it can be used as a tablet PC, an electronic photo frame or etc. as well.

FIGS. 1A-1C illustrate camera arrangement and operation in the foldable mobile phone according to an aspect of the present invention. As shown in the FIG. 1A, a camera 1 is arranged in a top/middle portion of a front surface of the mobile phone when the mobile phone is in a folded state. As shown in the FIG. 1B, a camera 2 and a camera 3 are arranged in the top/middle portion of a left screen and a right screen respectively when the mobile phone is in an open state. As shown in the FIG. 1C, a camera 4 is arranged in the top/middle portion of the rear surface of the mobile phone. As shown in the FIG. 1D, the camera 1, 2, and 3 can be all display-through type cameras thus those have benefit to enlarge a display area. The camera 1 is used for capturing backward image (selfie) in the folded state of the mobile phone but it is used for capturing forward image in the open state of the mobile phone. The camera 2 and 3 are used for capturing backward image (selfie) in the open state and camera 4 is used for capturing forward image in both the folded and the open states. A display 2 is divided into a left screen and a right screen with respect to the user's view.

For the purpose of detailed explanation, FIG. 1A-1D illustrate a foldable mobile phone's camera arrangement and operation thereof according to the one embodiment of the present invention. A foldable mobile phone body may include a left device and a right device. The FIG. 1 illustrates foldable mobile's folded state in which the left device having a display 1 has been folded into the right device thus the display 1 is placed in an upper most location with respect to the user's view. Meanwhile, as the camera 1 is arranged in the top/middle portion of the display 1 thus it can be used to take selfie. The FIG. 1B illustrates the open state where an opening angle between the left device and the right device is about 180 degree.

As shown in the FIG. 1B, the display 2 is installed through the left device and right device of the mobile phone. The display 2 is made of foldable material this it can be folded when the mobile phone is in the folded state. The area of display 2 when the mobile phone is about a twice the area of the display 1. As shown in the FIG. 1A-1C, when the mobile phone is in the folded state, the left and the right screens of the display 2 face each other. According to operational status, display 2 can be used as a single screen, or a double screen if those are separated each other.

As shown in the FIG. 1C, the camera 4 is arranged in the top/middle portion of the right screen of display 2 of the mobile device. Camera 1 is used for capturing backward image (selfie) in the folded state but it is used for capturing forward image in the open state. The Camera 2 and 3 are used for capturing backward image (selfie) in the open state and camera 4 is used for capturing forward image in both the folded and the open state. In the meantime, a display 3 (not drawn) can be arranged to the rear surface of the mobile phone where camera 4 is installed.

According to an embodiment of the present invention, the camera 1 and the camera 2 may share a first image sensor (not shown) and the camera 3 and the camera 4 may share a second image sensor (not shown) which are described in detail below.

FIGS. 2A-2C illustrate camera structure of the foldable mobile phone according to an aspect of the present invention. As shown in the FIG. 2A, the camera 1 may include an objective lens 1, a collimating lens 1, an optical path converter 1, and an image sensor 1. The objective lens 1 receives light from the target object and the collimating lens 1 collimates light emerged from the objective lens 1 and the optical path converter 1 changes the proceeding direction of the light received from the collimating lens 1 perpendicularly. Light emerged from the optical path converter 1 proceeds into the optical path converter 2 within the camera 2 where its proceeding direction is changed perpendicularly thus proceed into the image sensor 1. The camera 2 comprises an objective lens 2, a collimating lens 2, an optical path converter 2 and an image sensor 1 where the image sensor 1 is commonly used by both the camera 1 and the camera 2. Similar with the camera 1, light emerged from the objective lens 2 is collimated by the collimating lens 2 and proceed into the image sensor 1 where light emerged from the collimating lens 2 doesn't change its proceeding direction when it passes through the optical path converter 2. Besides parts explained above, other parts may be composed within the camera 1 and the camera 2, but for the purpose of simplicity, only the primary parts are described.

As the FIG. 2B illustrates, the camera 3 may include an objective lens 3, a collimating lens 3, an optical path converter 3 and an image sensor 2. The Objective lens 3 receives light from the target object and the collimating lens 3 collimates light emerged from the objective lens 3 and the optical path converter 3 changes the proceeding direction of the light received from the collimating lens 3 perpendicularly. A light emerged from the optical path converter 3 proceeds into an optical path converter 4 within the camera 4 where its proceeding direction is changed perpendicularly thus proceed into the image sensor 2. The Camera 4 comprises an objective lens 4, collimating lens 4, an optical path converter 4 and the image sensor 2 where the image sensor 2 is commonly used by both the camera 3 and the camera 4. Similar with the camera 2, an light emerged from the objective lens 4 is collimated by the collimating lens 4 and proceed into the image sensor 2 where the light emerged from the collimating lens 4 doesn't change its proceeding direction when it passes through the optical path converter 4. Besides parts explained above, other parts may be composed within the camera 3 and the camera 4, but for the purpose of simplicity, only the primary parts are described.

As the FIG. 2C illustrates objective lens 1 within the camera 1 and objective lens 2 within the camera 2 are placed from the top surface of the mobile phone body with substantially same distance (z) thus those are arranged to use an image sensor 1 commonly. For the same reason, an objective lens 3 within the camera 3 and an objective lens 4 within a camera 4 are placed from the top surface of the mobile phone body with substantially the same distance (z). It is preferable that distance between the center of the objective lens 1 and the center of the objective lens 2 should be kept with predetermined distance (x, 5 mm~50 mm) to share the image sensor 1. For the same reason, it is preferable that a distance between the center of the objective lens 3 and the center of the objective lens 4 should be kept with predetermined distance (y, 5 mm~50 mm) to share the image sensor 1.

It is preferable that a center of the objective lens 2 within the camera 2 and a center of the objective lens 3 within the camera 3 are placed symmetrically with respect to a middle of the mobile phone body thus the camera 2 and the camera 3 are used for a backward direction 3D image capturing in the open state of the mobile phone. For the same reason, it is preferable that a center of the objective lens 1 within the camera 1 and a center of the objective lens 4 within the camera 4 are placed symmetrically with respect to a middle of the mobile phone body thus the camera 1 and the camera 4 are used for forward direction 3D image capturing in the open state of the mobile phone.

As described above, sharing an image sensor by two cameras is one aspect of the present invention, the present invention is not restricted to the sharing of image sensor by the two cameras, each of camera 1, 2, 3 and 4 could have its own image sensor without sharing the image sensor.

FIG. 3 illustrates a backward direction 3D image capturing and combination of 3D objects according to an aspect of the present invention. In the open state of the mobile phone, as the camera 2 and the camera 3 are faced toward the user, those are used to capture the user's image (selfie). In this case, a 3D image processor within the mobile phone can extract a depth information from the two user's images captured by each camera and it can be used for rendering a 3D user image to the display. The 3D rendered user image can be displayed in combination with 3D rendered objects such as a hair, clothes or glasses which are already stored in a memory of the mobile phone. Combining the 3D rendered user image with the 3D rendered objects can be performed at the mobile phone. Alternatively, the mobile phone can send captured user images and 3D information such as the depth information to the network connected outside server then server performs user image 3D rendering and combines 3D rendered user image with the related 3D objects and send them to the mobile phone for displaying them at the mobile phone.

FIGS. 4A-4E illustrate a camera user interface according to the present invention for capturing a forward direction image. When a camera application is executed screen displays four previews as illustrated in the FIG. 4A, where each preview represents an image captured by the corresponding camera among four cameras, thus the user can select a preview he wants through touching the screen by a finger or a dedicated pen for the mobile phone.

Figure 49:
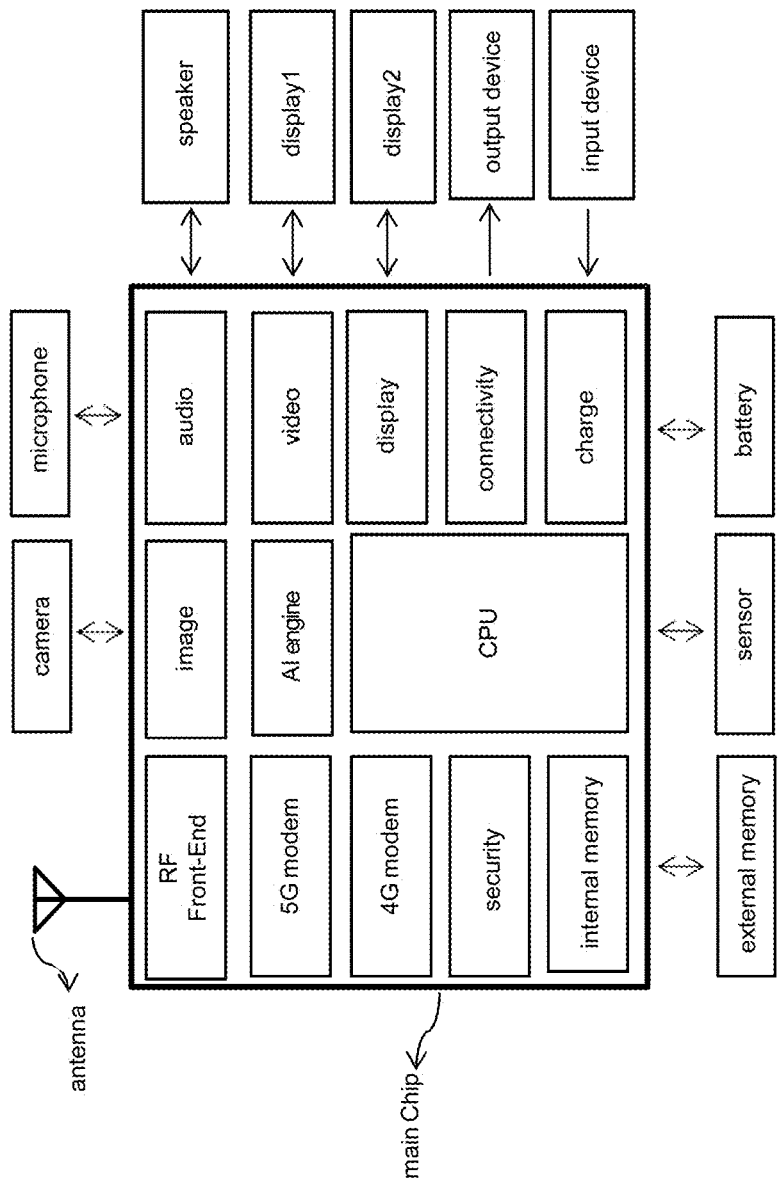
FIG. 49 illustrates functional block diagram for the foldable mobile phone according to an embodiment of the present disclosure.

When a camera mode is started, as illustrated in the FIG. 49, a main chip has several functional blocks, a camera block controls each camera's operation during capturing images and captured images are sent to the image block or a video block for the processing of still image or moving image respectively, and if audio signals are recorded with images, those are sent to the audio block. Data processed by the image block or the video block sent to the display block for pixel processing before sending to the display 1 or the display 2 outside the main chip. An audio signal processed by the audio block sent to a speaker outside the main chip.

A preview 1 captured by the camera 1 may be displayed left-top portion of the screen and a preview 2 captured by the camera 2 may be displayed below the preview 1. And a preview 4 captured by the camera 4 may be displayed right-top portion of the screen and a preview 3 captured by the camera 3 may be displayed below the preview 4. The prereview 1 and the preview 4 are corresponding to the cameras captures forward direction images and arranged side by side with the same height in the screen and the preview 2 and the preview 3 are corresponding to the cameras captures backward direction images and are arranged side by side below the preview 1 and the preview 4 respectively thus the user can easily discern which are the previews for forward direction images or backward direction images.

FIG. 4A illustrates the screen in which the user has selected the preview 1 which is highlighted to represent user's selection. The screen also has a next key at the bottom of the screen, if it is pressed, the screen is changed to a new screen as illustrated in FIG. 4B where a selected preview is enlarged and several keys are displayed at the bottom of the screen. The next key is used to move a previous screen for selecting a preview, a moving picture key is used to capture moving images with the camera corresponding to the selected preview and a still picture key is used to capture a still image with a camera corresponding to the selected preview also.

FIG. 4C illustrates the screen in which the user has selected both the preview 1 and the preview 4 where selected previews are highlighted, if the user press the next key at the bottom of the screen, the screen is moved to the new screen as illustrated in FIG. 4D where combination screen 1, which is the combination of screen corresponding to the preview 1 with the screen corresponding to the preview 4, is displayed. A Combination screen 1 could be a 3D image rendered by using a depth information acquired from the images captured by the corresponding cameras or it could be a wide image resulting from the combination of two images horizontally. As the same with the FIG. 4B, the previous key, the moving picture key and the still picture key are arranged a bottom portion of the screen. As explained above, a selection operation for the preview screens or the keys is performed by using fingertips or the dedicated pen, but it is also be performed through a voice command for a personal assistant embedded within the mobile phone.

Also as described in the FIG. 4D, if the user touch two points of the combination screen 1 through the fingertips and slide the two points away each other, combination screen 1 in the FIG. 4D is divided in the preview 1 and the preview 4 as described in the FIG. 4E. Reversely, if user touch the two points in the preview 1 and the preview 4 respectively and slide two points to approach each other, the preview 1 and the preview 4 are combined into the combination screen 1. Through this way, the user can move between a combination screen and divided screens conveniently without using the previous key and the next key.

FIGS. 5A-5E illustrate a camera user interface according to an aspect of the present invention for capturing a backward direction image. When the camera application is executed, a screen displays four previews as illustrated in the FIG. 5A, where each preview represent image captured by the corresponding camera among four cameras, thus the user can select any preview he wants through touching the screen by a finger or a dedicated pen for the mobile phone.

A preview 1 captured by the camera 1 is displayed a left-top portion of the screen and a preview 2 captured by the camera 2 is displayed below the preview 1. And a preview 4 captured by the camera 4 is displayed a right-top portion of the screen and a preview 3 captured by the camera 3 is displayed below the preview 4. The preview 1 and the preview 4 are corresponding to the cameras captures forward direction views and arranged side by side with the same height in the screen and the preview 2 and the preview 3 are corresponding to the cameras captures backward direction views and are arranged side by side below the preview 1 and the preview 4 respectively. Thus the user can easily discern which are the previews for the forward direction or the backward direction.

FIG. 5A illustrates the screen in which user has selected the preview 2 which is highlighted to represent user's selection. Screen also has the next key at the bottom, if it is pressed, the screen is changed to new screen as illustrated in FIG. 5B where a selected preview is enlarged, and several keys are displayed at the bottom. A next key is used to move to a previous screen for selecting a preview, moving picture key is used to capture moving images with the camera corresponding to the selected preview and still picture key is used to capture still image with a camera corresponding to the selected preview also.

FIG. 5C illustrates the screen in which the user has selected both the preview 2 and the preview 3 where selected previews are highlighted, if the user press the next key at the bottom of the screen, the screen is moved to a new screen as illustrated in FIG. 5D where a combination screen 2, which is the combination of screen corresponding to the preview 2 with the screen corresponding to the preview 3, is displayed. the combination screen 2 could be a 3D image rendered by using the depth information acquired from the images captured by the corresponding cameras or it could be a wide image resulting from the combination of two images horizontally. As the same with the FIG. 5B, a previous key, a moving picture key and a still picture key are arranged at a bottom portion of the screen. As explained above, a selection operation for the preview screens or keys are performed by using fingertips or a dedicated pen, but it is also be performed through a voice command for the personal assistant embedded within the mobile phone.

And as illustrated in the FIGS. 5B and 5D, when capturing backward images, especially a selfie, it is necessary to guide the user to look at the camera that captures his image, without a guidance, because the user may be confused which camera captures his image. In this situation and for the guidance, a lens icon can be displayed next to the camera that captures user's image.

In the FIG. 5B, lens icon is displayed next to the camera 2 to guide the user that camera 2 is the camera that captures user's image. In the FIG. 5D, the lens icon is displayed at a middle point between the camera 2 and the camera 3 because both the camera 2 and the camera 3 are used to capture user's image. In this way, an artificial lens icon is displayed next to the camera if the only one camera is used to capture the user image but artificial lens is displayed at the middle point between two cameras if two cameras are used to capture user's image thus it can guide the user to look at the camera or cameras more naturally.

Also as described in the FIG. 5D, if the user touch two points of the combination screen 2 through the fingertips and slide the two points away each other, the combination screen 2 in the FIG. 5D is divided into the preview 2 and the preview 3 as described in the FIG. 5E. Reversely, if the user touch the two points in the preview 2 and the preview 3 respectively and slide two points to approach each other, the preview 2 and the preview 3 are combined into the combination screen 2. Through this way, the user can move between the combination screen and divided screens conveniently without using the previous key and the next key.

FIGS. 6A-6D illustrate a user interface according to an aspect of the present invention when capturing a forward direction, a backward direction and/or a side direction view.

As explained above, FIG. 6A illustrates the situation in which a combination screen 1 of the preview 1 and the preview 4 is being displayed through the next key after selecting the preview 1 and the preview 4. In this situation, if the user rotates the right device toward the user's direction by 90 degree, the preview 1 and the preview 4 are separately and respectively displayed at the upper and lower portion of the left screen of display 2. The reason why the preview 1 and the preview 4 are separated is that, as the right device rotates toward user's direction, a capturing direction of the camera 1 and a capturing direction of the camera 4 becomes different thus it becomes difficult to make a 3D image or a wide image. And the reason why the preview 1 and the preview 4 are all displayed a left screen of the display 2 is that user becomes difficult to see the right screen of the display 2 as the user rotates the right device toward the user' direction.

FIG. 6C illustrates the situation in which combination screen 2 of the preview 2 and the preview 3 is being displayed through the next key after selecting the preview 2 and the preview 3. In this situation, if the user rotates the right device toward the user's direction by 90 degree, the preview 2 and the preview 3 are separately and respectively displayed at the upper and lower portion of the left screen of the display 2. The reason why the preview 2 and the preview 3 are separated is that, as the right device rotates toward user's direction, a capturing direction of the camera 2 and a capturing direction of the camera 3 become different thus it becomes difficult to make a 3D image or a wide image. And the reason why the preview 2 and the preview 3 are all displayed a left screen of the display 2 is that user becomes difficult to see the right screen of the display 2 as the user rotates the right device toward the user' direction.

Also as illustrated in the FIG. 6B and FIG. 6D, a previous key, a moving picture key and a still picture key are displayed at the bottom portion of the display 2 screen. If user press the moving picture key or the still picture key at the situation described in the FIG. 6B, pictures captured by the camera 1 and the camera 4 are displayed at the left screen of the display 2 and if user press the moving picture key or the still picture key at the situation described in the FIG. 6D, pictures captured by the camera 2 and the camera 3 are displayed at the left screen of the display 2. At the above embodiment, situation in which the user rotates the right device toward the user's direction by 90 degree, if the user rotates the left device toward the user's direction by 90 degree, previews are displayed at the right screen of the display 2.

Figure 7A:
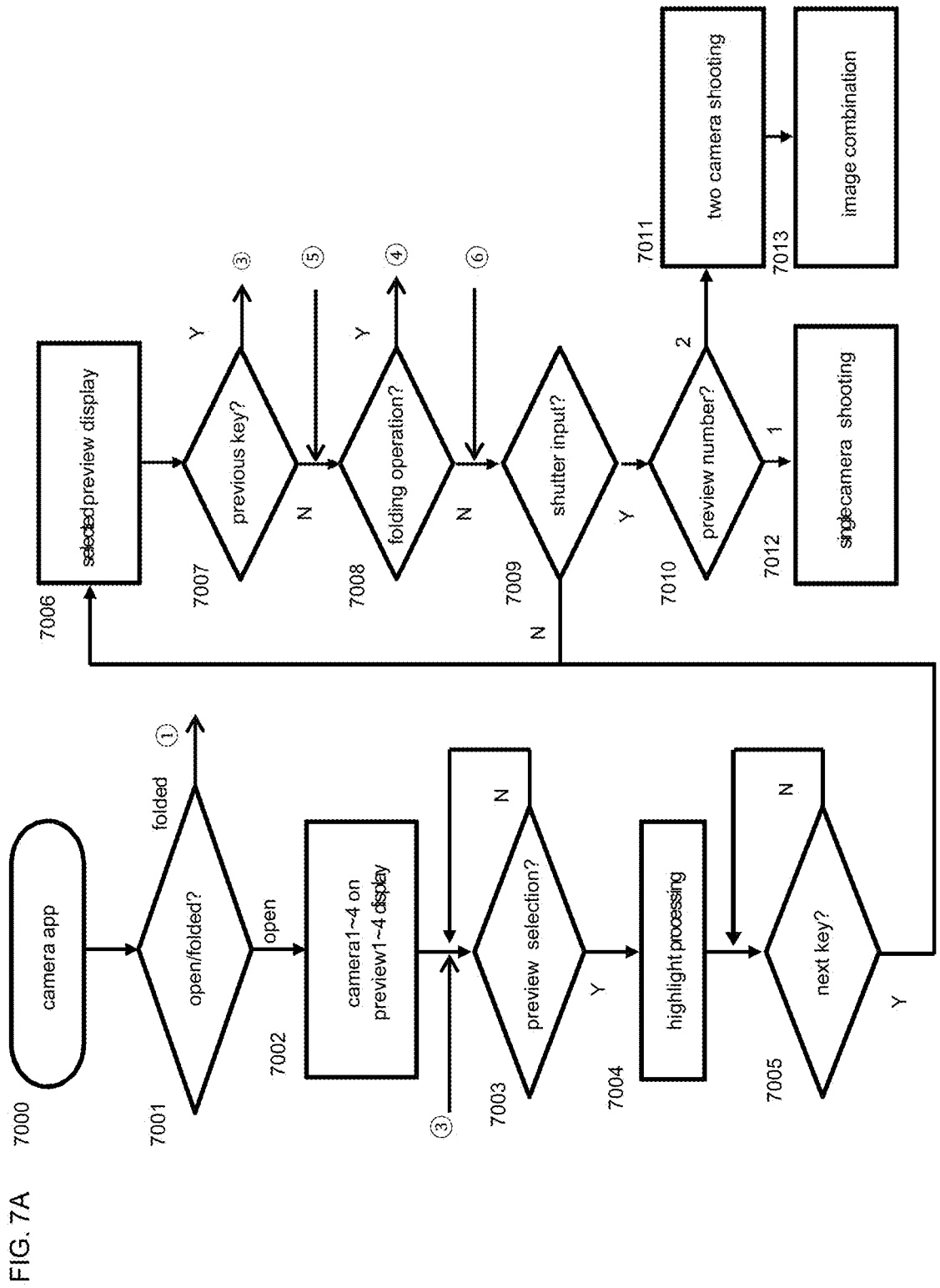
FIGS. 7A-7C illustrate arrangement of side sensors and operations thereof for the foldable mobile phone according to various embodiments of the present disclosure.
Figure 7B:
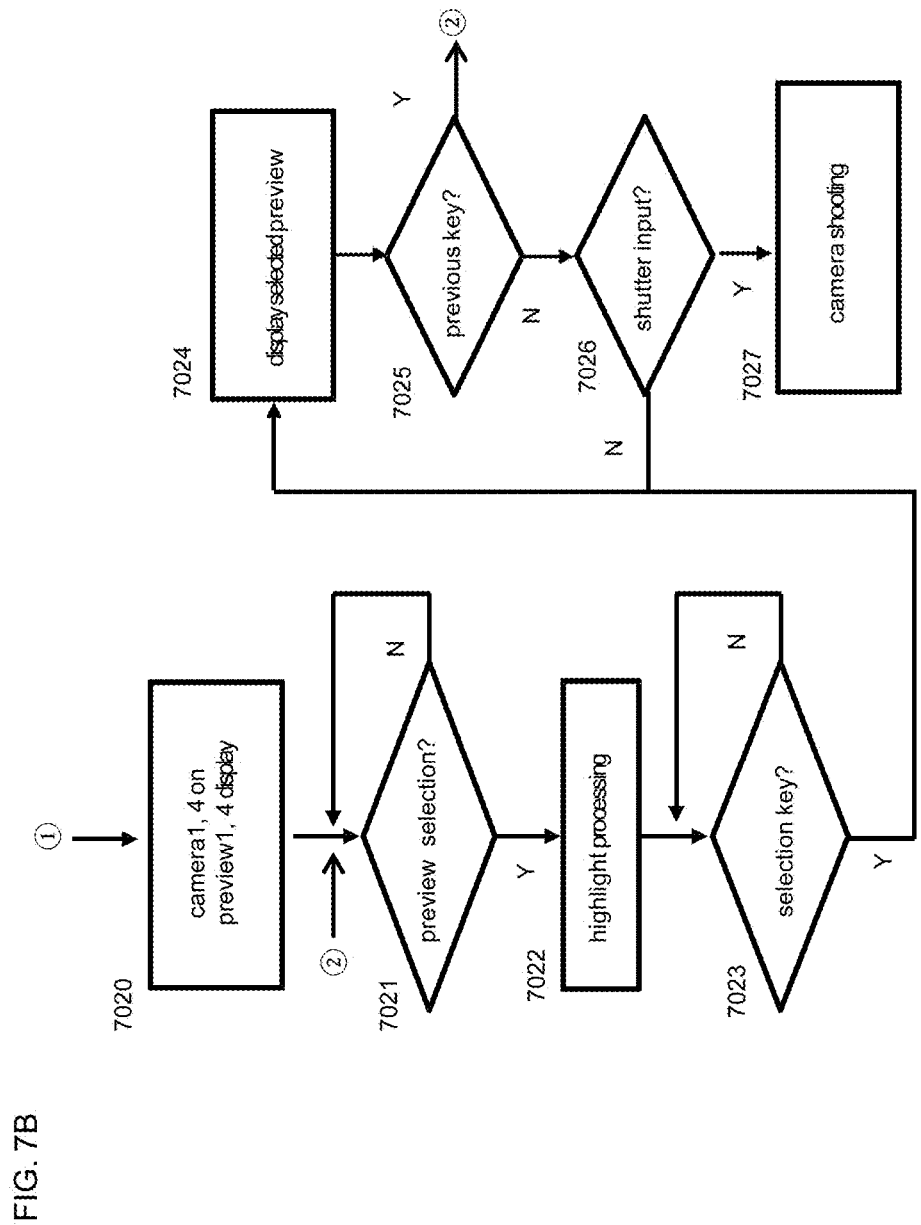
Figure 7C:
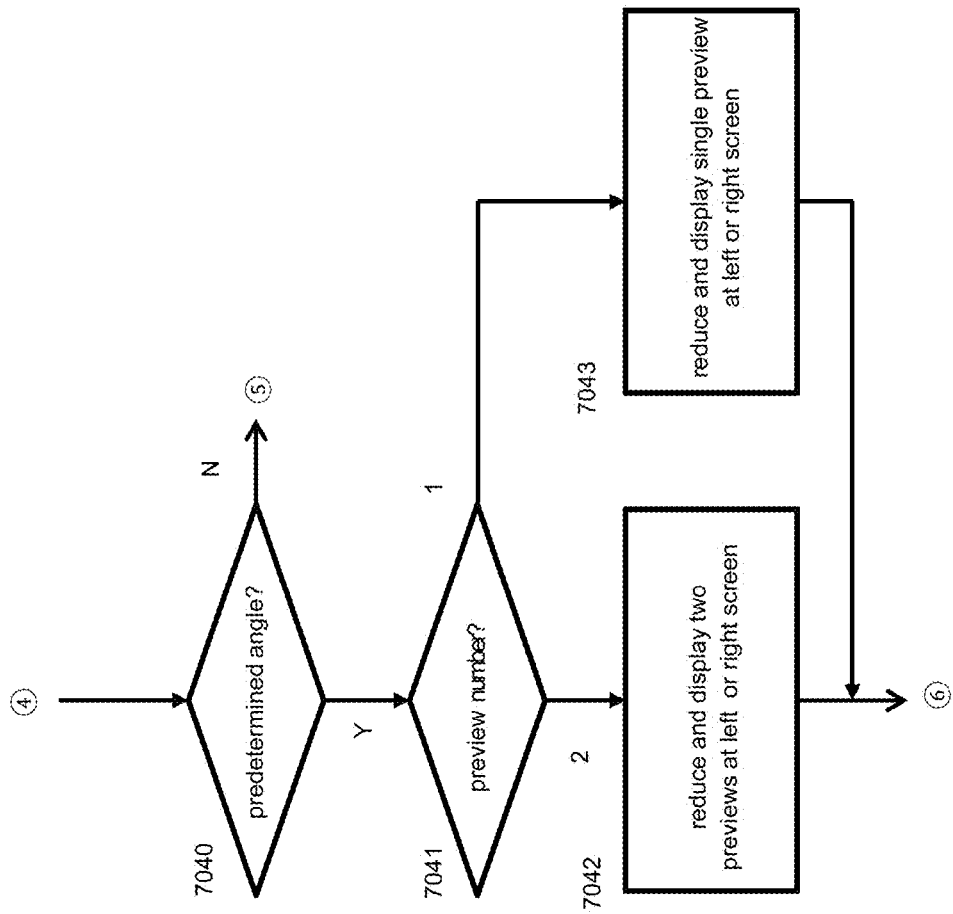

FIGS. 7A-7C illustrate a method of a camera user interface of the mobile phone according to an aspect of the present invention where the camera user interface is implemented by executing related algorithm stored in the memory of the mobile phone through a computer processing unit (CPU) of a main chip within the mobile phone in FIG. 49. Firstly, at the step 7000, a camera application is performed and proceeds to step 7001 to detect a folding angle between the left device and the right device of the mobile phone through the CPU of the main chip of the mobile phone as illustrated in the FIG. 49 and also to determines whether the mobile phone is a folded state or an open state. It is determined as the folded state if the folding angle is less than the predetermined degree (for example, 90 degree) or it is determined as the open state if the folding angle is larger the predetermined degree. If the result of determination is the open state, process proceeds to step 7002 where four cameras (cameras 1 to 4) are turned to ON state and pictures captured by the corresponding cameras are displayed through the previews 1 to 4 respectively. Next, process proceeds to step 7003 to determine whether a selection key is pressed. if the result of the determination is yes, process proceeds to step 7004 to highlight the selected preview and then process proceeds to step 7005.

At the step 7005, it is determined whether the next key is pressed, if yes, process proceeds to step 7006 to enlarge and display the selected preview and then process proceeds to step 7007 to determine whether the next key is pressed or not, if yes process proceeds to step 7003, if not, process proceeds to step 7008 to determines whether the folding operation has been performed after starting the camera interface application. The reason to see the change of folding state is that even though the mobile phone's folding state was open at the time of initiating the camera user interface application, but the user may fold the mobile phone after camera application is started. Folding state change is detected through the folding angle sensor (not shown) which is embedded within the mobile phone. If the result of the determination at the step 7008 is no, process proceeds to step of 7009 to determine whether the camera shutter key (moving picture key or still picture key) has been pressed. If the result of the determination is no, process proceeds to step of 7006, if yes, process proceeds to step of 7010 to determine the number of selected previews at the step of 7003. If the number determined is one, process proceeds to step of 7012 where camera corresponding to the selected preview capture image. If the number determined is two, process proceeds to step of 7011 where cameras corresponding to the selected preview capture images. Next, process proceeds to step of 7013 where two images captured by corresponding cameras are combined.

At the previous step 7001, if the folded state is determined, process proceeds to step 7020 as illustrated in the FIG. 7B where cameras 1 and 4 are turned ON and the previews 1 and 4 corresponding to the cameras 1 and 4 respectively are displayed. Next, process proceeds to step of 7021 to determine whether a preview selection has been done and if the result of determination is no, process proceeds to step 7021 to wait a preview selection, if yes, process proceeds to step 7022 to highlight the selected preview. Next, process proceeds to step of 7023 to determine whether the selection key is pressed or not. If the result of determination is yes, process proceeds to step of 7024 to enlarge and display the selected preview. Next, process proceeds to step of 7205 to determine whether the previous key is pressed. If the result of determination is yes, process proceeds to step 7021, if not, process proceeds to step of 7026 to determine whether a camera shutter key (the moving picture key or the still picture key) is pressed. If the result of determination is no, process proceeds to step of 7204, if yes, process proceeds to step of 7027 where the camera corresponding to the selected preview captures image.

At the previous step 7008, if it is determined that folding operation is performed, process proceeds to step 7040 to determine whether the mobile phone is folded over the predetermined degree (for example, 80 degree), if not, process proceeds to step 7008, if yes, process proceeds to step 7041 to determine the user selected preview numbers at the step 7003. If the result of the determination is two, process proceeds to step 7042 to reduce and display two previews at the left and right screen respectively and proceeds to step 7009. If the result of the determination is one, process proceeds to step 7043 to reduce and display single preview at the left and right screen respectively and proceeds to step 7009.

FIGS. 8A-8C illustrate arrangement of side sensors and their operation according to an aspect of the present invention. As the FIG. 8B illustrate, when a mobile phone is in an open state, a sensor 1 is placed at the left side/upper portion of the mobile phone body and operates as a volume button, a sensor 2 is placed at the left side/lower portion of the mobile phone body and operates as a personal assistant button. But as the FIG. 8A illustrates, when mobile phone is in a folded state, the sensor 1 is placed at the right side/upper/backward portion of the mobile phone and operates as a power button, the sensor 2 is placed at the right side/lower/backward portion of the mobile phone body and operates as personal setting button and it's function is assigned at the user setting screen by the user.

And, when the mobile phone is in the open state, as the sensor 3 and the sensor 4 are placed in a middle portion of the mobile phone body thus those are not exposed to an outside of the mobile phone and they are in an inactive state without being assigned any functions. But, when the mobile phone is in the folded state, the sensor 3 is exposed the outside of the mobile phone and is placed at the left side/upper/backward portion of the mobile phone body and operates as the volume control button, and the sensor 4 is also exposed outside of the mobile phone and is placed at the left side/lower/backward portion of the mobile phone and operates as the personal assistant button. However, the functions of the key can be varied according to an aspect of the present invention.

And, when the mobile phone is in the open state, a sensor 5 is placed at the right side/upper portion of the mobile phone body and operates as the power button and a sensor 6 is placed at the right side/lower portion of the mobile phone body and operates as the personal assistant button. But, when the mobile phone is in the folded state, the sensor 5 and the sensor 6 are turned into the inactive state. But, in some cases where the mobile phone is folded state, the sensor 1 and the sensor 5 may operate as the same button and the sensor 2 and the sensor 6 also may operate the same button, thus those can make contact area larger and give user convenience to operate for the mobile phone. As the sensors 1 to 6 are made of software keys, those can be operated by a touch without a physical button pressure and their functions can be assigned adaptively according to the folding state of the mobile phone, thus those key configurations have merits to overcome structural constraints relating to the folding operation of the mobile phone.

FIGS. 9A-9D illustrate arrangement and operation of a single ultrasonic fingerprint recognition sensor according to aspect of the present invention. An Ultrasonic fingerprint sensing method can be referenced at the Qualcomm's Snapdragon 855 chip set or CrucialTec's Korean patent, KR1899423.

FIG. 9A illustrates situation in which the fingerprint recognition sensor 1 is placed behind the left screen of the display 2 when the mobile phone is in the open state and FIG. 9B illustrates situation in which mobile phone has been changed from the open state as described in the FIG. 9A to the folded state. FIGS. 9A and 9B illustrate situations in which the same fingerprint recognition sensor 1 is used to sense user's fingerprint through the left screen of the display 2 when the mobile phone is in the open state and through the display 1 when the mobile phone is in the folded state. As the same fingerprint recognition sensor 1 is used in both open and folded states, another fingerprint recognition sensor is not necessary even though the mobile phone's folding state has been changed, thus it gives merit in terms of cost.

But, direction for sending or receiving signal need to be set reversely according to the mobile phone's folding state because, when the mobile phone is in the open state, the fingerprint recognition sensor 1 may send/receive signal toward/from the direction of user who confront the display 2, but when the mobile phone is in the folded state, the fingerprint recognition sensor 1 may send/receive signal toward/from the direction of user who faced to the display 1. Furthermore, a right and a left direction for sending or receiving a signal also needed to be set differently according to the mobile phone's folding state.

FIG. 9C illustrates situation in which the fingerprint recognition sensor 1 is placed behind the right screen of the display 2 when the mobile phone is an open state. FIG. 9D illustrates situation in which the mobile phone's folding state has been changed from the open state to the folded state. FIGS. 9C and 9D illustrate situation in which the same fingerprint recognition sensor 2 is used to sense user's fingerprint through the right screen of the display 2 when the mobile phone is an open state and through the display 1 when the mobile phone is in a folded state. As the same fingerprint recognition sensor 2 is used in both an open state and a folded state, another fingerprint recognition sensor is not necessary even though the mobile phone's folding state has been changed, thus it gives merit in terms of cost.

But, an intensity of the ultrasonic transceiving signal or a sensitivity of the sensor need to be set differently depending on the mobile phone's folding state because when the mobile phone is in the folded state, a signal need to pass through both the display 1 and the display 2, but when the mobile phone is in the open state, the signal only pass through the display 2, thus it is necessary to increase intensity of the ultrasonic transceiving signal or increase sensor's sensitivity when the mobile phone is in the folded state when it is compared to the situation in which the mobile phone is the open state. But, as explained about the FIGS. 9A and 9B, it is not required to set direction for sending and receiving signal according to the mobile phone's folding state. In other words, direction of sending and receiving signal is the same, even though the mobile phone's folding state has been changed. Furthermore, right and left direction for sending or receiving signal is set identically regardless of mobile phone's folding state.

Figure 10B:
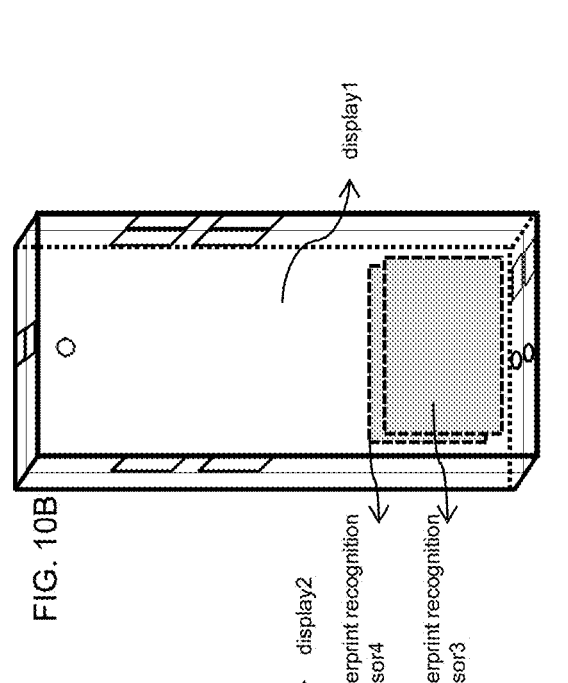
FIGS. 10A-10D illustrate multiple ultrasound fingerprint sensor arrangement and their operation of foldable mobile phone according to various embodiments of the present.
Figure 10A:
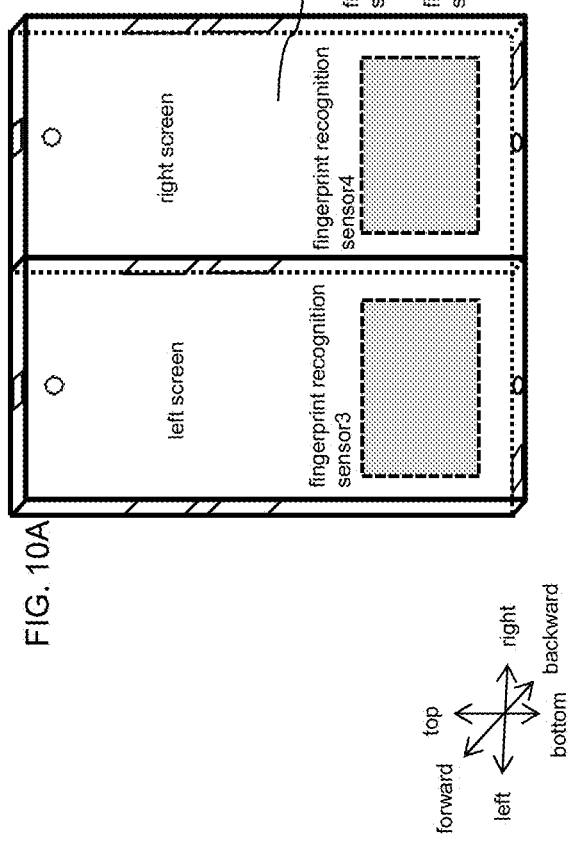
Figure 10D:
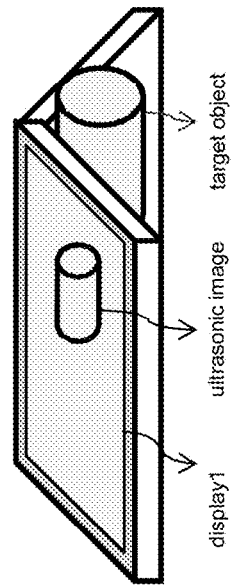
Figure 10C:
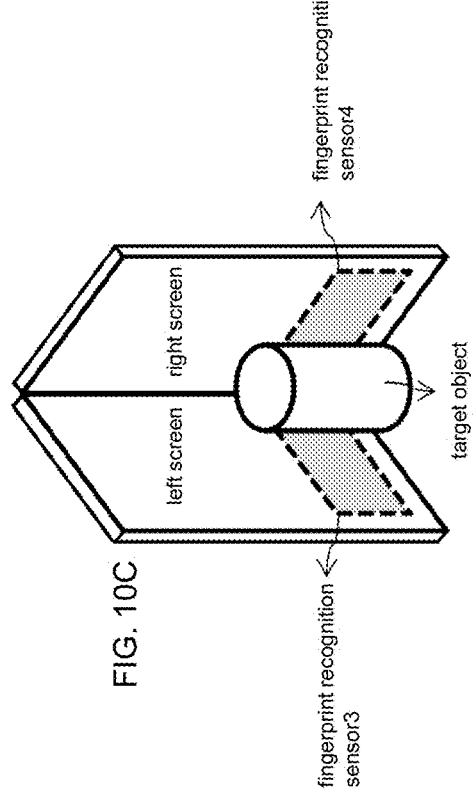

FIGS. 10A-10C illustrate a multiple ultrasound fingerprint sensor arrangement and their operation according to an aspect of the present invention. FIG. 10A illustrates the situation where fingerprint sensor 3 is disposed within the left screen of the display 2 and a fingerprint sensor 4 which is separated from the fingerprint sensor 2 is disposed within the right screen of the display 2. Accordingly, when the mobile phone is in an open state, it is possible to sense a fingerprint through both a left and a right screen of the display 2.

FIG. 10B illustrates the situation where the mobile phone has been changed into the folded state. When the mobile is in the folded state, as the fingerprint recognition sensor 3 and the fingerprint recognition sensor 4 are overlapped, the fingerprint recognition sensor 4 is set to an inactive state because it is disposed further away from the display 2 thus only the fingerprint recognition sensor 3 is set to active to perform a fingerprint sensing through the display 1. FIG. 10C illustrates a situation where the mobile phone is opened by about 90 degree and the fingerprint recognition sensor 3 and the fingerprint recognition sensor 4 are set to an active state alternately by dividing a time, and a target object is placed between the left screen and the right screen thus it is possible to make a 3-dimensional ultrasound image of the target object by using a signal acquired through the fingerprint sensor 3 and the fingerprint sensor 4. FIG. 10D illustrates an another example situation where a target object is covered by the mobile phone and the fingerprint recognition sensor 3 and the fingerprint recognition sensor 4 are set to an active state alternately by dividing a time, and a target object is placed between the left screen and the right screen thus it is possible to make a 3-dimensional ultrasound image of the target object by using a signal acquired through the fingerprint sensor 3 and the fingerprint sensor 4. The acquired image is displayed on the display 1 in a real time.

The reason for activating two fingerprint sensors alternatively by dividing the time is to avoid an interference between signals transmitted from the two fingerprint sensors by sending at a different time each other. The examples for the target object could include user's finger, organs or a fetus and so on. This 3-dimensional ultrasound image can be used to perform a biometric authentication more precisely, and there is an advantage that can check the internal appearance of the target object that is difficult to see with the naked eye. In addition, the ultrasound image of the target object obtained in this way is displayed to the user in a real time through the display 1 and various control icons (not shown) arranged on the screen may perform operations such as an enlargement, a reduction, a measurement of a length or a width, a screen copying, etc. of the displayed ultrasound image.

Figure 11:
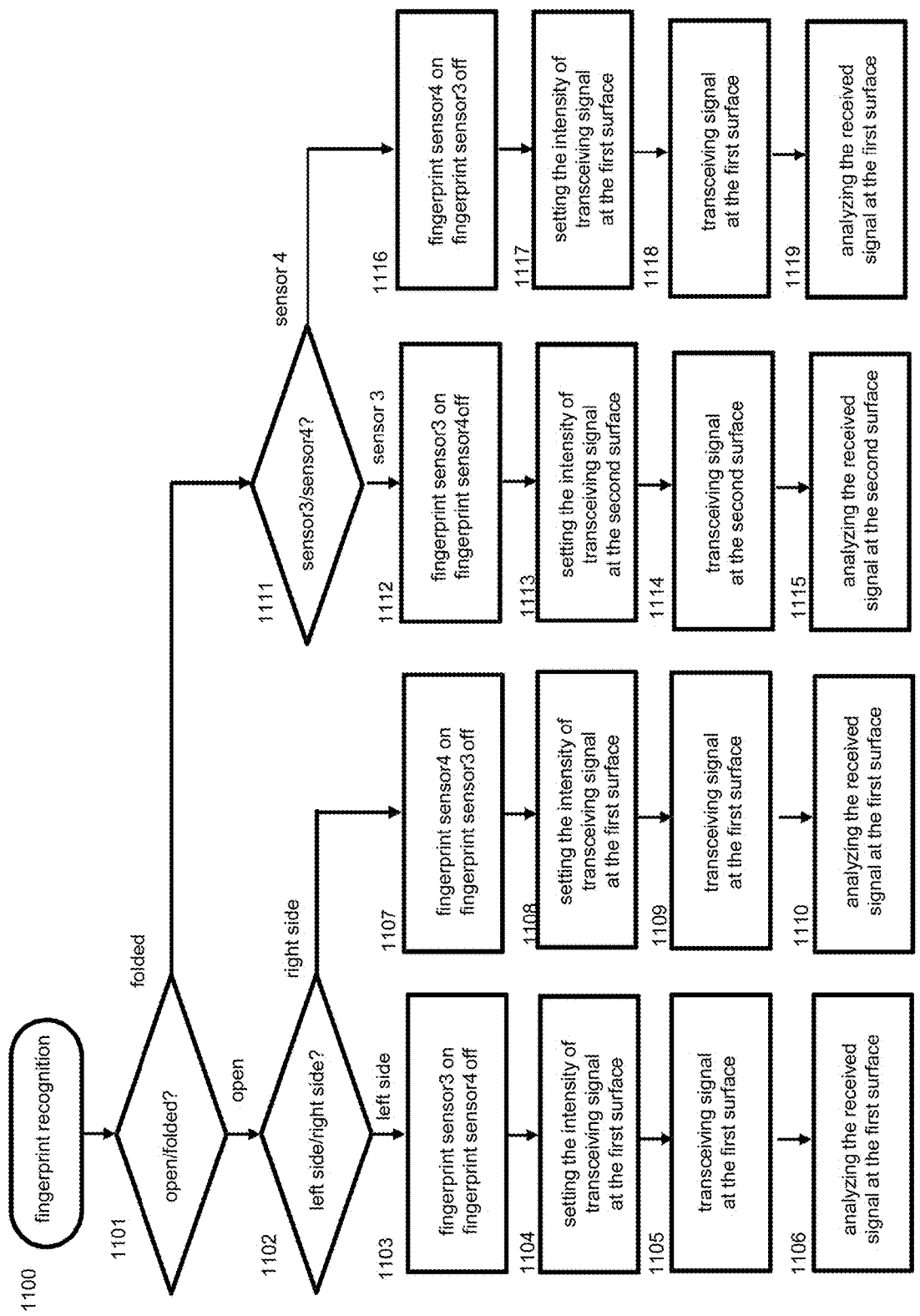
FIG. 11 illustrate fingerprint recognition method flowchart of foldable mobile phone according to various embodiments of the present.

FIG. 11 illustrates an embodiment of a fingerprint recognition method of a mobile phone according to an aspect of the present invention. In this embodiment, as shown in FIG. 10A, the fingerprint recognition sensor 3 is built into the left screen of the mobile phone and the fingerprint recognition sensor 4 is built into the right screen of the mobile phone, respectively, and the fingerprint recognition can be performed in both the folded state and the open state of the mobile phone. First, when a fingerprint recognition mode starts in step 1100, the process proceeds to step 1101 to determine whether the mobile phone is in an open state or a folded state. A judgment of the folded and open states of the mobile phone is determined by using a folding angle between the left and the right devices of the mobile phone detected by the folding angle sensor (not shown), if the folding angle is above a certain angle (for example, 90 degrees), it is determined as an open state, but if the folding angle is below the certain angle, it is determined as an folded state.

If it is determined in step 1101 that the device is in the open state, the process proceeds to step 1102 to determine whether to perform the fingerprint recognition on the left screen of the display 2 or the right screen thereof. This decision may vary depending on the application that requires the fingerprint recognition, but if the application does not require a location of the fingerprint recognition in particular, the device itself may take into account the past user's fingerprint usage pattern and the user's mobile phone holding status and so on.

If it is determined in step 1102 that the fingerprint recognition is to be performed through the left screen, the process proceeds to step 1103 and turns on the fingerprint recognition sensor 3 and keeps the fingerprint recognition sensor 4 in the OFF state. Thereafter, the process proceeds to step 1104 to set the intensity of the ultrasonic transceiving signal of the first surface of the fingerprint recognition sensor 3. Here, the first side is a side where the fingerprint recognition sensor 3 faces the user when the user looks at the display 2 in the open state of the mobile phone. When setting the intensity of the first side ultrasonic transceiving signal, all courses where ultrasonic signals starting from the first surface of the fingerprint recognition sensor 3 pass through the components constituting the display 2 and are reflected to the target to be inspected, and then again pass through the components constituting the display 2 to reach the first surface of the fingerprint recognition sensor 3, are considered to determine the intensity of the ultrasonic transceiving signal. After setting the intensity of the ultrasonic transceiving signal at the first surface in step 1104, the process proceeds to step 1105, where an ultrasonic signal transmission and reception is performed on the first surface. After that, the process proceeds to step 1106 to detect the fingerprint by analyzing the received signal at the first surface of the fingerprint sensor 3.

If it is determined in step 1102 that the mobile phone performs fingerprint recognition through the right screen, the process enters step 1107 and turns on the fingerprint recognition sensor 4 and maintains the OFF state of the fingerprint recognition sensor 3. After that, the process proceeds to step 1108 to set the intensity of the ultrasonic transceiving signal of the first surface of the fingerprint sensor 4. Here, the first surface is a surface of the fingerprint sensor 4 facing the user when the user looks at the display 2 in the open state of the mobile phone. When setting the intensity of the first side ultrasonic transceiving signal, all courses where ultrasonic signals starting from the first surface of the fingerprint recognition sensor 4 pass through the components constituting the display 2 and are reflected to the target to be inspected, and then again pass through the components constituting the display 2 to reach the first surface of the fingerprint recognition sensor 4, are considered to determine the intensity of the ultrasonic transceiving signal. After setting the intensity of the ultrasonic transceiving signal at the first surface in step 1108, the process proceeds to step 1109, where an ultrasonic signal transmission and reception is performed on the first surface. After that, the process proceeds to step 1110 to detect the fingerprint by analyzing the received signal at the first surface of the fingerprint sensor 4.

If it is determined in step 1101 that the mobile phone is in a folded state, the process proceeds to step 1111 to determine whether to use the fingerprint sensor 3 or the fingerprint sensor 4. If the fingerprint recognition sensor 3 is used, the process proceeds to step 1112 and the fingerprint sensor 3 is turned on and the fingerprint sensor 4 is turned off. Thereafter, the process proceeds to step 1113 to set the intensity of the ultrasonic transceiving signal of the second surface of the fingerprint recognition sensor 3. Here, the second surface represents a surface opposite to the first surface of the fingerprint recognition sensor 3 described above in the direction in which the fingerprint recognition sensor 3 faces the user when the user looks at the display 1 when mobile phone is in the folded state. When setting the intensity of the second side ultrasonic transceiving signal, all courses where ultrasonic signals starting from the first surface of the fingerprint recognition sensor 3 pass through the components constituting the display 1 and are reflected to the target to be inspected, and then again pass through the components constituting the display 1 to reach the second surface of the fingerprint recognition sensor 3, are considered to determine the intensity of the ultrasonic transceiving signal.

The setting of the intensity of the ultrasonic transceiving signal of the first and second surfaces of the fingerprint recognition sensor 3 may be different from each other because of the environment in which the ultrasonic signal from the first surface of the fingerprint recognition sensor 3 reaches the target to be inspected and the environment in which the ultrasonic signals starting from the second surface of the fingerprint recognition sensor 3 reaches the target to be inspected may be different. After setting the intensity of the second surface ultrasound transceiving signal in step 1113, the process proceeds to step 1114 where ultrasound signal transmission and receiving is performed at the second surface. After that, the process proceeds to step 1115 and the fingerprint is detected by analyzing the received signal on the second surface. In this case, since the first side reception signal of the fingerprint recognition sensor 3 in the open state of the mobile phone and the second side reception signal of the fingerprint recognition sensor 3 in the folded state of the mobile phone are opposite to each other in the left and right directions, it is analyzed by considering it in the analysis process.

If the fingerprint recognition sensor 4 is used in step 1111, the process enters step 1116 to turn on the fingerprint recognition sensor 4 and maintain the OFF state of the fingerprint recognition sensor 3. After that, the process proceeds to step 1117 to set the intensity of the ultrasonic transceiving signal of the first surface of the fingerprint recognition sensor 4. The first surface is a direction in which the fingerprint recognition sensor 4 faces the user when the user looks at the display 1 in the folded state of the mobile phone. When setting the intensity of the second side ultrasonic transceiving signal, all courses where ultrasonic signals starting from the first surface of the fingerprint recognition sensor 4 pass through the components constituting the display 1 and display 2 and are reflected to the target to be inspected, and then again pass through the components constituting the display 1 and display 2 to reach the second surface of the fingerprint recognition sensor 4, are considered to determine the intensity of the ultrasonic transceiving signal.

Compared to the intensity of the ultrasonic transceiving signal of the first surface of the fingerprint sensor 4 in the open state of the mobile phone described above, intensity of the ultrasonic transceiving signal of the first surface of the fingerprint recognition sensor 4 in the folded state of the mobile phone may be different. This is because the environment in which the ultrasonic signal reaches the target to be inspected in the open state of the mobile phone and the environment in which the ultrasonic signal reaches target to be inspected in the folded state of the mobile phone may be different from each other. After setting the intensity of the first surface ultrasound transceiving signal in step 1117, the process enters step 1118 and the ultrasound signal transmitting and receiving is performed at the first surface of the fingerprint recognition sensor 4. After that, the process proceeds to step 1119 to analyze the received signal on the first surface to detect the fingerprint. In this case, the first surface reception signal of the fingerprint recognition sensor 4 in the open state of the mobile phone and the first surface reception signal of the fingerprint recognition sensor 4 in the folded state of the mobile phone are the same in the left and right directions, thus it is considered during analysis process.

FIGS. 12A-12C illustrate the ultrasonic sensor arrangement and a gesture recognition operation of a mobile phone according to an aspect of the present invention. FIG. 12A shows a state in which an ultrasonic sensor 1 is arranged inside the left screen of the display 2 and a state in which an ultrasonic sensor 2 separate from the ultrasonic sensor 1 is arranged inside the right screen of the display 2. Therefore, in an open state of the mobile phone, it is possible to sense the user's gesture through both the display 2 the left and the right screens. FIG. 12B illustrates a situation in which the mobile phone disclosed in FIG. 12A is switched to a folded state. In the folded state of the mobile phone, the ultrasonic sensor 1 and the ultrasonic sensor 2 are overlapped, and as the ultrasonic sensor 2 disposed relatively close to the display 1, only the ultrasonic sensor 1 is activated to sense the user's gesture through the display 1.

FIG. 12C shows the ultrasonic sensor 1 and the ultrasonic sensor 2 being activated alternatively in the open state of the mobile phone about 90 degree, and placing the inspection object between the left and right screens of the display 2 as shown in the drawing. The ultrasound signals acquired by the sensor 1 and the ultrasonic sensor 2 may be used to obtain a three-dimensional gesture image of the object to be inspected. The reason why the activation between the two ultrasonic sensors is alternately divided by a time is to transmit and receive the ultrasonic signals at different times in order to avoid interference between the transmission and reception signals of the two ultrasonic sensors. An example of the object to be inspected may include a user's hand, and the three-dimensional ultrasound gesture image obtained may be used to control remotely connected machine (for example, a robot hand) through cloud.

Figure 13:
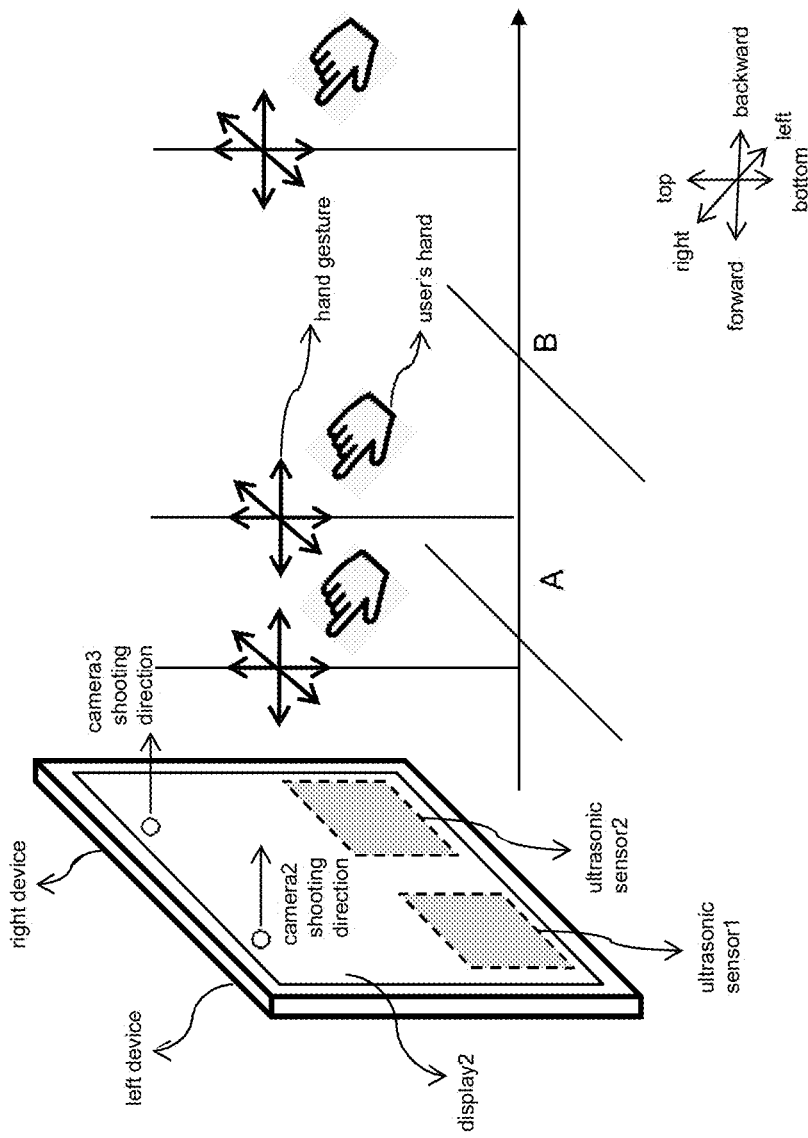
FIG. 13 illustrate gesture recognition by using both ultrasound image and camera image for the foldable mobile phone according to an embodiment of the present disclosure.

FIG. 13 is a description of a gesture recognition by using both an ultrasound image and a camera image according to an aspect of the present invention. As described above, when the user's gesture is recognized by using an ultrasonic sensor built in the mobile phone, as a distance between an ultrasonic sensor and the body part (for example, hand) of the user performing the gesture movement increases, it may be difficult to recognize a correct gesture through the ultrasonic sensor because a strength of a received signal is weakened. To compensate for this, when the user's hand moves away from the ultrasonic sensor for more than a certain distance, there is a situation where a gesture may be determined through the image taken by a camera embedded in the mobile phone, rather than the gesture recognition through the ultrasonic sensor.

To this end, as described in the drawings, when the user's hand is located within the first point A from the ultrasonic sensor, it is difficult to photograph the user's hand with the camera to perform the recognition of the user's gesture thus the only ultrasonic sensor can be used for the gesture recognition, but when the hand is located between the first point A and the second point B from the ultrasonic sensor, both the gesture recognition of the user using the ultrasonic sensor and the gesture recognition using the camera image may be used. In this case, the mobile phone may select any one of the gesture recognition results using the ultrasonic sensor and the gesture recognition result using the camera image with a consideration of a gesture recognition accuracy. In addition, when the user's hand is located at the second point B or more away from the ultrasonic sensor, the ultrasonic signal becomes too weak to recognize the user gesture, so that the user's gesture can be recognized only through the camera image. In this process, user's gesture recognition result is the same regardless of whether the ultrasonic image or the camera image is used, thus the user does not feel uncomfortable. It is also possible to use the both signals for helping to enhance the accuracy of the gesture recognition.

In addition, a gesture recognition using the ultrasonic sensor according to the present invention uses the ultrasonic sensor 1 and the ultrasonic sensor 2 embedded in the left screen and the right screen of the mobile phone, a gesture recognition using mobile phone camera images also uses cameras 2 and 3 embedded in the left and the right screens of the mobile phone, so it has the advantage of being able to three-dimensionally recognize the user's hand gestures not only up and down, left and right, but also forward and backward directions.

Figure 14A:
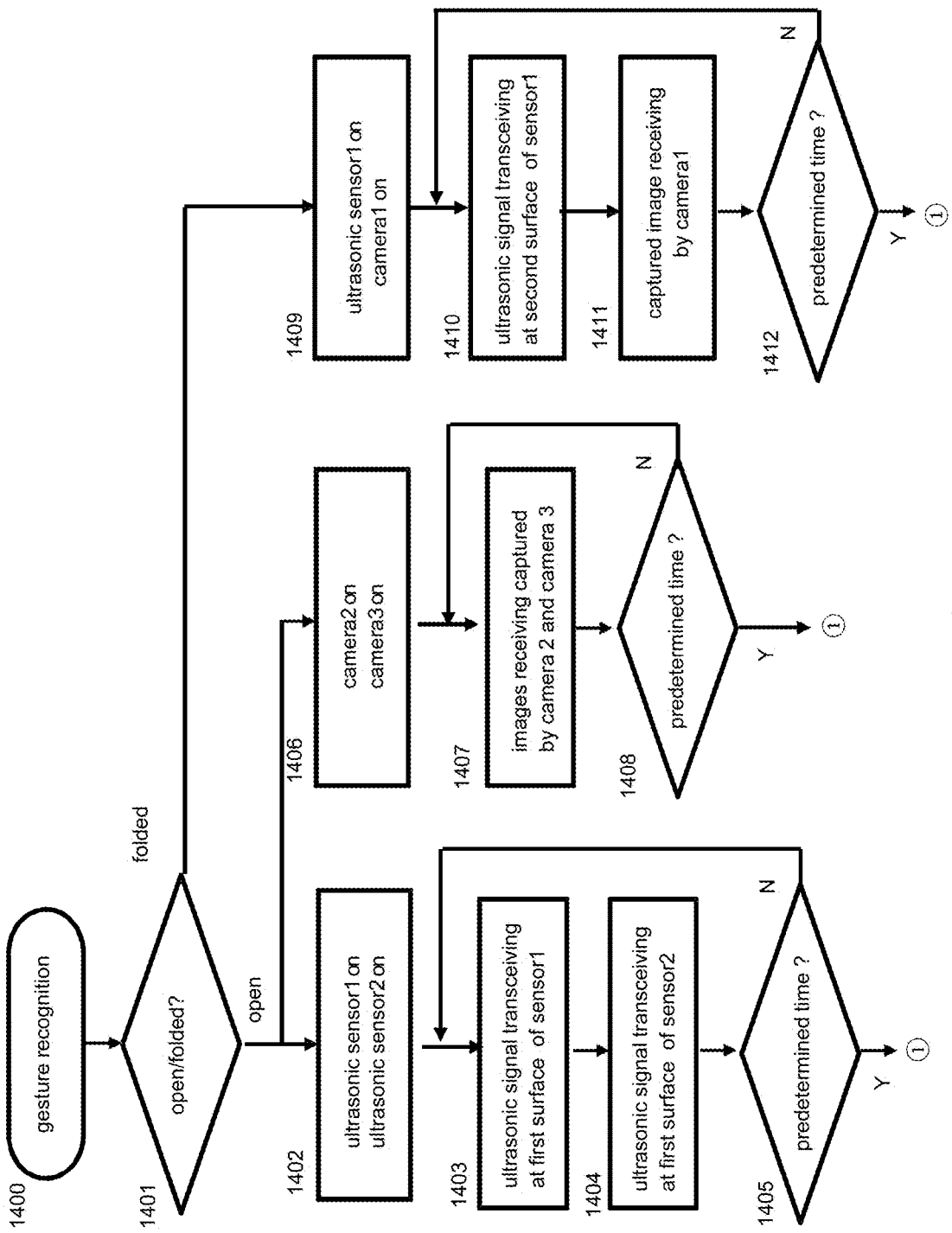
FIGS. 14A-14B illustrate ultrasonic gesture recognition method for the foldable mobile phone according to an embodiment of the present disclosure.
Figure 14B:
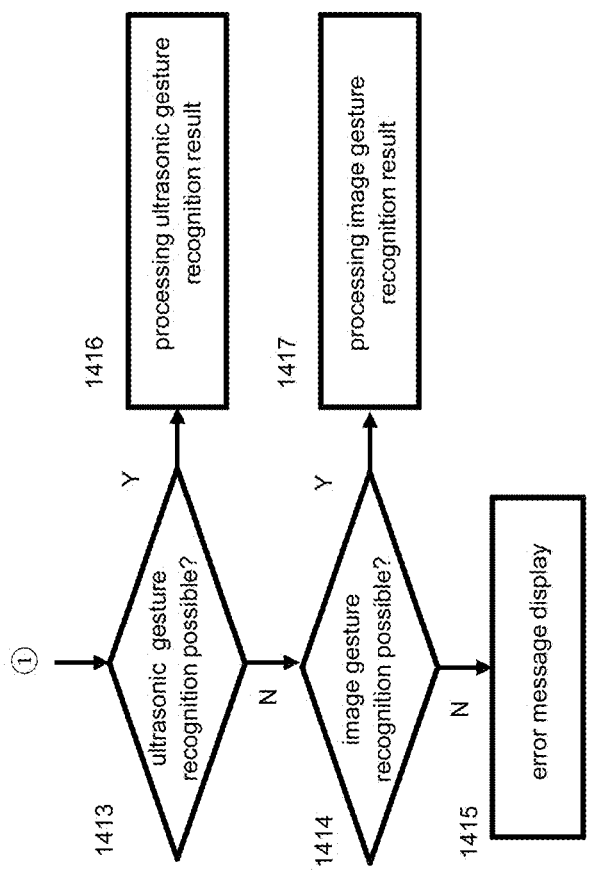

FIG. 14 is an embodiment of an ultrasonic gesture recognition method of a mobile phone according to the present invention. In this embodiment, as shown in FIG. 12A, an ultrasonic sensor 1 is embedded in the left device of the mobile phone and an ultrasonic sensor 2 is built in the right device, respectively, and the user gesture can be recognized in both the folded state and the open state of the mobile phone. First, when a gesture recognition mode is started in step 1400, the process proceeds to step 1401 to determine whether the mobile phone is in an open state or a folded state. A judgment of the folded and the open states of the mobile phone is made by using the folding angle between the left and right devices of the mobile phone detected by the folding angle sensor (not shown) by the CPU of the mobile phone, and if the folding angle is greater than a certain angle (for example, 90 degrees), it is determined as the open state, if the folding angle is less than the certain angle, it is determined as the folded state.

If it is determined in step 1401 that the mobile phone is in the open state, the process proceeds to the step 1402 and step 1406 simultaneously. In step 1402, both the ultrasonic sensor 1 and the ultrasonic sensor 2 are activated. Thereafter, the process proceeds to step 1403 to transmit and receive the ultrasonic signal on the first surface of the ultrasonic sensor 1. Here, the first surface is a side in which the ultrasonic sensor 1 faces the user when the user looks at the display 2 in the open state of the mobile phone. Thereafter, the process proceeds to step 1404 to transmit and receive the ultrasonic signal on the first surface of the ultrasonic sensor 2. Here, the first surface is also a direction in which the ultrasonic sensor 2 faces the user when the user looks at the display 2 in the open state of the mobile phone. In this case, the ultrasonic signal transmission and reception of the ultrasonic sensor 1 and the ultrasonic signal transmission and reception of the ultrasonic sensor 2 are alternately performed because when the ultrasonic signals are simultaneously transmitted and received by each ultrasonic sensor, they act as interference signals. Thereafter, the process proceeds to step 1405 and determines whether a predetermined time has elapsed. If the predetermined time has not elapsed, the process returns to step 1403. If a predetermined time elapses, the process proceeds to step 1413.

In addition, in step 1406, the camera 2 and the camera 3 are activated at the same time. Thereafter, the method proceeds to step 1407 to receive the images captured by the camera 2 and the camera 3 and enters step 1408 to determine whether a predetermined time has elapsed. If it is determined that the predetermined time has not elapsed, the process returns to step 1407. If the predetermined time has elapsed, the procedure proceeds to step 1413.

If it is determined in step 1401 that the mobile phone is in a folded state, it enters step 1409 and activates the ultrasonic sensor 1 and activates the camera 1. Thereafter, the process proceeds to step 1410 to transmit and receive the ultrasonic signal on the second surface of the ultrasonic sensor 1. Here, the second surface is a direction in which the ultrasonic sensor 1 faces the user when the user looks at the display 1 in the folded state of the mobile phone. Thereafter, the process proceeds to step 1411 to receive the captured image of the camera 1. Thereafter, the process proceeds to step 1412 to determine whether a predetermined time has elapsed. If a predetermined time has not elapsed, the process proceeds to step 1410.

In step 1413, it is first determined whether gesture recognition is possible by using a signal received through the ultrasonic sensor. If possible, the process proceeds to step 1416 and processes the gesture recognition result. If gesture recognition is not possible by using the signal received by the ultrasonic sensor in the step 1413, the process proceeds to step 1414 and determines whether the gesture recognition is possible by using the image signal photographed by the camera. If possible, the process proceeds to step 1417 to process the gesture recognition result. If the gesture recognition is not possible by using the image signal photographed by the camera in step 1414, the process may proceed to step 1415 to display an error message and allow the user to take another action.

FIGS. 15A-15C illustrate a speaker/a microphone arrangement and those operation at the mobile phone according to an aspect of the present invention. As shown in the drawing, the speaker 1 is disposed at the center of the top surface of the left device when the mobile phone is in the open state to output incoming sound in a call mode. Speaker 2 is located at the center of the top surface of the right device when the mobile phone is in the open state to output incoming sound in the call mode. The reason why the incoming sound outputted at the speaker 1 and speaker 2 at the same time is that the user can easily hear the other party's voice easily even if the position of the user's ear is located near the speaker 1 or near the speaker 2 or at the center of the two speakers.

However, in the folded state of the mobile phone, as the speaker 1 and the speaker 2 are located close to each other, and the speaker 1 is located closer to the user's ear, only the speaker 1 is activated to output incoming sound but the speaker 2 is deactivated during the call mode. In the open state of the mobile phone, the speaker 3 is arranged at the bottom surface of the left device to output multimedia audio, and the speaker 4 is arranged at the bottom surface of the right device to output the multimedia audio like the speaker 3. In this case, since the speaker 3 and the speaker 4 are spaced at a predetermined distance, a stereo audio can be realized by outputting a stereo left signal to the speaker 3 and a stereo right signal to the speaker 4. In the folded state of the mobile phone, as the speaker 3 and the speaker 4 are arranged close together, unlike with the open state, both the speaker 3 and the speaker 4 output a mono signal.

In the open state of the mobile phone, the microphone 1 is located at the center of the bottom surface of the left device and the microphone 2 is located at the center of the bottom surface of the right device to receive outgoing sound in a call mode. The reason for receiving outgoing sound at both the microphone 1 and the microphone 2 in the open state of the mobile phone is that the user's voice can be received easily even when the user's mouth is located near the microphone 1 or microphone 2 or in the center of both microphones in the call mode. In the folded state, however, the microphone 1 is located close to the microphone 2, and as the microphone 1 is closer to the user's mouth, only the microphone 1 is activated to receive user's voice and the microphone 2 is deactivated.

Figure 16A:
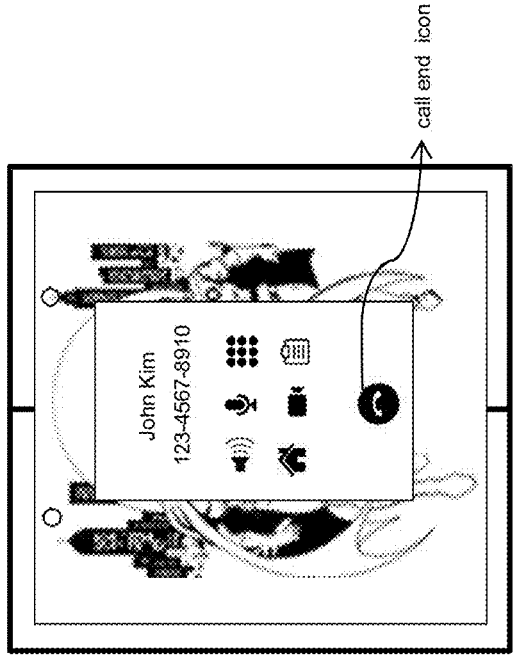
FIGS. 16A-16D illustrate call reception operation in the open state of the mobile phone for the foldable mobile phone according to various embodiments of the present disclosure.
Figure 16B:
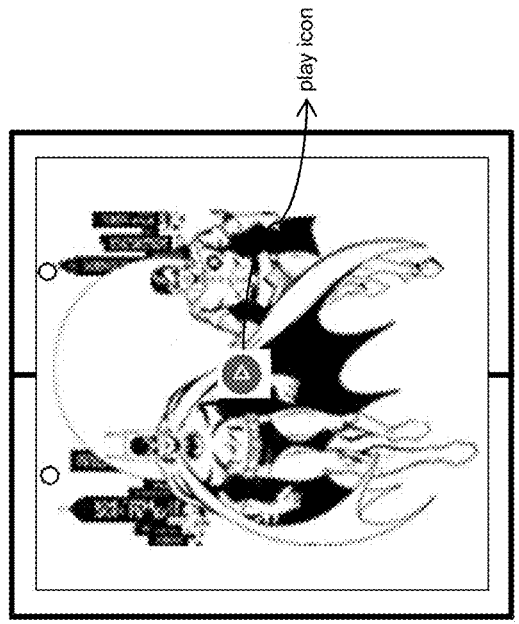

FIGS. 16A-16D illustrate the call reception operation in the open state of the mobile phone according to an aspect of the present invention. FIG. 16A illustrates a situation in which a call is received while playing a video on the opened screen. FIG. 16B, when the user slides a call reception icon to the right to answer a call, the screen is switched to the screen shown in FIG. 16B and the user performs a call with the other party. In this case, icons related to the call are placed in the center of the screen, and the video played before the call is paused and disposed behind the call-related icons.

Figure 16C:
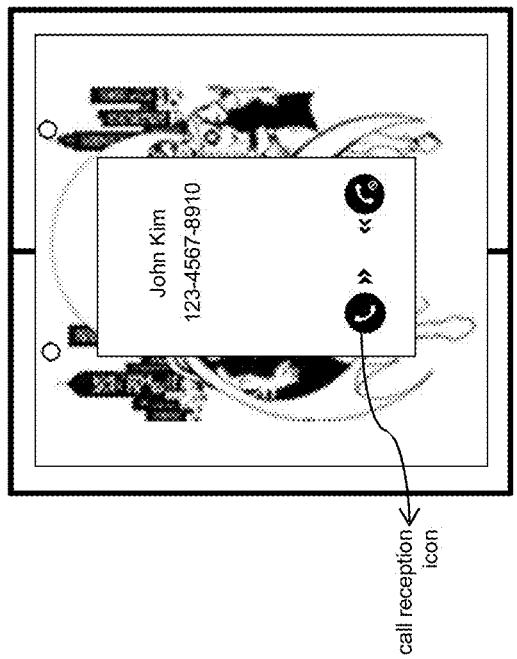

FIG. 16C is another screen that may be displayed when the user slides the call reception icon to the right to answer a call in FIG. 16A. The icons related to the call displayed on the left screen, and the video played before the call is displayed on the right screen. If the user slides the call end icon to end the call, the screen 16B or 16C screen is automatically switched to the screen 16D screen.

Figure 16D:
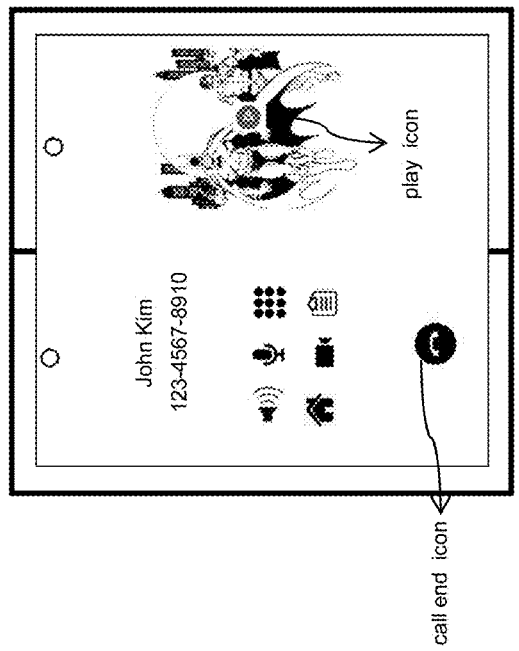

When the user presses the play icon on the screen of FIG. 16D, playback of the video which was stopped before the call is resumed. If the screen played before the call is a real-time broadcast video, the broadcast video during the call is stored in the memory of the mobile phone (not shown). If the user ends the call and presses the play button, the current broadcast video is stored the memory while displaying previously stored broadcast video during the call, thus the user can watch a whole broadcast video without any interruption.

Figure 17B:
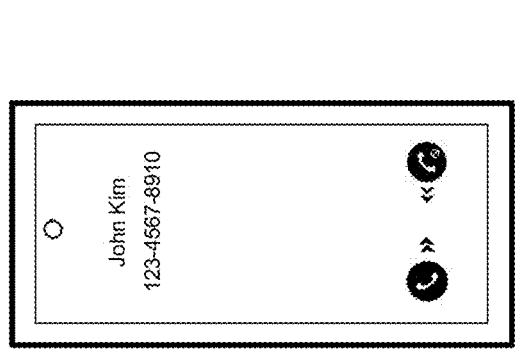
FIGS. 17A-17D illustrate call reception operation in the open state of the mobile phone for the foldable mobile phone according to various embodiments of the present disclosure.
Figure 17A:
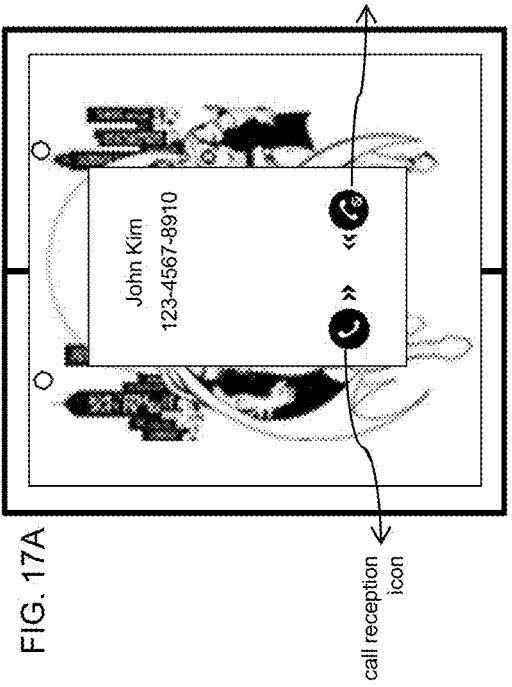
Figure 17D:
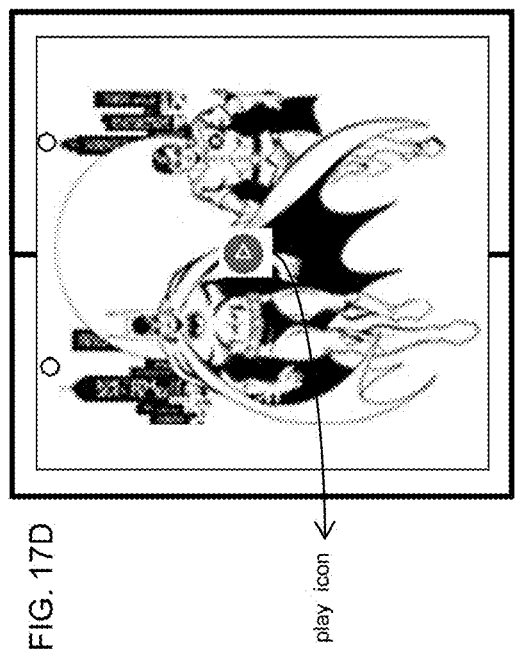
Figure 17C:
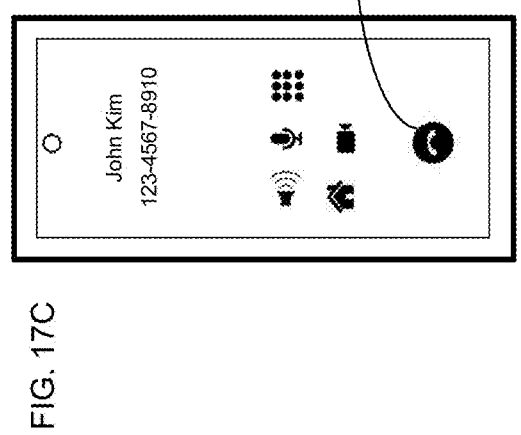

FIGS. 17A-17D are still another embodiment of the call reception operation in the open state of the mobile phone according to the present invention. FIG. 17A illustrates a situation where a call is received while a user plays a video in the open state of the mobile phone. In this case, when the user folds the mobile phone to the folded state, a screen as shown in FIG. 17B or 17C is displayed.

In FIG. 17B, both a call reception icon and a call rejection icon are displayed as the icons displayed on the screen of FIG. 17A, the user can select one of call reception and call rejection. On the other hand, in FIG. 17C, the mobile phone recognizes the folded state and automatically enters the call mode so that the user can talk immediately. If the user ends the call by pressing the call end icon and then switches the phone back to the open state. In FIG. 17D, the video screen displayed before the call is displayed with a play icon and if the play icon is pressed, previously stopped video resumes. If the screen played before the call is a real-time broadcast video, the broadcast video during the call is stored in the memory 282 of the mobile phone. When the user ends the call and presses the play icon, the current broadcast is stored in the memory while displaying previously stored broadcast video, thus user can watch whole broadcast video without any interruption.

Figure 18A:
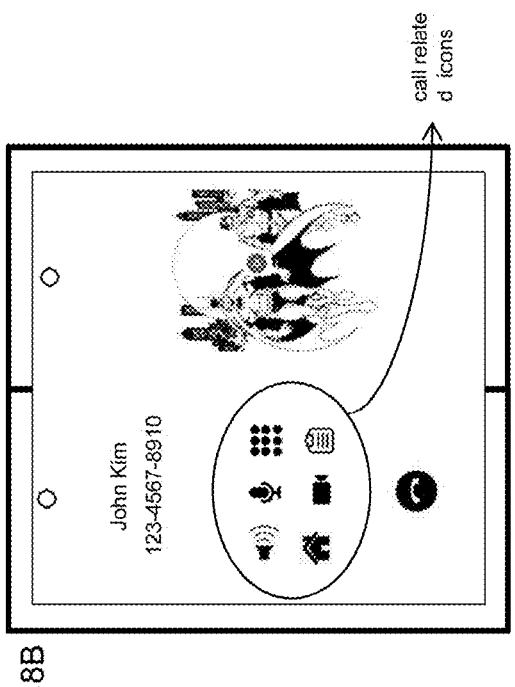
FIGS. 18A-18D illustrate call reception operation in the open state of the mobile phone for the foldable mobile phone according to various embodiments of the present disclosure.

FIGS. 18A-18D show another embodiment of a call reception operation in an open state of a mobile phone according to the present invention. FIG. 18A illustrates a situation in which a call is received while the user plays a video in the open state of the mobile phone. As in the above example, when the user slides call reception icon to the right, the mobile phone switches to the call state.

Figure 18B:
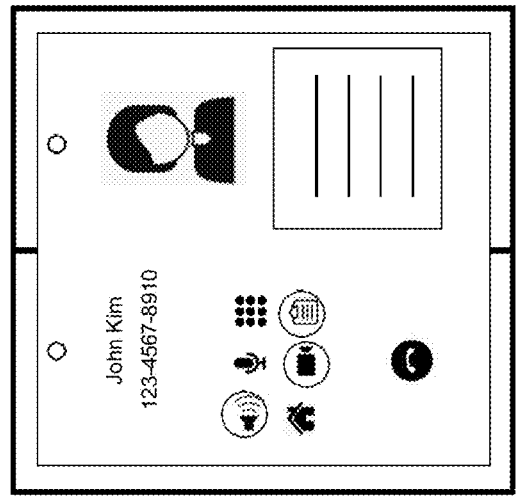
Figure 18C:
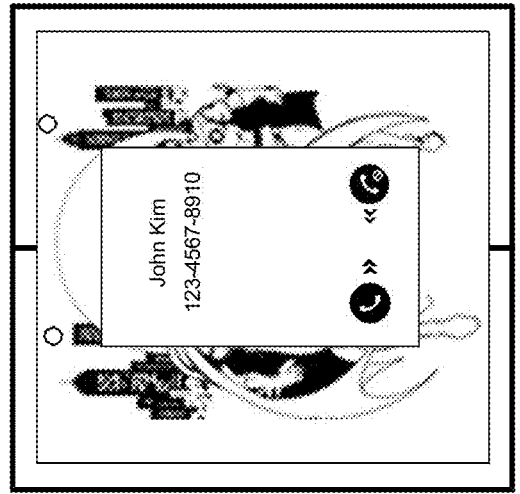

As shown in FIG. 18B, call-related icons are displayed on a divided left screen, and a video played before a call is displayed along with a play icon on a divided right screen. FIG. 18C illustrates a situation in which a user selects a speakerphone icon and a note icon among call-related icons in a call state. In this case, the user may write a memo about the necessary contents during the call by using a note pad, i.e., a memo window, displayed on the divided right screen while performing the call in the speakerphone mode (pen is not shown).

Figure 18D:
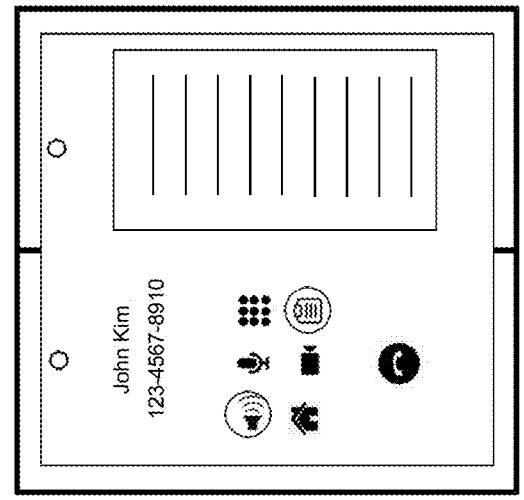

FIG. 18D illustrates a situation in which a user selects a speakerphone icon, a video call icon, and a note icon among call-related icons in a call state. In this case, a screen for notes is displayed at the bottom of the right screen in which the video is displayed at the top of the right screen while the user is in the speakerphone mode. That is, the screen is divided according to the number of call-related icons selected by the user when receiving a call, and the applications corresponding to the selected call-related icons are displayed on the divided screens, respectively.

Figure 19B:
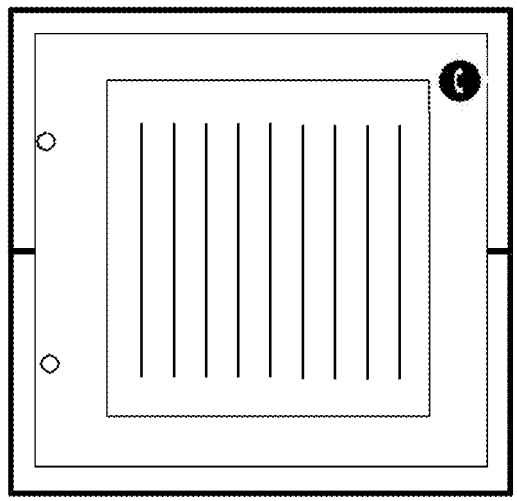
FIGS. 19A-19F illustrate call reception operation in a folded state of the mobile phone for the foldable mobile phone according to various embodiments of the present disclosure.
Figure 19C:
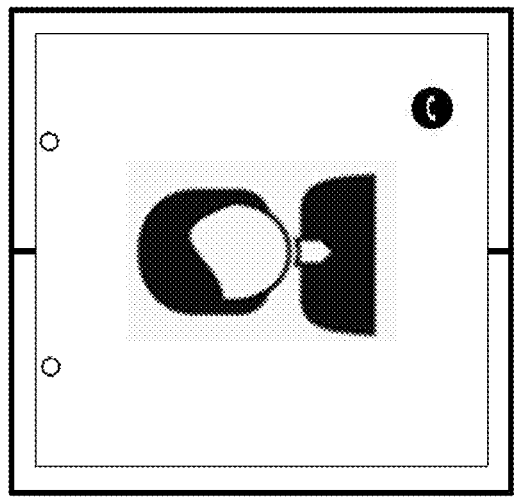
Figure 19E:
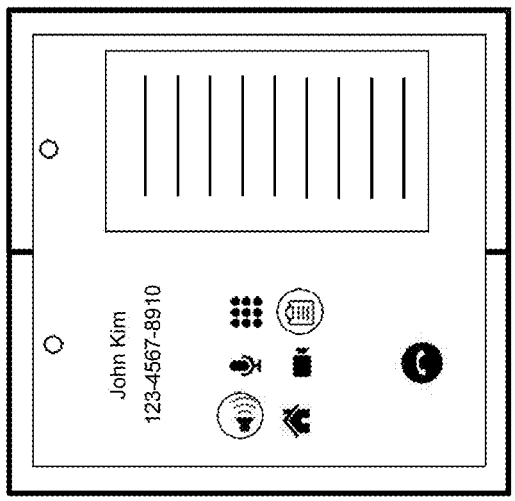
Figure 19F:
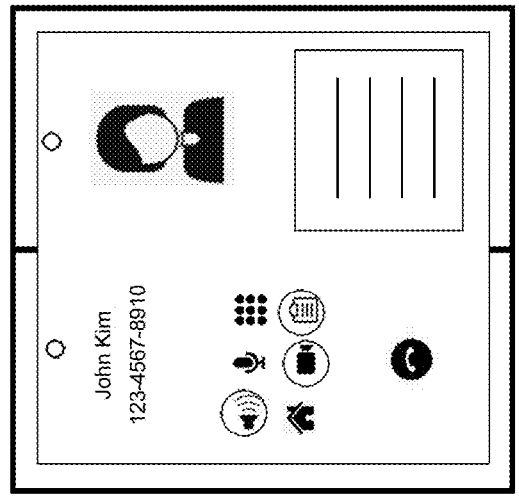
Figure 19A:
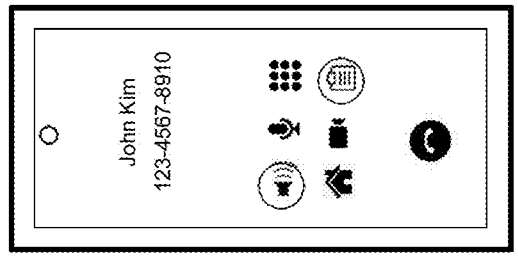
Figure 19D:
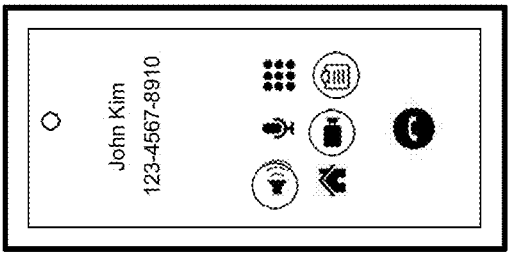

FIGS. 19A-19F illustrate a call reception operation in a folded state of a mobile phone according to an aspect of the present invention. FIG. 19A illustrates a situation in which a user selects a speakerphone icon and a memo icon among call-related icons when a call is received while the mobile phone is in a folded state. If the user switches the mobile phone to the open state from the situation described in FIG. 19A, screen is changed to display a note on the divided right screen thus the necessary contents can be written on the note screen while the mobile phone is operating in speakerphone mode. In this case, when the user presses the note displayed on the divided right screen, the note screen is enlarged to the entire screen as shown in FIG. 19D while the other party's voice can be continuously heard through the speaker. In addition, the screen of FIG. 19C may display the call end icon on a bottom portion of the screen to conveniently terminate the call.

As shown in FIG. 19D, when a call is received while the mobile phone is in a folded state, it shows a situation in which the user selects a speakerphone icon, a video call icon, and a memo icon among call-related icons. In this case, when the user switches the mobile phone to the open state, the screen displays a video call screen at the top of the divided right screen and a note screen at the bottom of the divided right screen while making a call in the speakerphone mode as shown in FIG. 19E. In addition, when the user long presses the divided video call screen, the video call screen is enlarged to the entire as shown in FIG. 19D. In this case, the call end icon is displayed on bottom of the entire screen, so that the user can conveniently terminate the call. That is, when the user selects a plurality of call-related icons when a call is received in the folded state and switches the mobile phone to the open state, the screen is divided according to the number of call-related icons selected by the user, and the each application corresponding to the selected call-related icon is displayed on the divided screen.

Figure 20A:
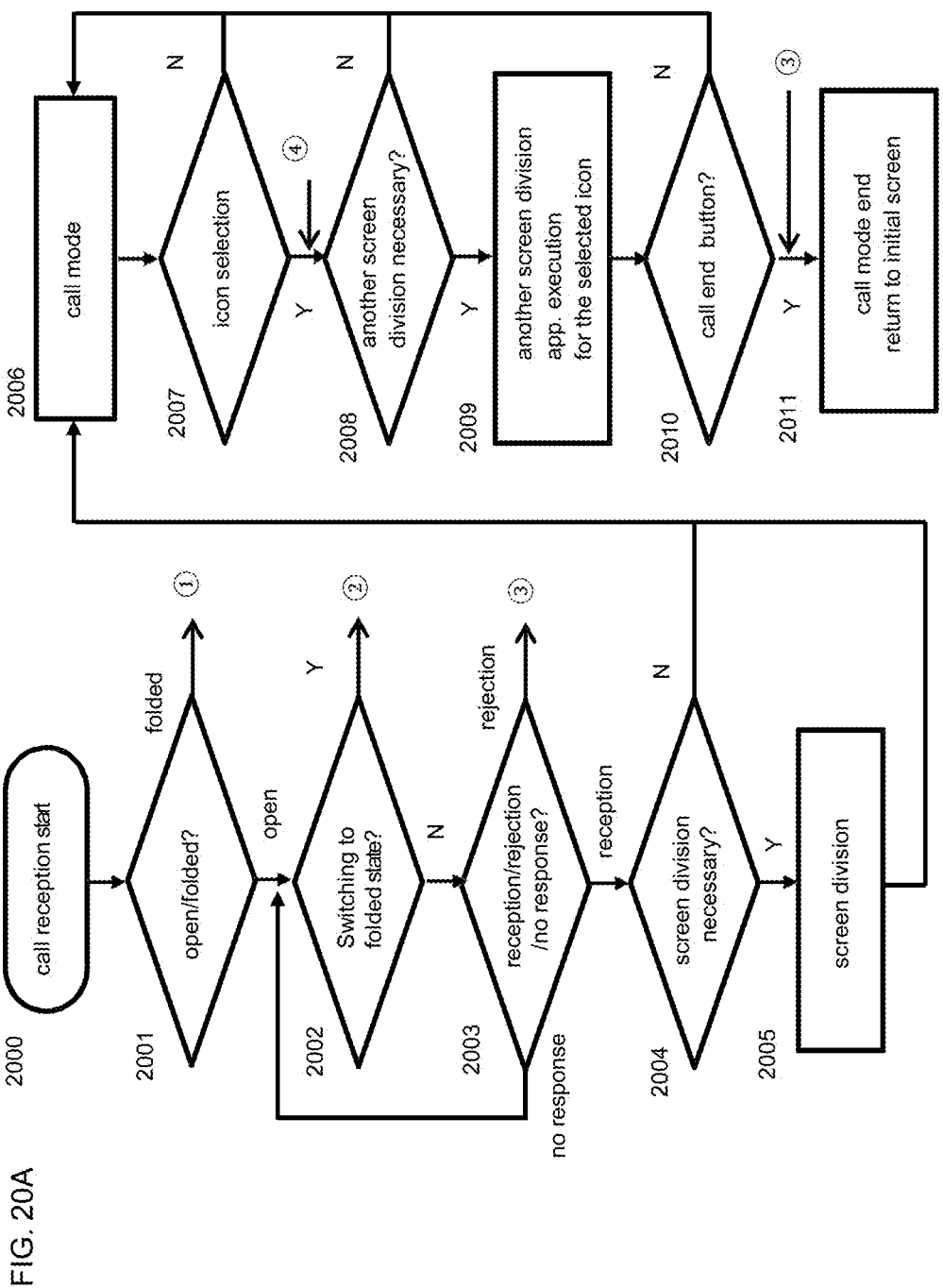
FIGS. 20A-20B illustrate user interface method in a call reception process for the foldable mobile phone according to an embodiment of the present disclosure.
Figure 20B:
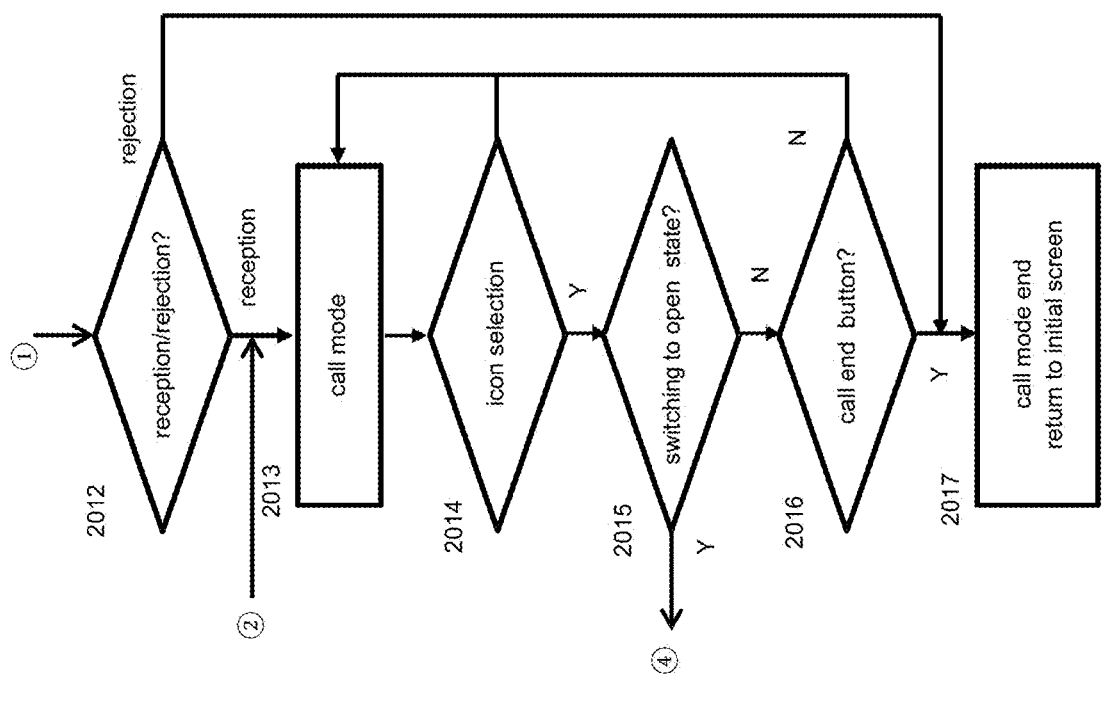

FIG. 20 is a view illustrating a user interface method in a call reception process in a mobile phone according to an aspect of the present invention. If a call is received in step 2000, the process enters 2001 and determines whether the mobile phone is in a folded state or an open state. The folded state and the open state of the mobile phone are determined by the CPU of the mobile phone, for example, using the folding angle between the left and right devices of the mobile phone detected by the folding angle sensor (not shown), and the folding angle is a certain angle (for example, 90 degree). If it is above the 90 degree, it is in the open state, and if it is below a certain angle, such as below 90 degree, it is determined as the folded state. If it is determined that the mobile phone is in the open state then process proceeds to the step 2002 to determine whether the mobile phone is switched from the open state to the folded state.

The transition to the folded state occurs when the user folds the phone to receive a call when the call is received in the open state. As described above, the CPU determines the transition from the open state to the folded state using the folding angle between the left and right devices of the mobile phone detected by the folding angle sensor (not shown), and the folding angle is a certain angle (for example, 90 degree). If there is a transition to the folded state, the process proceeds to step 2013 in which a call mode is automatically executed to make a call with the other party. If there is no transition to the folded state, the process proceeds to step 2003 to determine whether the user selects a reception of the call, a rejection of the call or does not respond to the received call.

If it is determined that there is no answer, the process proceeds to step 2002. If the call is rejected, the process returns to step 2011, and if the call is received, process proceeds to step 2004. In step 2004, screen division of the display 2 is performed according to a call reception. The screen division is performed by displaying the screen before the call reception in a portion of the display 2 (left screen or right screen) and displaying the call reception application in the remaining portion of the display 2. For example, when watching a movie before receiving the call, the movie screen may be displayed on the right screen in a pause state and the call receiving application may be displayed on the left screen. If it is determined in step 2004 that screen division is necessary, the process proceeds to step 2005 where the screen is divided and it is determined that the screen division is not necessary, the process immediately proceeds to step 2006 where the call mode is executed without screen division.

In the call mode, the user can exchange voices with the other party. Thereafter, the process proceeds to step 2007 while maintaining the call mode of the step 2006 and determines whether the user selects the call-related icon shown in FIG. 18. If the user selects a call-related icon, the process proceeds to step 2008 to determine whether additional screen division is necessary. If it is determined that additional screen division is not necessary, enter step 2006. If it is determined that additional screen division is needed, enter step 2009 to divide the screen further, and execute application of the selected call-related icon on the divided screen.

According to an aspect of the present invention, when a phone call signal is received, a holographic image may be displayed a first display or a second display and/or an additional display, which can display the holographic image thereon.

The avatar of the caller who called or metaverse contents of the caller may be displayed on a predetermined portion of the display if the caller is identified.

For example, when the user selects any one or more of a speaker phones, a video call, and a note icon among call-related icons in step 2007, two additional screens for executing a video call and note related application are generated. In case of speakerphone mode, as the speakerphone mode does not display additional contents on the screen, additional screen division is not required. After that, process proceeds to step 2010 to determine whether the user selects the call end icon. If the call end icon is not selected, process proceeds to the step 2006. If the call end icon is selected, process proceeds to the step 2011 to end the call mode and return to the previous initial screen. In this case, a play icon is displayed on the screen of the video that was watched before the call is received, and the video is configured to be played again according to the user's selection from the point when the call is received.

If it is determined in step 2001 that the mobile phone is in a folded state, it enters step 2012 as shown in FIG. 20 to determine whether the user receives or rejects the received call. If the user rejects the call, process proceeds to the following 2017 step, and if the user receives the call, process proceeds to the 2013 step to exchange voice with the caller. After that, while maintaining the call state, process proceeds to the step 2014 to determines whether the user has selected the call-related icons.

If the user does not select a call-related icon, the process proceeds to step 2013. If the user selects the call-related icon, the process proceeds to step 2015 to determine whether the user has switched to the open state. As described above, the CPU detect folding angle between the left and right devices of the mobile phone through the folding angle sensor (not shown) and determines whether the folding angle is greater than a certain angle (for example, 90 degrees) as described above. If yes, it is determined that it has been opened. If it is determined that the user has switched to the open state, the process proceeds to step 2008. If it is determined that the user has not switched to the open state, the process proceeds to step 2016 and determines whether there is an input of the call end icon. If it is determined that there is no input of the call end icon, the process returns to the step 2013. If there is an input of the call end icon, the process proceeds to step 2017 and terminates the call and returns to the initial screen before receiving the call.

FIGS. 21A-21F illustrate an operation of a battery low state of the mobile phone according to an aspect of the present invention. FIG. 21D illustrates a situation in which a warning message 1 regarding the battery residual information is displayed on the screen when the mobile phone is in the low state while the mobile phone is in a folded state. In this case, when the user switches the mobile phone to the open state, as shown in FIG. 21E, a right screen of the display is turned off. If the remaining battery level becomes more lower, as shown in FIG. 21C, not only the right screen but also the bottom portion of the left screen is also turned off. In other words, in order to cope with the battery low situation, the display divided into multiples region and each region is turned off step by step according to the remaining battery level to reduce the battery consumption. In addition, when the user presses a predetermined button or requests a voice command to check the battery residual information, the battery residual information is displayed on the screen as shown in FIG. 21A. The battery residual information is displayed differently according to the mobile phone's folding state and on/off region of the display.

Figure 22:
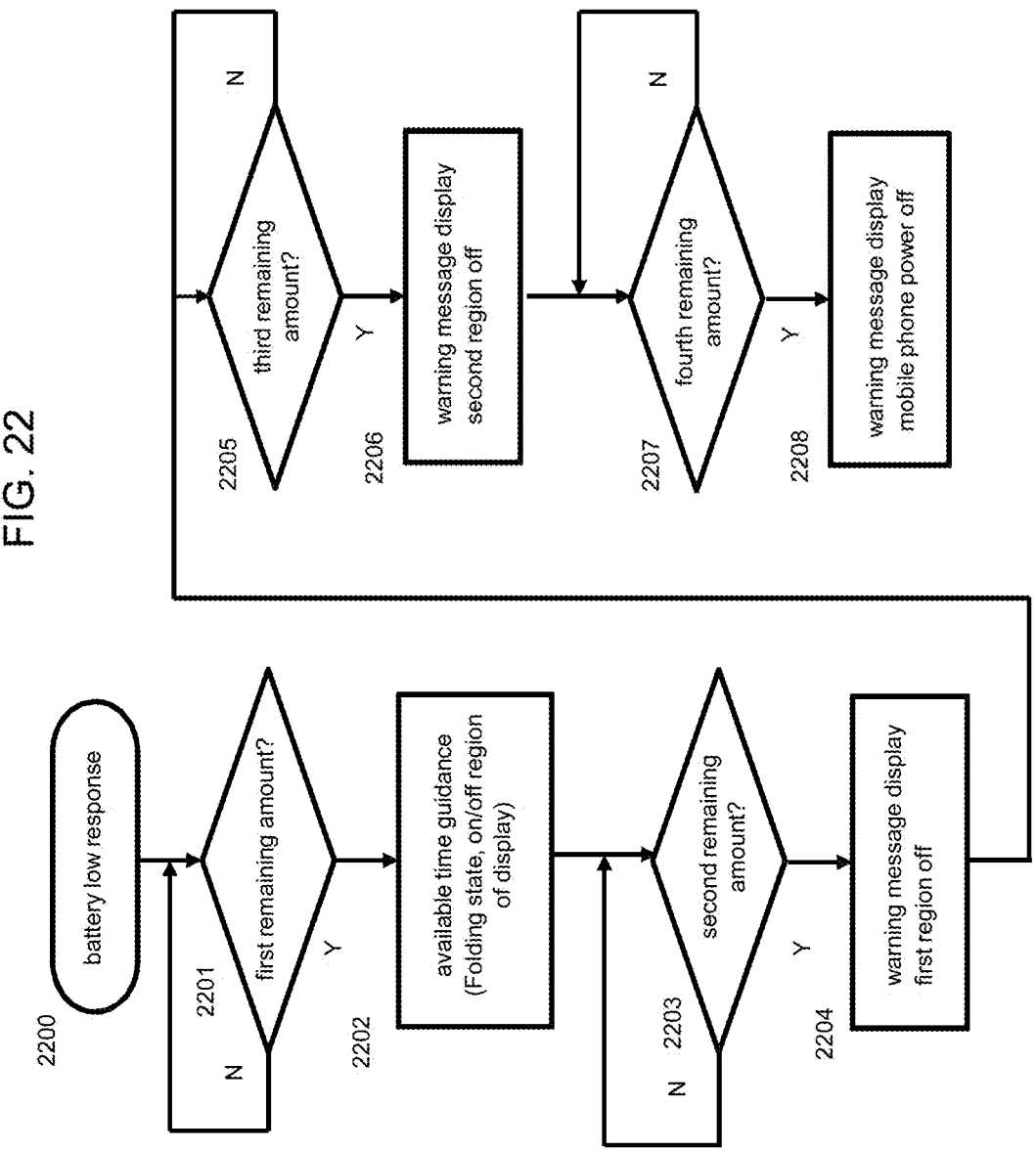
FIG. 22 illustrates flow chart for operation in the battery low state for the foldable mobile phone according to an embodiment of the present disclosure.

FIG. 22 illustrates an embodiment of a battery low response method according to the present invention. First, when the battery low response is started in step 2200, it enters step 2201 to determine whether the battery is the first remaining amount. If it is not the first remaining amount, the process returns to step 2201. If it is the first remaining amount, the process goes to step 2202 to guide available time which is displayed differently according to the mobile phone's folding state and on/off region of the display. In step 2203, it is determined whether the battery is the second remaining amount. Here, the second residual amount indicates a residual amount lower than the first residual amount. If it is not the second remaining amount, the process returns to step 2203 and if it is the second remaining amount, a warning message is displayed, and the first region of the entire screen is turned off.

In step 2205, it is determined whether the battery is the third remaining amount. Herein, the third residual amount is lower than the second residual amount. If it is not the third remaining amount, the process returns to step 2205. If it is the third remaining amount, the process goes to step 2206 to display a warning message and to turn off the second region of the entire screen. Here, the second region represents a wider region than the first region. Thereafter, the process proceeds to step 2207 to determine whether the battery is the fourth remaining amount. Here, the fourth remaining amount is lower than the third remaining amount, indicating a remaining amount substantially close to zero. If it is not the fourth remaining amount, go back to step 2207. If it is the fourth remaining amount, go to step 2208 to display a warning message and turn off the mobile phone.

Figure 23:
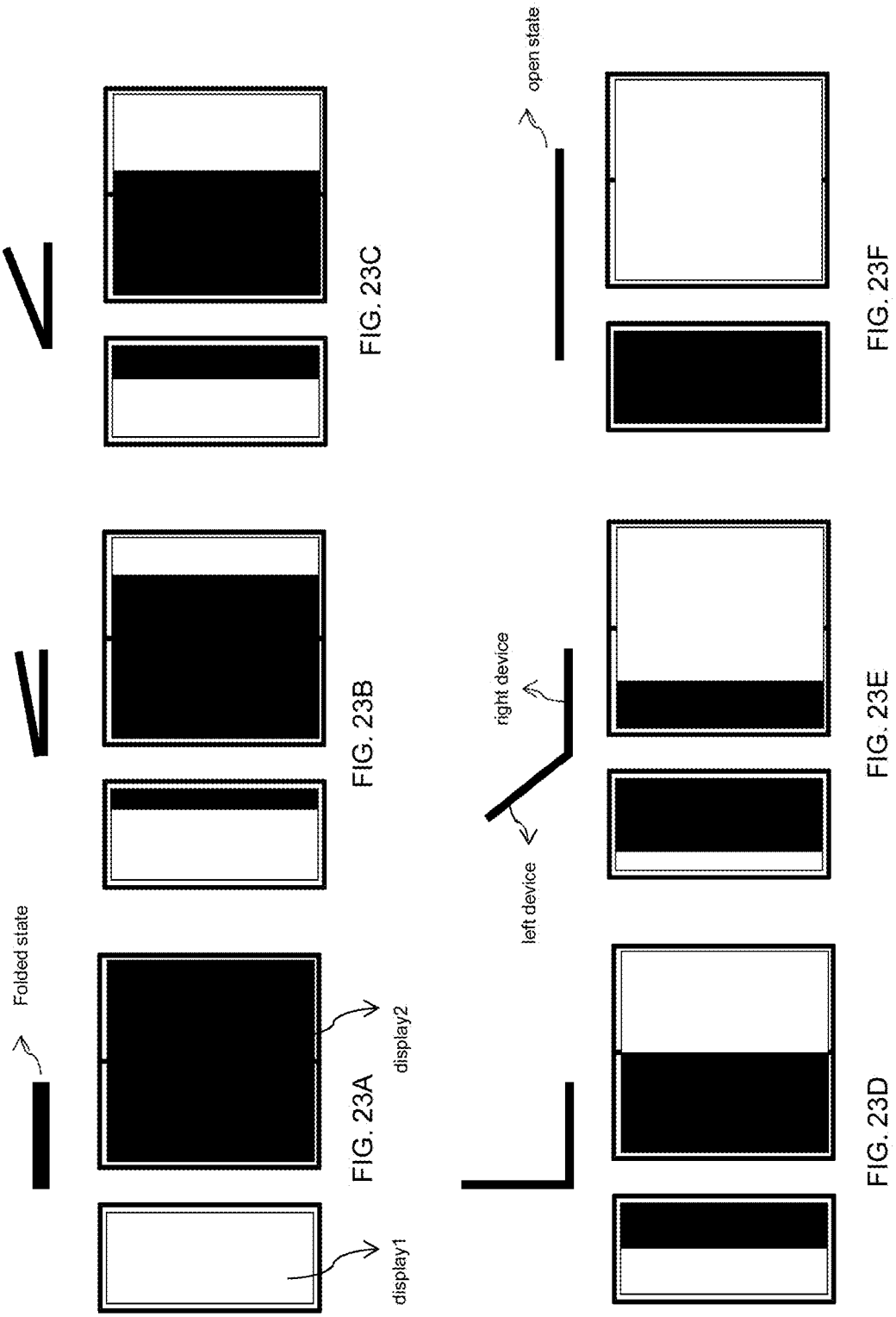
FIGS. 23A-23F illustrate display switching in a folding and opening process for the foldable mobile phone according to an embodiment of the present disclosure.

FIGS. 23A-23F illustrate display switching in a folding and opening process of a mobile phone according to the present invention. The upper part of each figure shows the folding degree between left device and the right device of the mobile phone, and the lower part of each figure shows the screen state of the display 1 according to the folding degree of the mobile phone. For example, FIG. 23A shows the on/off states of the display 1 and the display 2 when the mobile phone is in the folded state, and FIG. 23F shows the on/off states of the display 1 and the display 2 when the mobile phone is in the open state. FIG. 23A shows that the mobile phone is in the fully folded state, where entire region of the display 1 is on state and entire region of the display 2 is off state. In this case, if the user opens the mobile phone with the first angle (about 20 degree) as shown in FIG. 23B, the first region (right outermost region) of the display 1 is turned off and, on the other hand, the second region (right outmost region) of the display 2 is turned on simultaneously.

FIG. 23C illustrates a case in which the user opens the mobile phone wider from the state described in FIG. 23B with the second angle (about 45 degrees). In this case, as shown in FIG. 23C, the third region of the display 1 is turned off which is wider than the first region described in FIG. 23B, and the fourth region of the display 2 is also turned on simultaneously which is wider than the second region described in FIG. 23B. FIG. 23D illustrates a case in which the user opens the mobile phone wider from the state described in FIG. 23C with the third angle (about 90 degree). In this case, as shown in FIG. 23D, the fifth region which is about half of the display 1 and which is wider than the third region described in FIG. 23C is turned off and the sixth region of the display 2 which is about half of the display 2 and which is wider than the fourth region described in FIG. 23C is turned on simultaneously. FIG. 23E illustrates a case in which the user opens the mobile phone wider from the state described in FIG. 23D with the fourth angle (about 135 degrees). In this case, as shown in FIG. 23E, the seventh region of the display 1 which is most area of the display 1 and which is wider than the fifth region described in FIG. 23D is turned off, and the eighth region of the display 2 which is most area of the display 2 and which is wider than the sixth region described in FIG. 23D is turned on simultaneously.

FIG. 23F is in the fully open state, in which a case the display 1 is all off and the display 2 is all on, as shown in FIG. 23F. In this way, by controlling the on/off region for the display 1 and the display 2 sequentially according to the folding or the opening angle during the folding or the opening process, the user can have natural feeling of screen switching and cause the effect of battery saving. The above operation can be applied reversely during the switching from the open state to the folded state.

Figure 24:
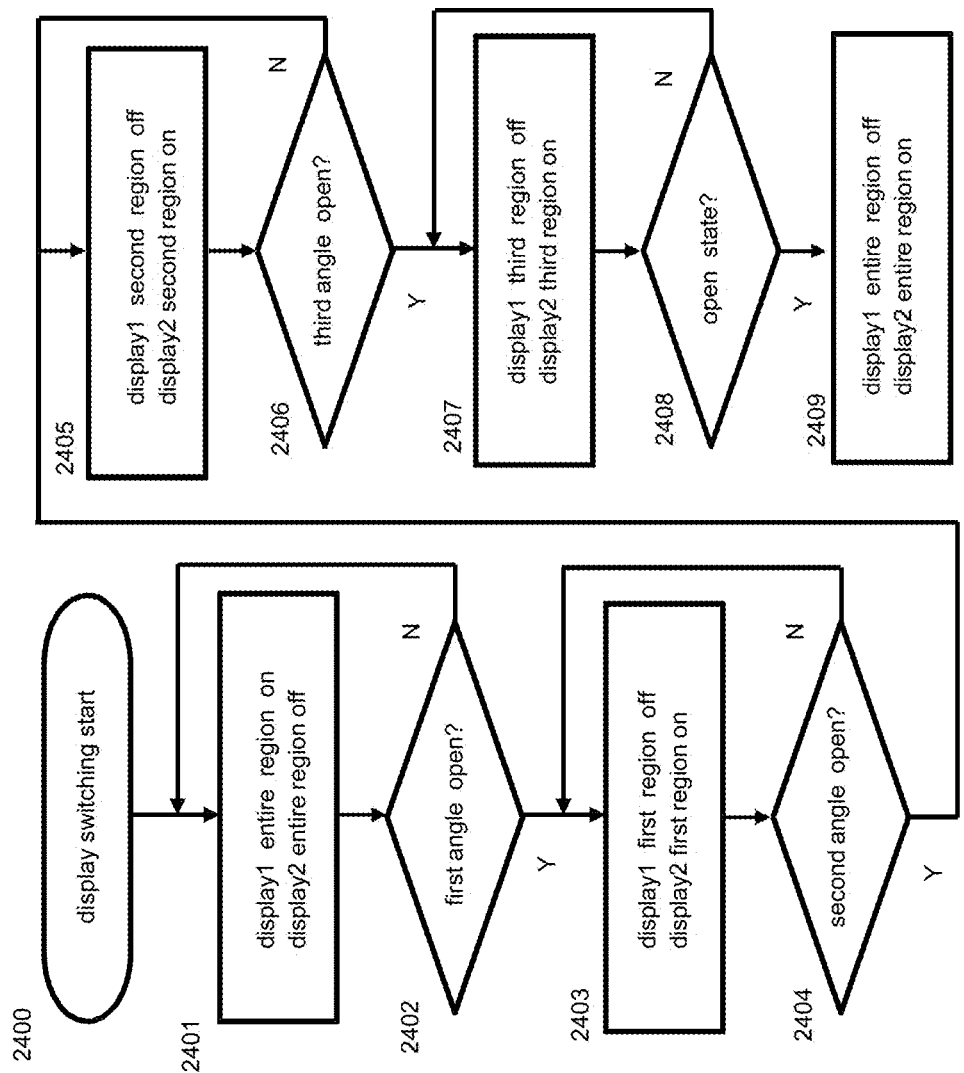
FIG. 24 illustrates display switching method of an opening process for the foldable mobile phone according to an embodiment of the present disclosure.

FIG. 24 illustrates a display switching method of an opening process of a mobile phone according to the present invention. Referring back to FIGS. 23A-23F when the display switching starts in step 2400, the display proceeds to step 2401 where the entire region of the display 1 is turned on and the entire region of the display 2 is turned off. In step 2401, the folding angle between the left device and the right device is about 0 degree. In this case, the folding angle is determined by measuring the angle between the left device and the right device of the mobile phone detected by the folding angle sensor (not shown) as described above.

In step 2402, it is determined whether the folding angle of the mobile phone is opened at the first angle (for example, about 30 degrees). If the determination result is no, the operation proceeds to step 2401, and if yes, the process goes to step 2403 to turn off the first region of the display 1 and to turn on the first region of the display 2. The first region of the display 1 is an area extended to the left by the first distance from the right edge of the entire screen when the user looks at the display 1, and the first distance does not exceed half of the total width of the display 1. The first region of the display 2 is an area extended to the left by the second distance from the right edge when the user looks at the display 2 and the second distance does not exceed half of the total width of the display 2. Although the width of the first region of the display 1 is smaller than the width of the first region of the display 2, the ratio of the first region in the display 1 is substantially the same as the ratio of the first region in the display 2.

Thereafter, the process proceeds to step 2404 to determine whether the folding angle of the mobile phone is opened at a second angle (for example, about 90 degree). If the determination result is no, the operation proceeds to step 2403, and if yes, the operation goes to step 2405, the second region of the display 1 is turned off, and the second region of the display 2 is turned on. Here, the second region of the display 1 is an area extended to the left by the third distance from the right edge when the user looks at the display 1, and the third distance occupies about half of the entire width of the display 1. In this case, the third distance of the display 1 is longer than the first distance of the display 1. The second region of the display 2 is an area extended to the left by the fourth distance from the right edge when the user looks at the display 2, and the fourth distance occupies about half of the total width of the display 2. In this case, the fourth distance of the display 2 is longer than the second distance of the display 2. Although the width of the second region of the display 1 is smaller than the width of the second region of the display 2, the ratio of the second region in the display 1 is substantially the same as the ratio of the second region in the display 2.

Thereafter, the process proceeds to step 2406 and determines whether the folding angle of the mobile phone is opened at a third angle (for example, about 120 degrees). If the determination result is no, the operation proceeds to step 2405, and if yes, the operation goes to step 2407 to turn off the third region of the display 1 and to turn on the third region of the display 2. Here, the third region of the display 1 is an area extended to the left by the fifth distance from the right edge of the entire screen when the user looks at the display 1, and the fifth distance exceeds half of the total width of the display 1. In this case, the fifth distance of the display 1 is longer than the third distance of the display 1. The third region of the display 2 is an area extended to the left by the sixth distance from the right edge when the user looks at the display 2, and the sixth distance exceeds half of the total width of the display 2.

In this case, the sixth distance of the display 2 is longer than the fourth distance of the display 2. Although the width of the three regions of the display 1 is smaller than the width of the third region of the display 2, the ratio of the third region in the display 1 is substantially the same as the ratio of the third region in the display 2. Thereafter, the process proceeds to step 2408 to determine whether the folding angle of the mobile phone is opened at a fourth angle (for example, about 180 degrees). If the determination result is no, the operation proceeds to step 2407. If yes, the operation proceeds to step 2409. The entire area of the display 1 is turned off and the entire area of the display 2 is turned on.

Figure 25:
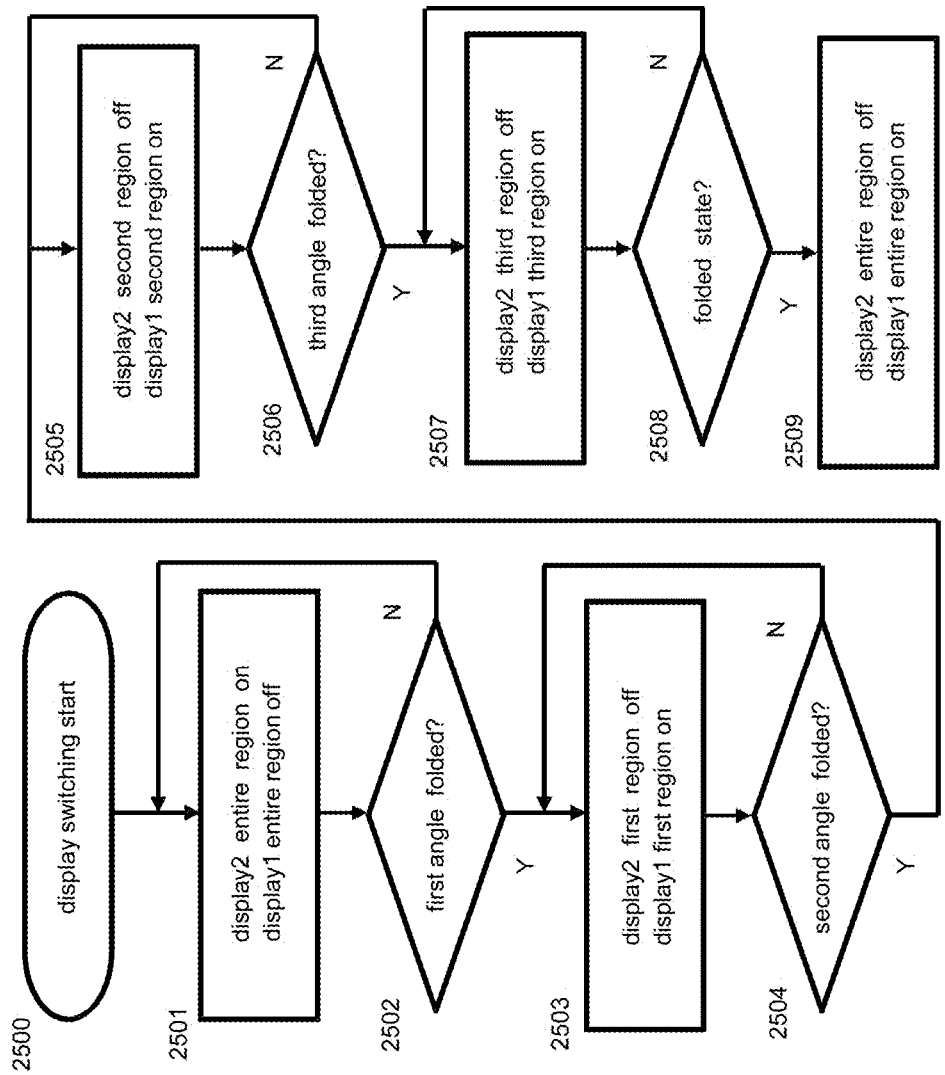
FIG. 25 illustrates display switching method of a folding process for the foldable mobile phone according to an embodiment of the present disclosure.

FIG. 25 is an embodiment of a display switching method of a folding process of a mobile phone according to the present invention. According to the present exemplary embodiment, when the display switching starts in step 2500, the display proceeds to step 2501 where the entire screen of the display 2 is turned on and the entire screen of the display 1 is turned off. In step 2501, the folding angle between the left device and the right device is about 180 degree. In this case, the folding angle is determined by measuring the angle between the left device and the right device of the mobile phone detected by the folding angle sensor (not shown) as described above. In step 2502, it is determined whether the folding angle of the mobile phone is folded to the first angle (for example, about 120 degrees). If the determination result is no, the operation proceeds to step 2501. If yes, the operation proceeds to step 2503. The first region of the display 2 is turned off and the first region of the display 1 is turned on.

The first region of the display 2 is an area extended to the right by the first distance from the left edge of the entire screen when the user looks at the display 1, and the first distance does not exceed half of the total width of the display 2. The first region of the display 1 is an area extended to the right by the second distance from the left edge when the user looks at the display 1, and the second distance does not exceed half of the total width of the display 1. The width of the first region of the display 2 is larger than that of the first region of the display 1, but the ratio of the first area in the display 2 is substantially the same as the ratio of the first area in the display 1.

In step 2504, it is determined whether the folding angle of the mobile phone is folded to the second angle (for example, about 90 degrees). If the determination result is no, the operation proceeds to step 2503. If yes, the operation proceeds to step 2505 to turn off the second region of the display 2 and to turn on the second region of the display 1. Here, the second region of the display 2 is an area extended to the right by the third distance from the left edge of the entire screen when the user looks at the display 2, and the third distance occupies about half of the total width of the display 2.

In this case, the third distance of the display 2 is longer than the first distance of the display 2. The second region of the display 1 is an area extended to the right by the fourth distance from the left edge when the user looks at the display 1, and the fourth distance occupies about half of the total width of the display 1. In this case, the fourth distance of the display 1 is longer than the second distance of the display 1. The width of the second region of the display 2 is greater than the width of the second region of the display 1, but the ratio of the second region in the display 2 is substantially the same as the ratio of the second region in the display 1

In step 2506, it is determined whether the folding angle of the mobile phone is folded to the third angle (for example, about 30 degrees). If the determination result is no, the operation proceeds to step 2505, and if yes, the operation goes to step 2507 to turn off the third region of the display 2 and turn on the third region of the display 1. Here, the third region of the display 2 is an area extended to the right by the fifth distance from the left edge of the entire screen when the user looks at the display 2, and the fifth distance exceeds half of the total width of the display 1.

In this case, the fifth distance of the display 2 is longer than the third distance of the display 2. The third region of the display 1 is an area extended by the sixth distance from the left edge to the right when the user looks at the display 1, and the sixth distance is more than half of the total width of the display 1.

In this case, the sixth distance of the display 1 is longer than the fourth distance of the display 1. The width of the third region of the display 2 is larger than that of the third region of the display 1, but the ratio of the third region in the display 2 is substantially the same as the ratio of the third region in the display 1. Thereafter, the process proceeds to step 2508 to determine whether the folding angle of the mobile phone is folded in a folded state (for example, about 0 degree). If the determination result is no, the process proceeds to step 2507. If yes, the process proceeds to step 2509 to turn off the entire area of the display 2 and to turn on the entire area of the display 1.

Figure 26:
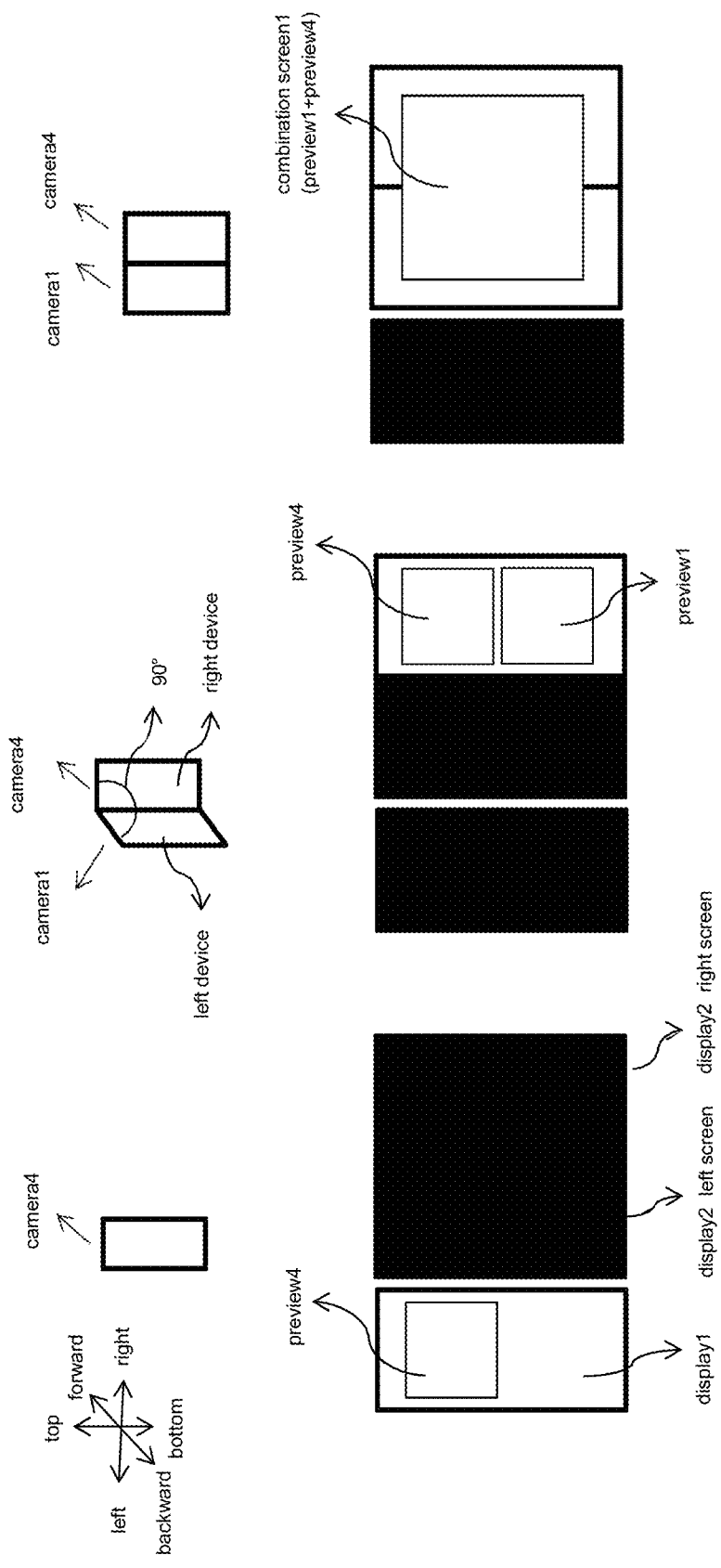
FIGS. 26A-26C illustrate screen display method in a process of changing from a folded state to an open state while photographing forward direction for the foldable mobile phone according to an embodiment of the present disclosure.

FIGS. 26A-26C illustrate screen display in a process of changing from a folded state to an open state when photographing forward direction through the camera of the mobile phone according to an aspect of the present invention. FIGS. 26A-26C illustrate a situation when a user changes the mobile phone from the folded state, while the camera 4 is taking a picture in the forward direction, to the open state. To maintain user's intention to take a picture in the forward direction, even in this situation of changing folding state, the camera 4 keeps its operation for taking a picture in the forward direction, in addition to that the camera 1 is also activated if the folding angle is open with a particular degree. An upper part of each figure represents the camera shooting direction according to the mobile phone's folding state, a left and lower part of the figure represents screen of display 1 according to the mobile phone's folding state and right and lower part of the figure represents screen of display 2 according to the mobile phone's folding state.

FIG. 26A illustrates a situation in which the forward direction of the mobile phone is photographed using the camera 4 in the folded state of the mobile phone and the captured image is displayed on the preview 4 of the display 1. In this case, the display 2 is turned off because the phone is folded. FIG. 26B shows that if the user opens the mobile phone at a predetermined angle (about 90 degrees) as shown in FIG. 26B, the camera 4 maintains its operation and moreover camera 1 is also activated to take a picture and all the images captured by camera 4 and the camera 1 are displayed on the right side of the display 2 through the preview 4 and the preview 1 respectively. In this case, the screen of the display 1 and the left screen of the display 2 are turned off because the user can see the of the left screen of the display 1.

FIG. 26C shows a state in which the mobile phone is completely switched to the open state. In this case, both images captured by the camera 1 and the camera 4 respectively are combined into the combination screen 1. The above process was described in the process of switching from the folded state to the open state when photographing forward direction of the mobile phone. In the process of switching from the open state to the folded state, screens may be displayed in the opposite manner to the above description.

Figure 27:
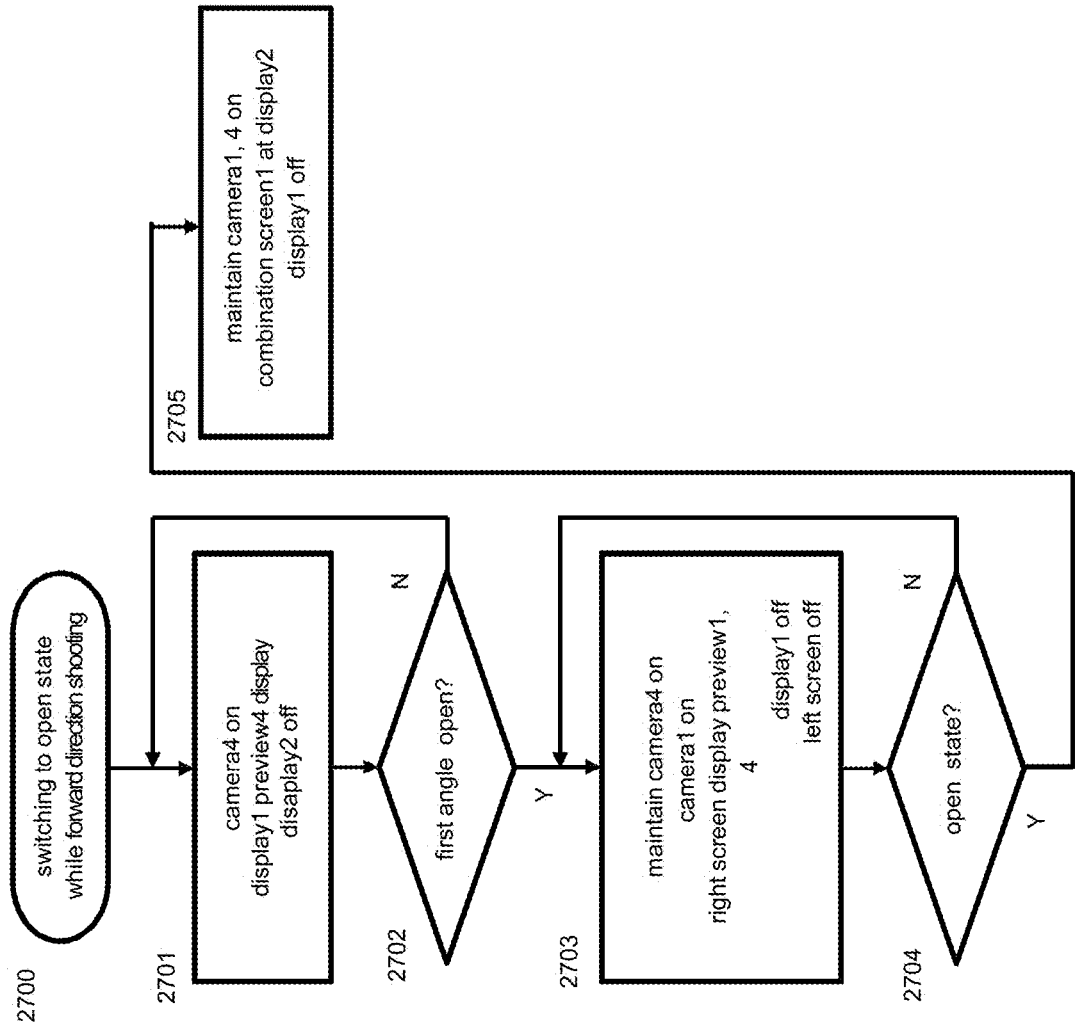
FIG. 27 illustrates screen display method in a process of changing from a folded state to an open state while photographing forward direction for the foldable mobile phone according to an embodiment of the present disclosure.

FIG. 27 illustrates a screen display method in the process of switching from folded state to the open state while photographing forward direction of the mobile phone according to the present invention. Referring back to FIGS. 26A-26C, at step 2700, switching from the folded state to the open state is started while the camera 4 photographs a forward direction of the mobile phone and at step 2701, the camera 4 photographs a forward direction of the mobile phone and the preview 4 is displayed on the display 1 while the display 2 is off. In step 2702, it is determined whether the folding angle of the left device and the right device of the mobile phone is opened at a first angle (for example, about 90 degree). If the determination result is no, the process proceeds to step 2701, and if yes, it proceeds to step 2703.

In step 2703, the camera 1 is further turned on while the camera 4 maintain photographing. In this case, the preview 1 and the preview 4 are separately displayed on the right screen of the display 2, the display 1 is turned off, and the left screen of the display 2 is kept off. Thereafter, the process proceeds to step 2704 to determine whether the mobile phone is open. In this case, when the folding angle of the left device and right device of the mobile phone is about 180 degree, it is determined as the mobile phone is open. If the determination result is no, enter step 2703, and if yes, process proceeds to step 2705 to maintain the on state of the camera 1 and the camera 4, and display the combination screen 1 which is the combination image of the photographing results of camera 1 and camera 4 on the display 2.

Figure 28:
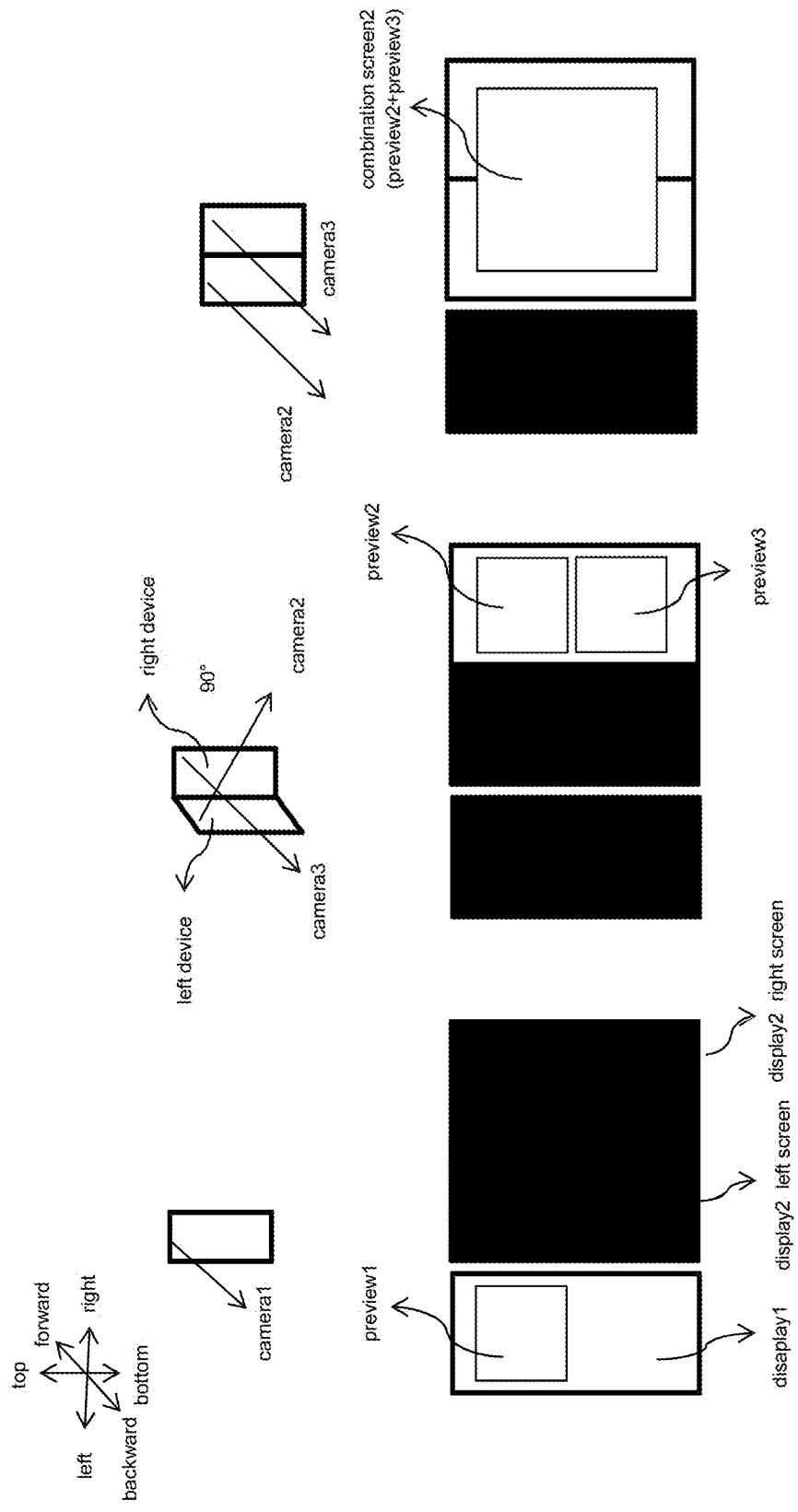
FIGS. 28A-28C illustrates screen display method in a process of changing from a folded state to an open state while photographing back forward direction for the foldable mobile phone according to an embodiment of the present disclosure.

FIGS. 28A-28C illustrate a screen display in a process of changing from a folded state to an open state while photographing backward direction through the camera of the mobile phone according to an aspect of the present invention. FIGS. 26A-26C illustrate situation when a user changes the mobile phone from the folded state, while a camera 1 is taking a picture in a forward direction, to the open state. To keep the maintain user's intention to take a picture in the backward direction, even in this situation of changing the folding state, the camera 1 keeps its operation for taking a picture in a backward direction until the folding angle between the left device and the right device is open to a certain angle and if a folding angle exceeds the certain angle, the camera 1 is turned off, instead the camera 2 and the camera 2 turned on to take a picture in the backward direction. An upper part of each figure represents the camera shooting direction according to the mobile phone's folding state, left and lower part of the figure represents screen of the display 1 according to the mobile phone's folding state and a right and lower part of the figure represents screen of the display 2 according to the mobile phone's folding state. FIG. 28A illustrates a situation in which the image obtained by the camera is displayed on the display 1 by photographing in the backward direction by using the camera 1 in the folded state of the mobile phone. In this case, the display 2 is turned off because the phone is folded.

If the user opens the mobile phone at a certain angle (about 90 degree) as shown in FIG. 28B, the camera 2 and the camera 3 are photographing in the backward direction and all images captured by the camera 2 and the camera 3 are displayed on the right screen of the display 2. In this case, a left screen of the display 2 and the display 1 are turned off because the user can't easily see the contents of the left screen of the display 2 and the display 1 when the folding angel between the left and right devices is opened about 90 degree as shown in FIG. 28B. FIG. 28C shows a state in which the mobile phone is completely switched to an open state. In this case, both images captured by the camera 2 and the camera 3 respectively are combined into the combination screen 2. The above process was described in a process of switching from a folded state to an open state when photographing a backward direction of the mobile phone. In the process of switching from the open state to the folded state, screen may be displayed in an opposite manner to the above description.

Figure 29:
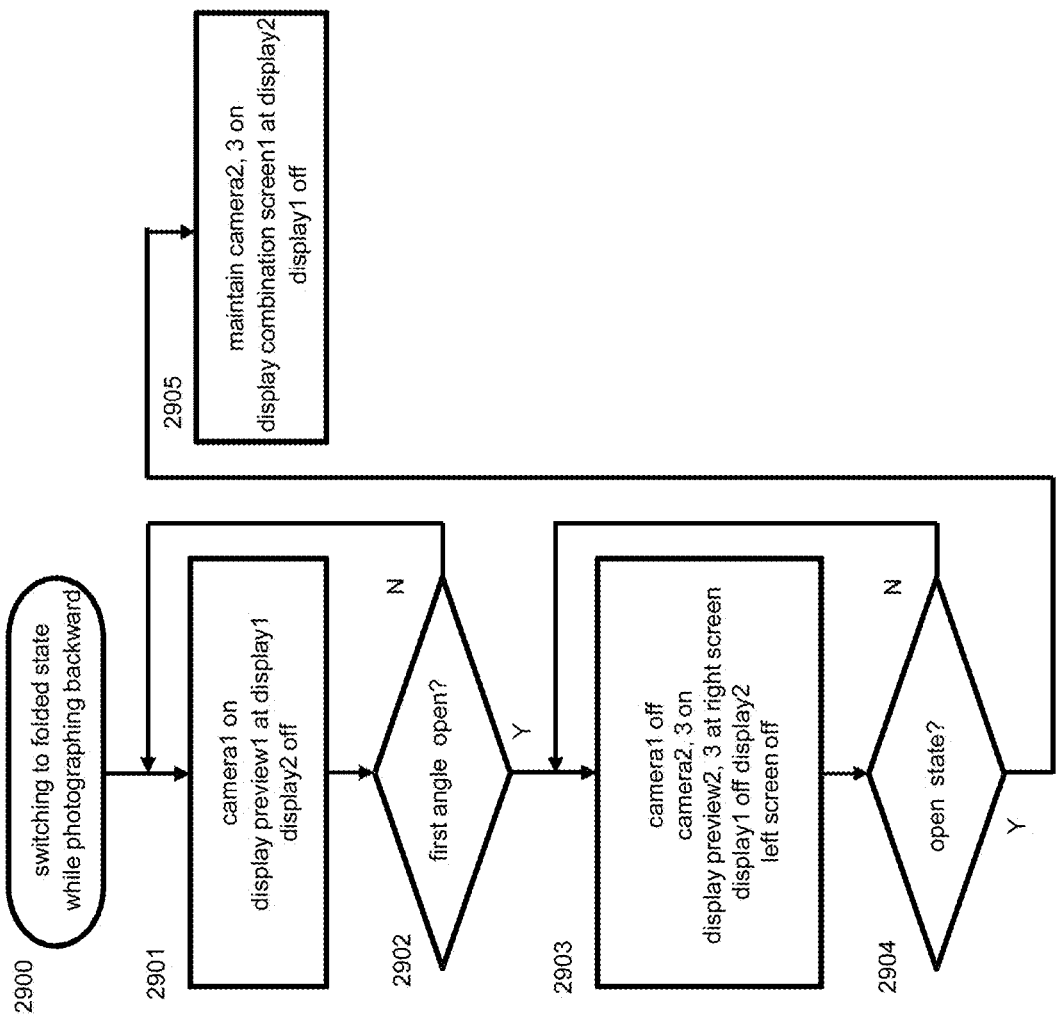
FIG. 29 illustrates flowchart for screen display method in a process of changing from a folded state to an open state while photographing back forward direction for the foldable mobile phone according to an embodiment of the present disclosure.

FIG. 29 illustrates a screen display method in a process of switching from an open state to a folded state while cameras are photographing in a backward direction of the mobile phone according to an aspect of the present invention. Referring to FIGS. 28A-28C, an opening operation of the mobile device is started while a camera 1 is photographing backward direction in step 2900. In step 2901, the camera 1 photographs backward direction of the mobile phone and the preview 1 is displayed on the display 1, and the display 2 is off. In step 2902, it is determined whether a folding angle of the left device and the right device of the mobile phone is opened at a first angle (for example, about 90 degree). If a determination result is no, the process proceeds to step 2901, and if yes, the process goes to step 2903.

In step 2903, the camera 1 is turned off and the camera 2 and the camera 3 are turned on. In this case, the preview 2, an image taking from the camera 2, and the preview 3, an image taking from the camera 3, are separately displayed on the right screen of the display 2, the display 1 is turned off, and the left screen of the display 2 is kept off. In step 2904, it is determined whether the mobile phone is in the open state. When the folding angle of the left and right devices of the mobile phone is about 180 degree, it is determined as an open. If the result of determination is no, enter step 2903, and if yes, enter step 2905 to keep the camera 2 and the camera 3 on, and display the combination screen 2 combining the images photographed by the camera 2 and the camera 3 on the display 2.

Figure 30:
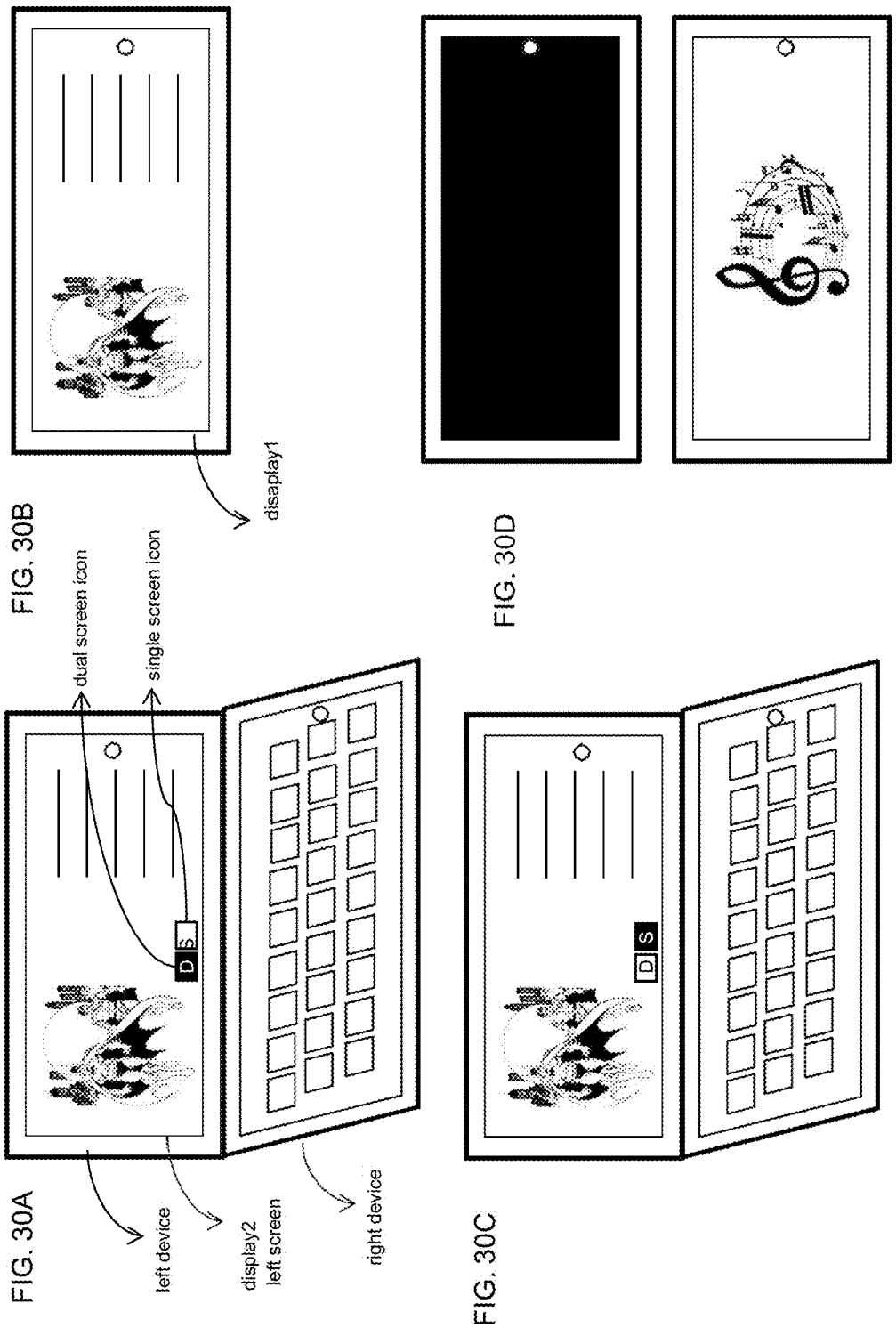
FIGS. 30A-30D illustrate dual display operation for the foldable mobile phone according to various embodiments of the present disclosure.

FIGS. 30A-30D illustrate a dual display operation of the mobile phone according to an aspect of the present invention. FIG. 30A illustrates a situation in which the left device and the right device of the mobile phone are folded about 90 degree and placed on the table. In this case, the screen viewed by a user displays a dual screen icon and a single screen icon as shown in FIG. 30A. When the user selects the dual screen icon, the other party located on an opposite side of the user with respect to the mobile phone looks at the screen having the same contents as the left screen of the display 2 shown in FIG. 30A through the display 1 as shown in FIG. 30B. In this way, the user of the mobile phone and the other party can communicate effectively through the different displays each other but having the same contents.

FIG. 30B illustrates a situation in which the user performs a memo function while watching a video through the left screen of the display 2 and the other party located opposite side of the user with respect to the mobile phone looks at the screen through the display 1 having the same contents as the left screen of the display 2. And even when the user take image through the camera, same photographing result is displayed at the different display at the same time thus the user and the other party can see the same contents. In this case, a separate personal area (not shown) may be set on the screen viewed by the user, thus the content that the user does not want to share with the other party may be displayed through the personal area.

FIG. 30C shows a situation where a user selects a single screen icon. In this case, the display 1 is turned off or a separately display the screen from the screen the screen of display 2. If the contents of the left screen of the display 2 is different from the screen of the display 1, the audio signal may be separately output for each screen.

Meanwhile, according to an exemplary embodiment of the present invention, an image captured by the camera 1 and/or the camera 4 may be simultaneously displayed on the display 1 and the display 2. In this case, when the user captures the other party using the cameras 1 and/or 4 in a camera photographing mode, the captured image is displayed on the display 2 and the display 1 simultaneously and it can be viewed by the user and the other party respectively thus it gives an advantage to the other party to see the photograph he is taken. In this case, the other party looking at the display 1 can control the camera shutter operation by a voice command or a gesture. If the other party utters the voice command or express the gesture, the actual shooting starts after a certain time (about 2 seconds) lapse, thus a person who is taken picture can have a time for the preferred posture or expression. In this case, the other party may select the camera photographing mode (for example, a portrait photographing mode, a night photographing mode, a 3D photographing mode) by using the voice command or the gesture.

Figure 31:
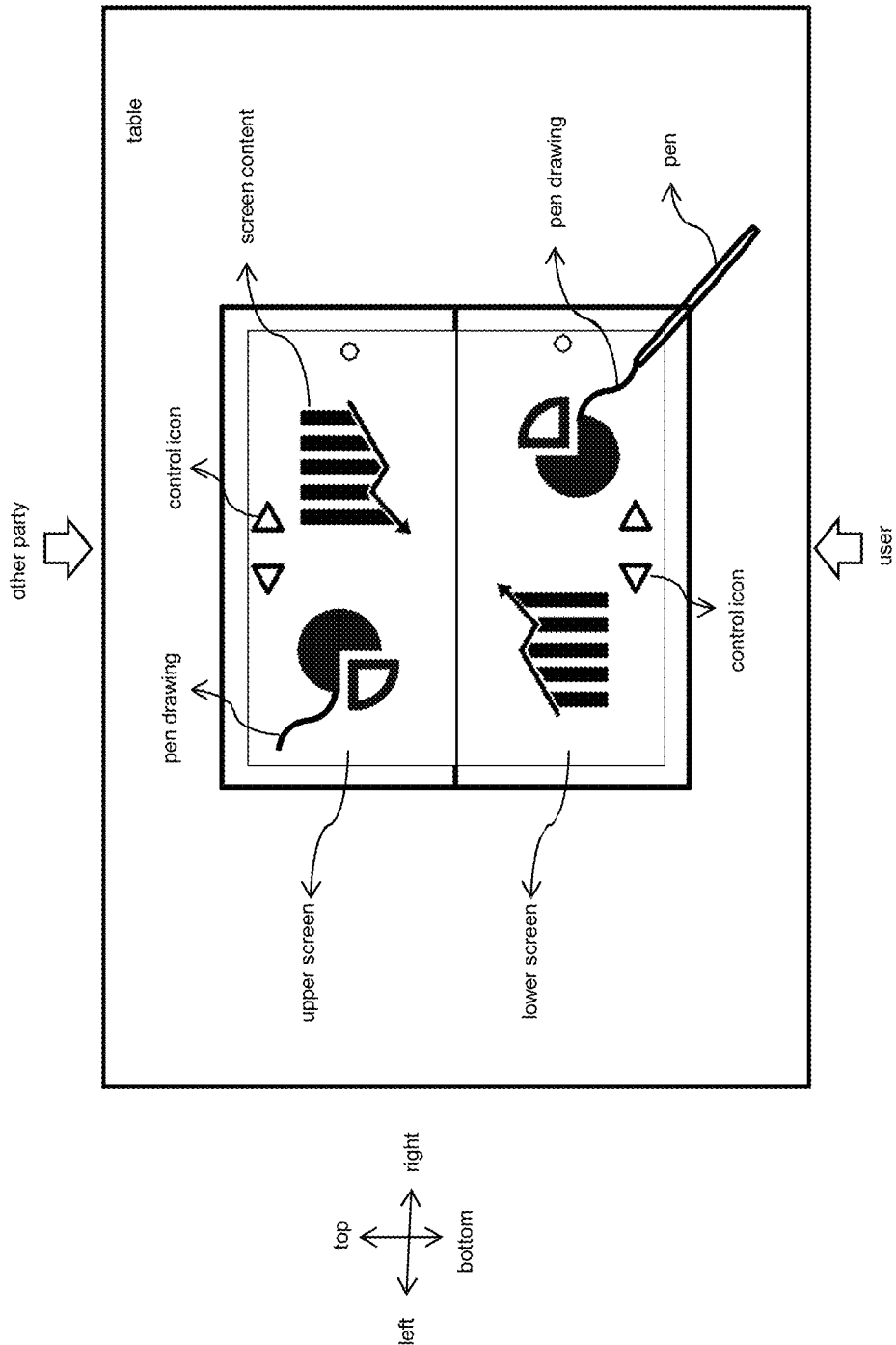
FIG. 31 illustrates presentation mode for the foldable mobile phone according to an embodiment of the present disclosure.

FIG. 31 shows a presentation mode of the mobile phone according to an aspect of the present invention. In the presentation mode of the mobile phone according to the present invention, the mobile phone is opened about 180 degree in an open state and placed on a flat surface such as a table. A display 2 is divided into the upper and the lower screens to display the same content at each of the divided the upper and the lower screens. When user look at the display 2, the content displayed at the upper scree and the lower screen has opposite direction each other in terms of an up and an down directions and a left and a right directions so that the user who see the lower screen and the other party who see the upper screen at the opposite side of the user see the same content with the same direction. In this case, the phone is extended 180 degrees so that the user or the other party can conveniently add a picture with a pen to explain, and the picture drawn with the pen is displayed on both the upper and the lower screens so that the user or the other party can easily understand the explanation. In addition, when the user or the other party changes the screen using the control icon displayed on the screen, the change is applied to both the upper screen and the lower screen simultaneously.

For example, when the user or the other party selects a next page, a previous page, and an enlarged (not shown) icon, a change in the screen corresponding to the icon is applied to both the upper and the lower screens. In addition, when an external event such as a call reception or an alarm occurs in the presentation mode, the content of the corresponding event may be displayed on both the upper and the lower screens or only one screen based on a predetermined criterion. The predetermined criterion may be an initial setting or user's last setting.

Figure 32:
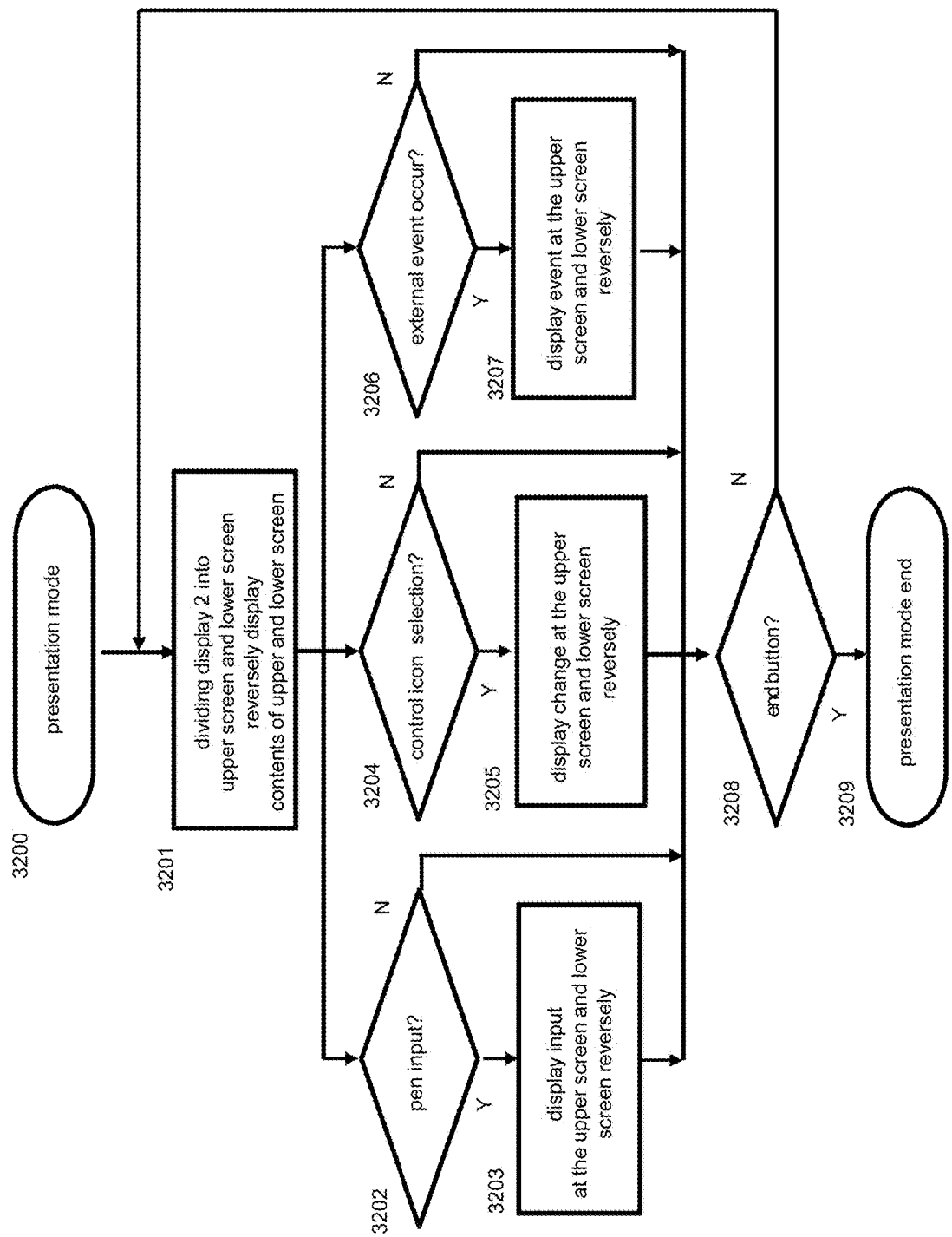
FIG. 32 illustrates a flowchart for presentation mode for the foldable mobile phone according to an embodiment of the present disclosure.

FIG. 32 illustrates a method of performing a presentation mode of a mobile phone according to an aspect of the present invention. Referring back to FIG. 31, first, when the presentation mode starts in step 3200, the process proceeds to step 3201 where a display 2 is divided into the upper and lower screens to display the same content at each of the divided upper and lower screens. Contents of the upper screen and lower screen are reverse each other with respect to the left-right direction and in up-down direction. Thereafter, the process proceeds to step 3202, 3204 and 3206 simultaneously. In step 3202, it is determined whether a pen input is present on one of the upper and the lower screens. If the result of the determination is no, the process proceeds to step 3208. If it is determined to be yes, the process proceeds to step 3203 where input content through the pen is displayed at the upper screen and lower screen reversely with respect to the up and the down directions and the left and the right directions, and the process proceeds to step 3208. In step 3204, it is determined which control icon is selected on one of the upper and the lower screens. If it is determined that the result is no, the process proceeds to step 3208, and if it is determined yes, the change is displayed on the top and bottom screen reversely with respect to the up and the down directions and the left and the right directions. In step 3206, it is determined whether an external event has occurred. If it is determined to be no, the process proceeds to step 3208. If it is determined to be yes, the event contents are displayed on the top and the bottom screens reversely with respect to the up and the down directions and the left and the right directions, and the process proceeds to step 3208. In step 3208, it is determined whether an end button (not shown) is selected. If no, enter step 3201; if yes, enter step 3209 to end the presentation mode.

Figure 33B:
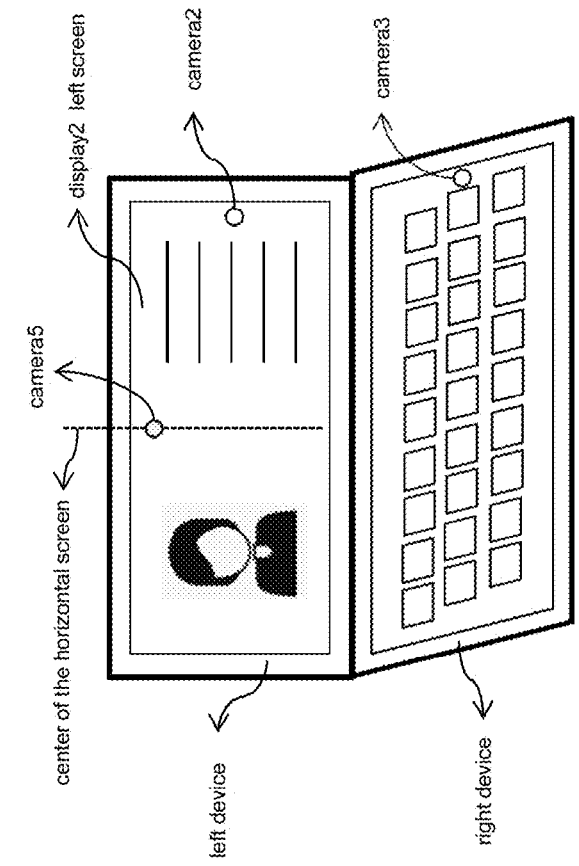
FIGS. 33A-33B illustrate camera arrangement and operation in a laptop mode for the foldable mobile phone according to an embodiment of the present disclosure.
Figure 33A:
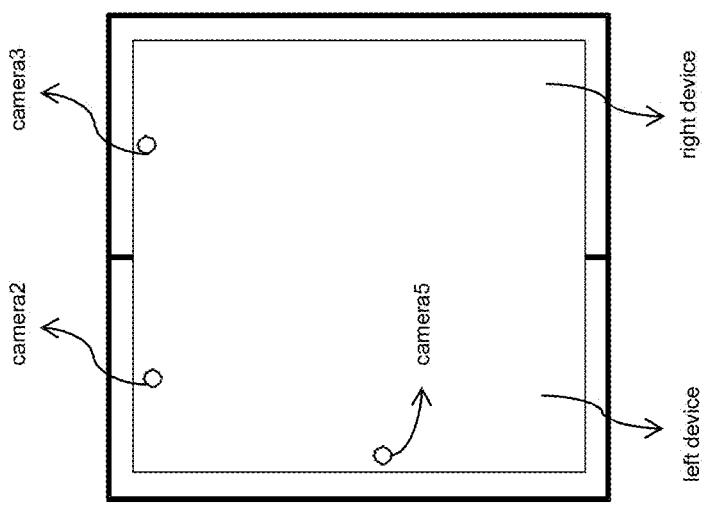

FIGS. 33A-33B illustrate a camera arrangement and an operation in a laptop mode of a mobile phone according to the present invention. As shown in FIG. 33B, the laptop mode refers to a mode in which a mobile phone is folded like a laptop computer and the left and right devices are folded at a predetermined angle, and a right device is placed on a table or a user's lap and a left device is used as a monitor. When the user makes a video call in the laptop mode, an additional camera (camera 5) other than the cameras described above may be disposed at the top of the center of the horizontal screen as shown in FIG. 33B to direct the user's gaze toward the center of the horizontal screen. In addition, when the user makes a video call using the camera 5 in the laptop mode, the camera 2 or the camera 3 is set to automatically turn off and the camera 1 is turned on so that the user can place documents or objects in front of the camera 1 which is placed at the opposite side of the camera 2. If the other party looks at the image taken by the camera 1 through the display 1 and user can also see the image taken by the camera 1 through the left screen the display 2 thus user can share information taken by the camera with the other party conveniently.

FIGS. 34A-34E illustrate a panorama shooting mode is performed by using two cameras in a mobile phone according to an aspect of the present invention. FIG. 34A illustrates a situation in which a forward direction view is photographed using the camera 1 and the camera 4 in an open state of the mobile phone. Each of the camera 1 and the camera 4 performs shooting of a target object at a predetermined shooting angle, and as shown in the drawings, the photographing areas of the camera 1 and the camera 4 are overlapped in a middle of the photographed image.

FIG. 34B shows that when the user starts to fold the mobile phone toward the user, the overlapped shooting area of the camera 1 and the camera 4 becomes smaller, and when the mobile phone is folded over a certain angle, as shown in FIG. 34B, the overlapped shooting area disappears completely. Thereafter, when the user completely folds the mobile phone as shown in FIG. 34C, the camera 1 and the camera 4 may take pictures of views of opposite directions.

FIG. 34D illustrates shooting areas for the cameras 1 and the camera 4 when a folding angle of the mobile phone changes from an open state to a folded state. When the mobile phone is in the open state, which is represented by the horizontal axis, shooting areas of the cameras overlapped. But as the mobile phone change from an open state to a folded state which is represented by the vertical axis, shooting areas of the cameras do not overlapped. FIG. 34E illustrates a combined image made by combining images captured by the camera 1 and the camera 4 in a panoramic manner while the mobile phone is converted from the open state to the folded state.

Images taken by each camera are processed to be combined so as to overlap the common portion of each photographed images as much as possible through image processing, thus the combined images become a single natural continuous image.

The start of a panorama shooting mode is selected by pressing a certain button on a menu screen in the open state or by using a voice command, and the ending of the panorama shooting is performed through one of pressing end button, uttering voice command, or detecting the state in which the mobile phone is completely folded.

As described above, the panorama shooting may be performed in the process of switching from the open state to the folded state of the mobile phone but may also be performed in the process of switching from the folded state to the open state. In this case, the panorama shooting can be started by pressing a predetermined button or by voice command on the menu screen in the folded state, and the ending of the panorama shooting is performed through any one of pressing end button, uttering voice command, or detecting the state in which the mobile phone is completely opened.

Figure 35:
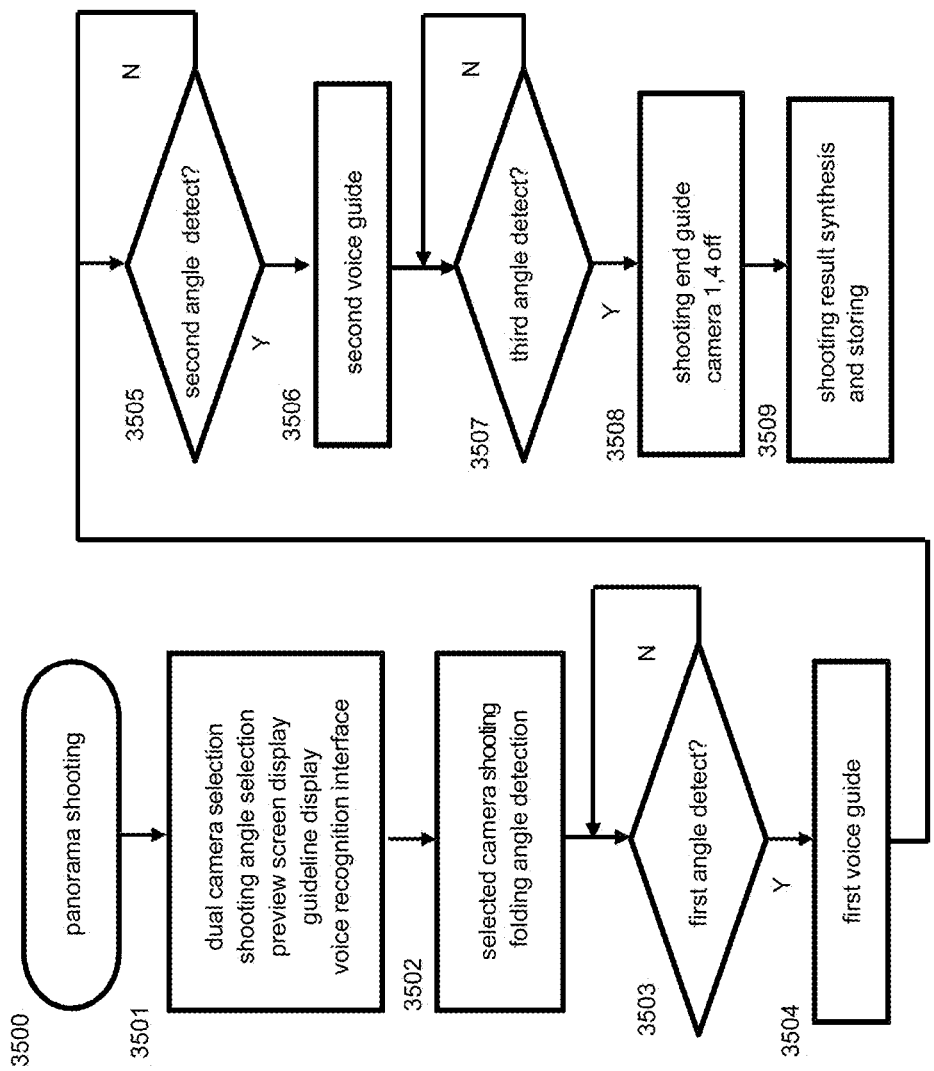
FIG. 35 illustrates a flowchart for dual camera panoramic photographing method for the foldable mobile phone according to an embodiment of the present disclosure.

FIG. 35 illustrates a dual camera panoramic photographing method of a mobile phone according to an aspect of the present invention. Referring back of FIGS. 34A-34E, the user starts panorama shooting in 3500 through a menu screen while the mobile phone is open. Thereafter, the process proceeds to step 3501, and the user selects whether to perform panorama shooting through the dual camera or through the single camera by using the menu screen. Here, the panorama shooting is performed using the dual camera.

In addition, the user can set the desired panorama shooting angle. It also displays a preview of the camera selected by the user and provides a guideline for the user to follow through a folding operation of the mobile phone.

In addition, since both hands hold the mobile phone, a voice recognition interface between the mobile phone and the user may be activated to start the panorama shooting mode by a voice command. Thereafter, the process proceeds to step 3502 and starts shooting with the selected camera and detect a folding angle of the mobile phone. The folding angle is detected using the folding angle sensor described above. In step 3503, it is determined whether a first angle is detected. Here, the first angle may be designated as one third level of the whole panoramic photographing angle set by the user. For example, when the user sets the photographing angle as 120 degrees, the folding angle of about 40 degree is designated as the first angle. Here, folding angle is calculated by considering how much the mobile phone has been folded from the open state which is a starting point. If it is determined as no in step 3503, process proceeds to step 3503 again, if it is determined as yes, process proceeds to step 3504.

In operation 3504, the first voice guide is provided to the user. The first voice guide contains a guide to the progress and speed of panorama shooting, for example, 33% of panorama shooting as a panorama shooting progress may be guided. In addition, when the user's mobile phone folding speed is faster or slower than the reference speed, the user may be informed of the details. In step 3405, it is determined whether the second angle is detected. Here, the second angle may be designated as two-thirds level of the whole panoramic photographing angle set by the user. If the determination result is no, the process returns to step 3505, and if yes, the process proceeds to step 3506 to provide the second voice guide. Secondary voice guide, similar to the first voice guide, contains a guide to the progress and speed of panorama shooting. In step 3507, it is determined whether the third angle is detected.

Here, the third angle indicates the maximum angle of the panorama shooting angle set by the user, if the determination result is no, the process returns to step 3507, If the determination result is yes, the process proceeds to step 3508 where ending the panorama shooting is guided and the camera 1 and the camera 4 are turned off. Thereafter, the method proceeds to step 3509 to synthesize the image photographed by the camera 1 and the image photographed by the camera 4 and stores the synthesized content.

FIGS. 36A-36D illustrate a panorama shooting using a single camera of a mobile phone according to an aspect of the present invention. FIG. 36A illustrates a situation in which the mobile phone is photographing a forward direction by using only the camera 4 in the open state. In this case, when the user rotates only the right device in the direction of the arrow (toward the user) with respect to the mobile phone's folding axis, a shooting direction of the camera 4 also change as shown in FIG. 36B as folding the right device.

FIG. 36C illustrates situation in which a right device has been rotated until the mobile phone becomes a folded state completely. In this case, a shooting direction of the camera 4 faces backward.

FIG. 36D shows an image captured by the camera 4 while the right device of the mobile phone rotates from the state of FIG. 36A and until the state of FIG. 36C through the state of FIG. 36B. In this case, the user can obtain a stable panorama image by rotating the right device while the left device is fixed. The start of panorama shooting is selected by pressing a certain button on the menu screen in the open state or by using a voice command, and the end of the panorama shooting is done by pressing a predetermined button, by uttering the voice command or by detecting a folded angle a situation where the mobile phone is completely folded.

As described above, the panorama shooting may be performed in the process of switching from the open state to the folded state of the mobile phone but may also be performed in the process of switching from the folded state to the open state. In this case, the start of panorama shooting is selected by pressing a certain button, a panorama shooting starting button, on the menu screen in the folded state or by using a voice command, and the end of the panorama shooting is done by pressing a predetermined button, by uttering the voice command, or by detecting the situation where the mobile phone is completely opened.

Figure 37:
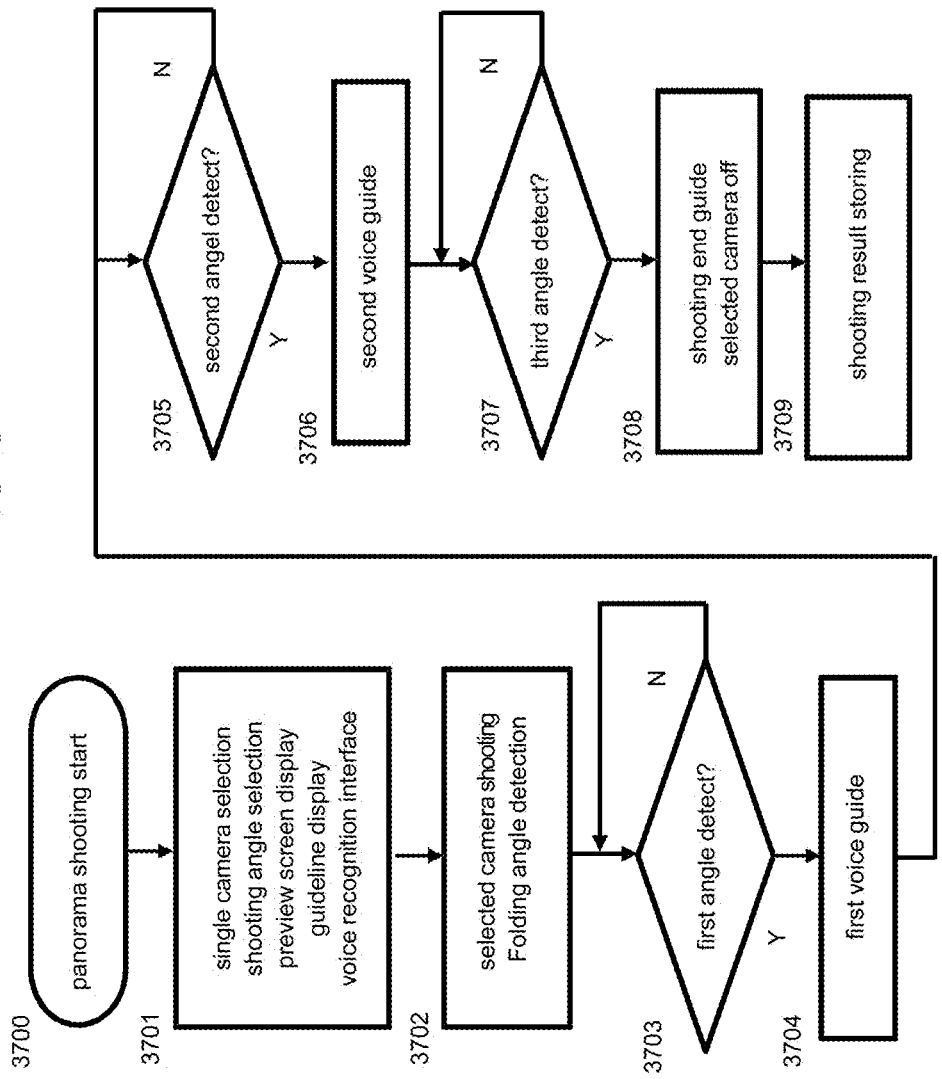
FIG. 37 illustrates a flowchart for panorama shooting method by using a single camera for the foldable mobile phone according to an embodiment of the present disclosure.

FIG. 37 illustrates a single camera panorama photographing method of a mobile phone according to an aspect of the present invention. Referring back to FIGS. 36A-36D, the user starts a panorama shooting photograph using a photograph mode, in step 3700 through the menu screen while the mobile phone is in the open state. After that, the process proceeds to step 3701, and the user selects whether to perform a panorama shooting through the dual camera or single camera through the menu screen. In addition, the user can set a desired panorama shooting angle. It also displays a preview of the camera selected by the user and provides a guideline within the preview thus user can follow the guideline during the folding operation of the mobile phone.

In addition, since both hands hold the mobile phone, the voice recognition interface between the mobile phone and the user is activated to start the panorama shooting by a voice command. Thereafter, the process proceeds to step 3702 and starts shooting with the selected camera and detect a folding angle of the mobile phone. The folding angle is detected using the folding angle sensor described above. In step 3703, it is determined whether the first angle is detected. Here, the first angle may be designated as one third level of the whole photographing angle of the panorama set by the user. For example, when the user sets the photographing angle of 120 degree, the folding angle of about 40 degree is set as the first angle. Here, folding angle is calculated by considering how much the mobile phone has been opened from the folded state which is a starting point. If it is determined no in step 3703, the process returns to step 3703 again, if yes, the process proceeds to step 3704.

In step 3704, the first voice guide is provided to the user. The first voice guide contains a guide to the progress and speed of panorama shooting, for example, 33% of panorama shooting as a panorama shooting progress may be guided. In addition, when the user's mobile phone folding speed is faster or later than the reference speed, the user may be informed of the details. In step 3705, it is determined whether the second angle is detected. Here, the second angle may be designated as two-thirds level of the whole panoramic photographing angle, 80 degree, set by the user. If the determination result is no, the process returns to step 3705, and if yes, the process proceeds to step 3706 to provide the second voice guide. the secondary voice guide, similar to the first voice guide, may contain a guide to the progress and a speed of panorama shooting. In step 3707, it is determined whether the third angle is detected. Here, the third angle indicates the maximum angle of the panorama shooting angle set by the user, if the result of the determination is no, the process returns to step 3607. If yes, the progress proceeds to step 3708 where camera 1 and camera 4 are turned off. Thereafter, the method proceeds to step 3709 to synthesize the image photographed by the camera 1 and the camera 4 and stores the synthesized content.

FIGS. 38A-38D illustrate the wide photographing of a mobile phone according to aspect of the present invention. Referring back to FIG. 23A, FIG. 23A illustrates a situation in which the camera 1 and the camera 4 are photographing forward direction when the mobile phone is in the open state. When considering the shooting angle of the camera 1 and the camera 4, an object located at a certain distance D1 away from the mobile phone can be included in the photographed images of both cameras, the camera 1 and the camera 4. In this case, FIG. 38B illustrates a situation in which the photographed image of the camera 1 and the photographed image of the camera 4 are combined so as to overlap the common portion of each photographed images as much as possible through image processing. In this case, it is possible to perform a wide photographing to obtain a wider image which is wider than an image captured by a single camera in a horizontal direction. The difference between the panorama shooting and wide photographing described above is that panorama shooting makes a panoramic image through a rotation of a left device or a right device of the mobile phone or rotation of both the left device and the right device of the mobile phone while the wide photographing captures image without rotating any device of the mobile phone.

FIG. 38C shows a state in which the left device and the right device are slightly folded toward the user at a predetermined angle. Similar to the situation of FIG. 38A, when considering shooting angle of the camera 1 and the camera 4, the object located at a certain distance (D2) away from the mobile phone can be included in the photographed images of both cameras. The difference between the situation of FIG. 38A and situation of FIG. 38C is that, in case of FIG. 38C, the object must be located further away from the mobile phone to be included in the photographed image than the situation in FIG. 38A. Furthermore, in case of FIG. 38C, shooting angle is extended into the left and right direction when compared to the situation in FIG. 38A Therefore, in the case of FIG. 38C, a wider image that is a wider image in a horizontal direction than the image of the case of FIG. 38A can be generated. FIG. 38D illustrates a situation in which the photographed image of the camera 1 and the photographed image of the camera 4 are processed to be combined so as to overlap the common portion of each photographed images as much as possible through image processing. In this case, the combined wide image may obtain a wider image in the horizontal direction than the wide image in FIG. 38B. The wide photographing may be selected by pressing a predetermined button on the menu screen in the open state or by uttering a voice command, and the end of the wide photographing may be performed by pressing a predetermined end button or by uttering a voice command. In addition, if the left and right device does not move for a certain period of time, the wide photographing can be stopped automatically.

Figure 39C:
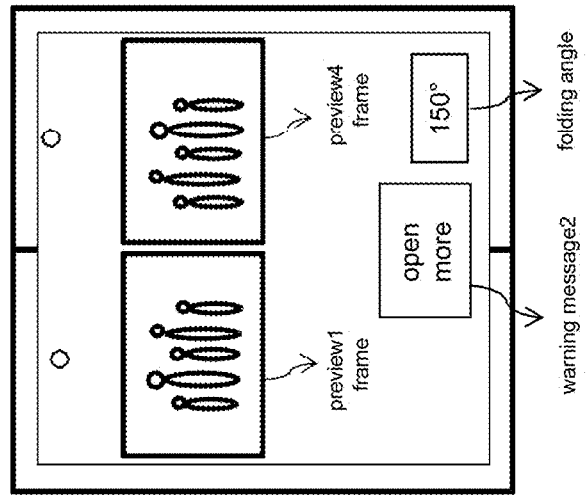
Figure 39B:
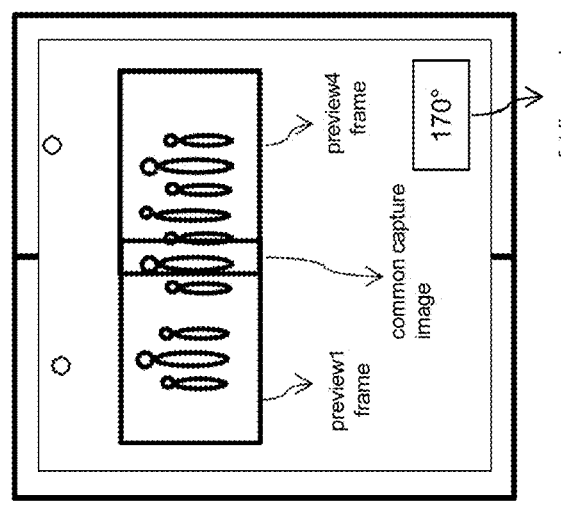
Figure 39A:
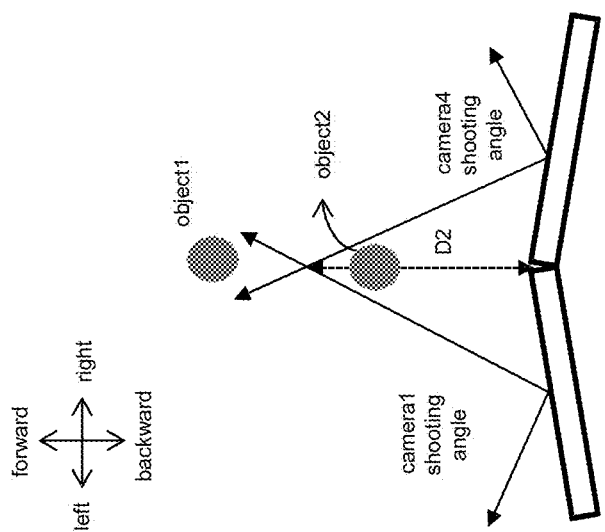

FIGS. 39A-39C illustrate a user interface in a wide photographing mode of a mobile phone according to an aspect of the present invention. As shown in FIG. 39A, whether objects to be photographed is included in the common portion of two images photographed by the two cameras it is determined according to the distance between the object and the mobile phone and the folding angle between the left device and the right device of the mobile phone. As shown in FIG. 39A, the object 1 is included in both the captured images of the camera 1 and the camera 4, but the object 2 is not included in both the captured images of the camera 1 and the camera 4. As such, when the left and right devices are folded at a predetermined angle to perform wide photographing, it may be difficult for the user to determine whether the object can be photographed through the wide photographing.

For this purpose, as shown in FIG. 39B, frames are created at the outer edges of the preview 1 and the preview 4, and user can see overlapped area between two images, thus it is convenient for the user to judge the size of photograph when taking wide photographing. In this case, the degree of folding between the left and right devices can be displayed on the screen as shown in FIG. 39B, so that the user can form a sense of a suitable size of the photograph with respect to the folding angle.

In this case, the folding angle may be measured by a folding angle sensor (not shown) mounted inside the mobile phone. FIG. 39C illustrates a situation in which the overlapped portion of the two photographed images does not occur because the angle between the left device and the right exceeds a certain angle. In this case, as shown in FIG. 39C, the preview 1 frame and the preview 4 frame are separated from each other, and the user intuitively recognizes that a wide photographing is not possible. In addition to the user interface in the above-described wide photographing may be further provided with a function to warn the user by vibrating, voice or lighting at a specific folding angle between the left device and the right device. For example, in the case of wide photographing mode, when the overlapped portion between two photographed images disappears, the user is alerted by using vibration, a voice, or lighting, and a message is displayed as the warning message 2 as shown in FIG. 39C to let the user know that the mobile phone should be opened more.

Figure 40:
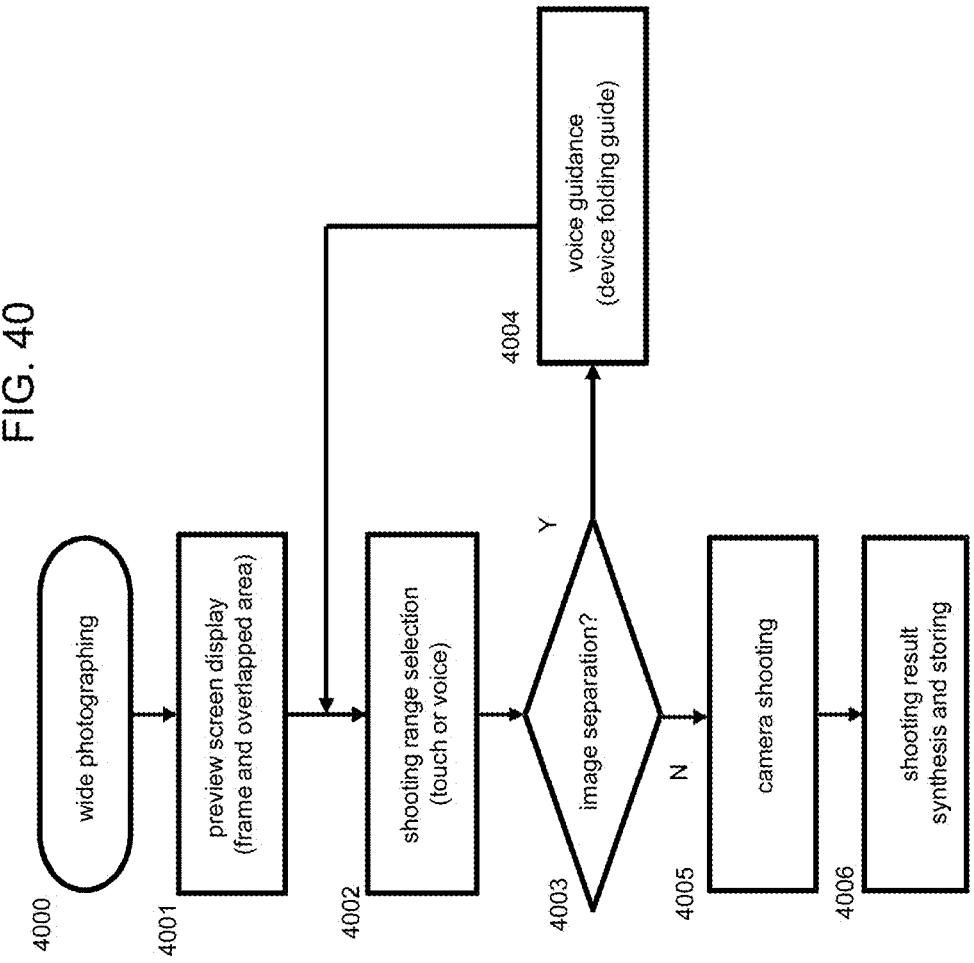
FIG. 40 illustrates a flowchart for wide photographing method for the foldable mobile phone according to an embodiment of the present disclosure.

FIG. 40 illustrates a wide photographing method of a mobile phone according to an aspect of the present invention. Referring back to FIGS. 39A-39C, first, in step 4000, the user can select a wide photographing mode (not shown) through a menu screen (not shown) in an open state of the mobile phone. After that, the process proceeds to step 4001 and the preview 1 corresponding to the camera 1 and the preview 4 corresponding to the camera 4 are displayed on each screen. In this case, the outline of each preview image is displayed as a frame, and when the two previews overlap, overlap region is also displayed. Thereafter, the process proceeds to step 4002 to select the shooting range of the wide photographing. The shooting range is changed by the user through adjusting the folding angle of the mobile phone while watching the previews displayed on the screens. When the shooting range is desired, the user can select the shooting range through the screen touch or voice. After that, it is determined whether the images captured by the camera 1 and the camera 4 are separated from each other without overlapping regions. If yes, process go to step 4004 and provide a voice guide to adjust the shooting range again by folding the device. Thereafter, the process proceeds to step 4002 to newly select the shooting range. If it is determined as no at step 4003, the process proceeds to step 4005 to perform shooting using camera 1 and camera 4, and enters step 4006 to combine images photographed by two cameras and store the result.

Figures 41A, 41B:
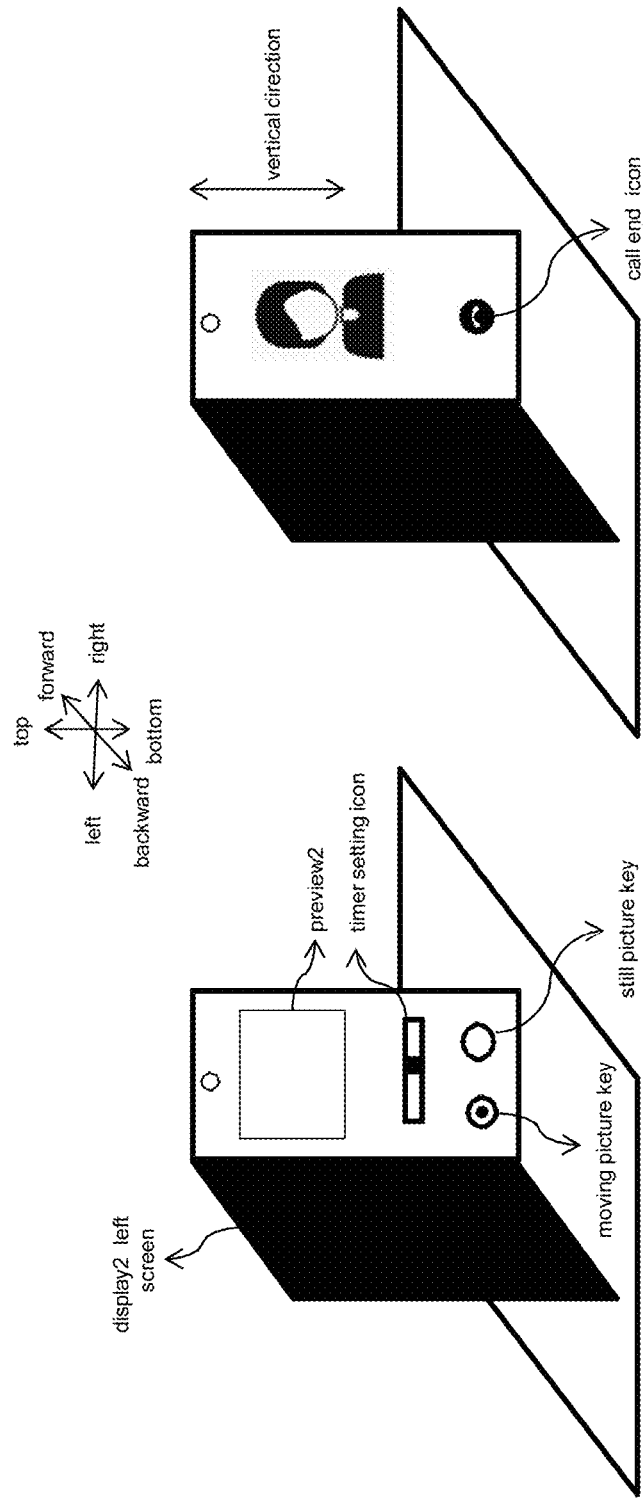
FIGS. 41A-41B illustrate self-standing mode for the foldable mobile phone according to various embodiments of the present disclosure.

FIGS. 41A-41B illustrate a self-standing mode of a mobile phone according to an aspect of the present invention. The self-standing mode uses the foldable mobile phone's feature to allow the mobile phone to stand on a flat floor, such as a table, at a specific folding angle thus the applications such as a camera mode and a video call can be performed without holding the mobile phone. It means that phone's self-standing mode can be automatically recognized by the phone using several sensors. For example, the mobile phone first recognizes that it is at an appropriate angle (about 80 to 100 degree) to be reliably erected on the flat floor of the mobile phone by using a folding sensor (not shown) mounted on the mobile phone. The Gyro sensor recognizes state that the mobile phone is standing in the vertical direction. A proximity sensor recognizes state that user does not hold the mobile phone. Thus, the mobile phone can determine it is in a state of self-standing mode. If the phone is determined to be in the self-standing mode, the phone can automatically run the most frequently used or most recently used application in the past self-standing mode.

FIG. 41A illustrates a situation in which the mobile phone recognizes the self-standing mode and automatically provides a camera self-timer user interface. In this case, the user may conveniently set the timer and press the video shutter or the still image shutter to perform a timer shooting. In this case, as shown in FIG. 41A, the mobile phone may automatically turn off the left screen of the display 2 to reduce a battery consumption. FIG. 41B illustrates a situation in which the mobile phone recognizes the self-standing mode and automatically provides a video call user interface in the self-standing mode. Even in this case, as shown in FIG. 41B, the mobile phone may automatically turn off the left screen of the display 2 to reduce the battery consumption. As described above, in the self-standing mode, the user can perform functions related to the application displayed on the screen by a voice command without touching the mobile phone directly by a hand. For example, in FIG. 41A, when the user makes a sound "still picture", the mobile phone recognizes this and operates as if the user directly presses the still picture key. a function related to an application displayed on a screen may be performed using a voice command. For example, in FIG. 41B, when the user makes a sound "call end", the mobile phone recognizes this and operates as if the user directly pressed the call end icon. In addition, unlike the above, when the mobile phone recognizes the self-standing mode, the mobile phone provides a user with user interface (not shown) so that the mobile phone can select one of a plurality of application selection screens rather than providing a specific user interface directly on the screen. When an application is selected, a related user interface can be displayed on the screen.

Figure 42:
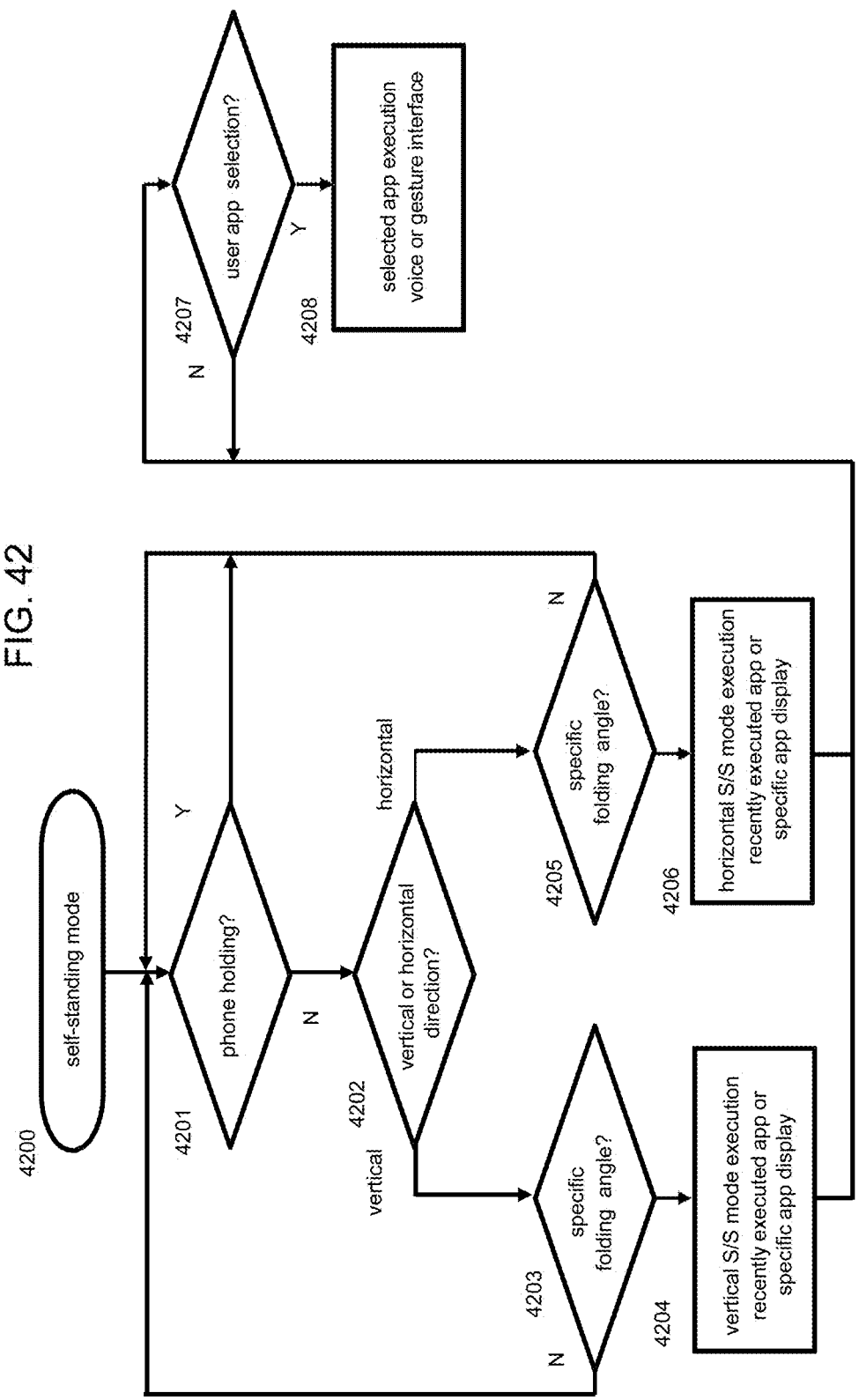
FIG. 42 illustrates a flowchart for performing a self-standing mode for the foldable mobile phone according to an embodiment of the present disclosure.

FIG. 42 illustrates a method of performing a self-standing mode of a mobile phone according to an aspect of the present invention. Referring back to FIGS. 41A-41B, self-standing mode refers to a mode in which the user does not hold the mobile phone, but instead, folding the mobile phone at a certain angle to stand on a flat surface such as a table to perform certain function. First, when the mobile phone starts self-standing determination in step 4200, it enters step 4201 to determine whether the user holds the mobile phone. Whether the user grips the mobile phone is sensed by using a proximity sensor (not shown) within the mobile phone body. If the determination result of step 4201 is no, the process returns to step 4201. If the determination result is yes, the process goes to step 4202. In step 4202, it is determined whether the mobile phone is placed in the vertical direction or the horizontal direction. To do this, a rotation sensor or an acceleration sensor (not shown) built into the mobile phone can used. If the determination result is the vertical direction, the process proceeds to step 4203, but if the determination result is horizontal direction, process proceeds to step 4205. In step 4203, it is determined whether a specific folding angle of the mobile phone is maintained.

In order to be able to stand on its own in the vertical position, the folding angle must be within a certain range (for example, 70 to 110 degree). If it is not within a certain range, it is difficult to enter the self-standing mode. If the result is within the range, it is determined to be the mobile phone is in the self-standing mode. When the portrait self-standing mode is executed, the application which has been recently executed in the portrait self-standing mode or the application specified in the portrait self-standing mode is displayed on the screen, and the process proceeds to step 4207. When the process entered to step 4205 at the step 4202, the folding angle must be within the certain range (for example, 70 degree to 110 degree) in order to be able to stand in the horizontal direction by itself similarly to step 4203. If it is not within a certain range, it is difficult to enter the self-standing mode. If it is within a certain range, it is determined that it is in the self-standing mode. In this mode, the most recently executed application or the application specified in the horizontal self-standing mode is displayed on the screen, and the operation proceeds to step 4207.

In the step 4207, the user selects an application displayed on the screen, and the user may directly touch the screen, or the interface for voice command is activated, so that the application may be selected by voice without directly touching the screen. Thereafter, the process proceeds to step 4208 to execute the application selected by the user. While the application is running, the interface is activated so that the user can use a voice or a gesture.

As a possible application of the self-standing mode, the foldable phone may take a photo or monitoring while a self-standing mode if a motion, a sound, a light, a temperature, a smell and/or a humidity is detected by a sensor(s). It is also understood that the foldable phone may take moving image or still image using cameras attached to the foldable phone continuously or periodically or when an event is occurs. The event may be activated by a detecting a sound, a motion, a smell, a light, a temperature, and/or a humidity by sensor(s). The taken image may be stored in the foldable phone or transmitted to an external device using a wired or a wireless transmission method.

Figure 43B:
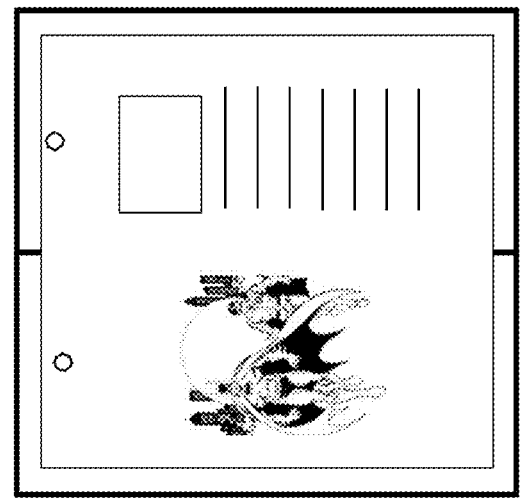
FIGS. 43A-43D illustrate multi-screen display switching method for the foldable mobile phone according to various embodiments of the present disclosure.
Figure 43D:
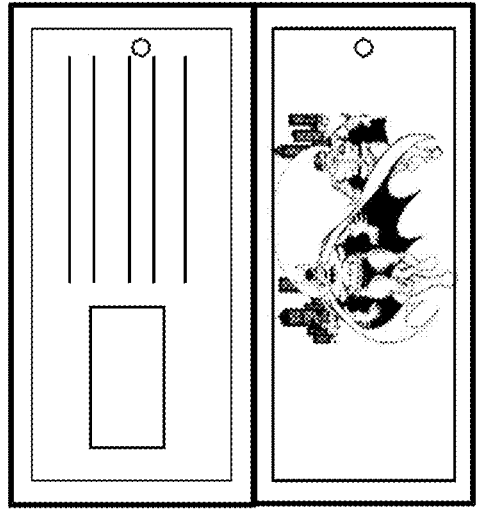
Figure 43A:
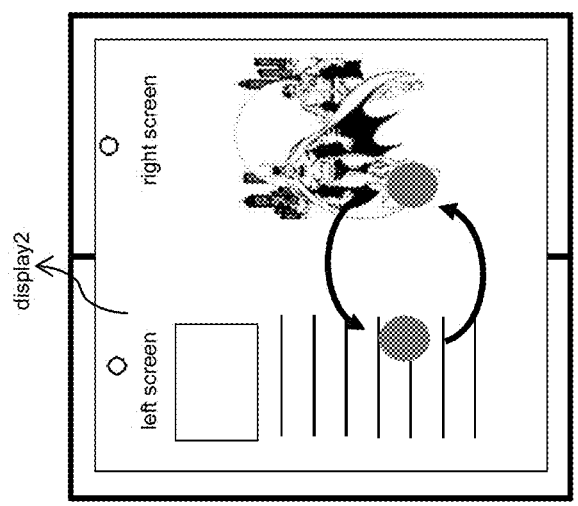
Figure 43C:
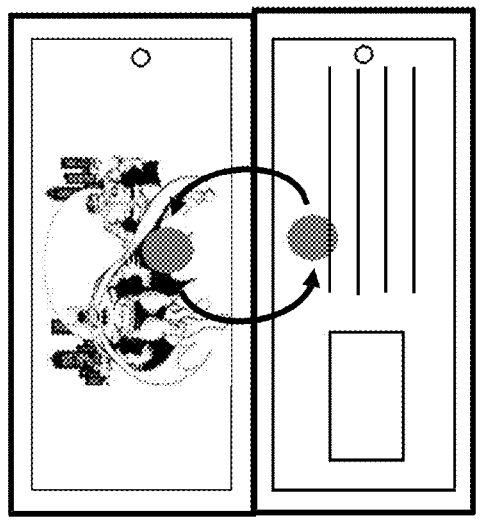
Figure 44A:
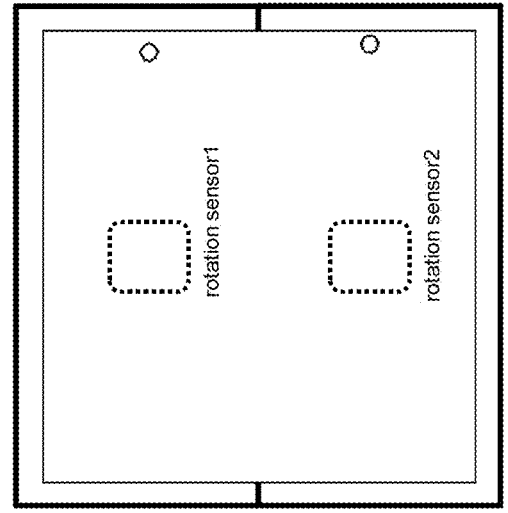
FIGS. 44A-44D illustrate device rotation control method for the foldable mobile phone according to various embodiments of the present disclosure.
Figure 44B:
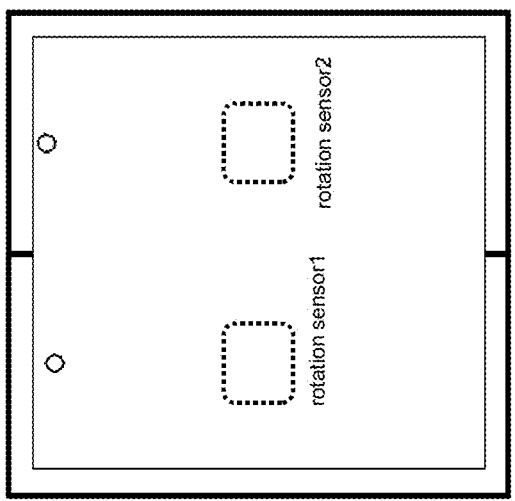
Figure 44C:
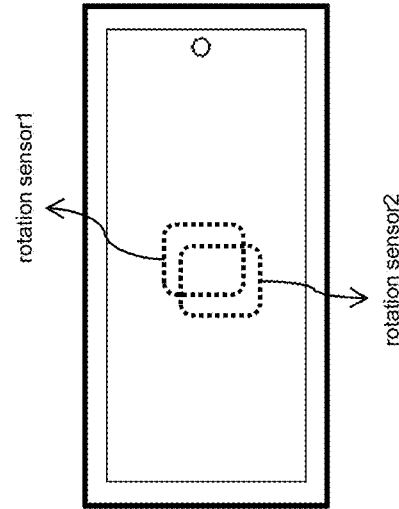
Figure 44D:
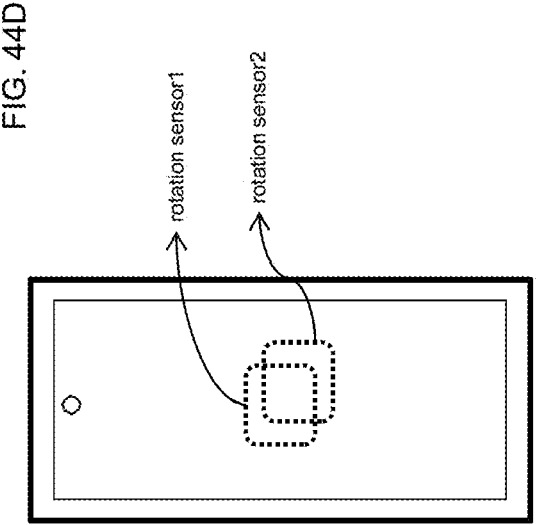

FIGS. 43A-43D illustrate a multi-screen display switching of the mobile phone according to an aspect of the present invention. FIG. 43A illustrates a state in which an internet related application is displayed on a left screen of the display 2 and a video related application is displayed on a right screen of the display 2. In this case, as shown in FIG. 43A, while the user is touching first contact point in the left screen and second contact point in the right screen through the fingertips, if user pushes two contact points to cross each other, then contents of each screens are switched as shown in FIG. 43B. That is, the internet related application is displayed on the left screen and the Internet related application is displayed on the right screen. This allows the user to switch screens in the same manner as described above using fingertips even when the mobile phone is lying as shown in FIG. 43C. In addition to the above-described screen switching method of the multi-screen, the user may perform the screen switching by receiving a user gesture or a voice command which are recognized through the camera 2 or the camera 3 of the mobile phone without directly touching the screen. The user's gesture can be registered in the mobile phone in advance thus user can operate the mobile phone according to the registered gesture to switch between the left and the right screens.

FIGS. 44A-44D illustrate a device rotation control of a mobile phone according to an aspect of the present invention. When a mobile phone is not a foldable phone, the rotation of the mobile phone is detected only by the rotation sensor built in the mobile phone, and the screen is converted into a landscape or a portrait according to the amount of rotation. However, when the mobile phone becomes foldable and the mobile phone is rotated in a folded state, it is necessary to determine a rotation amount of left device and right device of the mobile phone separately. In some cases, the left device of the mobile phone may serve as a reference for detecting the amount of rotation, but in other cases, the right device of the mobile phone may serve as a reference for detecting the amount of rotation. Therefore, the mobile phone according to an aspect of the present invention has built-in rotation sensors on both the left device and the right device. When the mobile phone is rotated in the folded state and when determining which one of the left and right devices is suitable for the reference device to sense the rotation amount of the mobile phone, varies according the user's mobile phone usage environment.

Figure 45B:
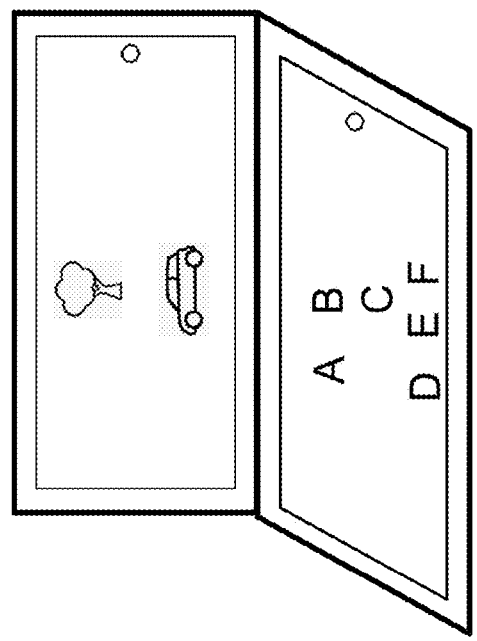
FIGS. 45A-45B illustrate device rotation control for the foldable mobile phone according to an embodiment of the present disclosure.
Figure 45A:
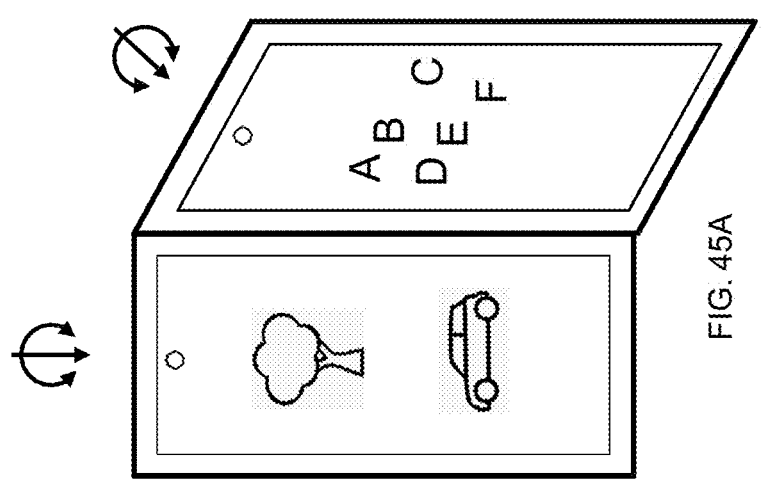
Figure 48A:
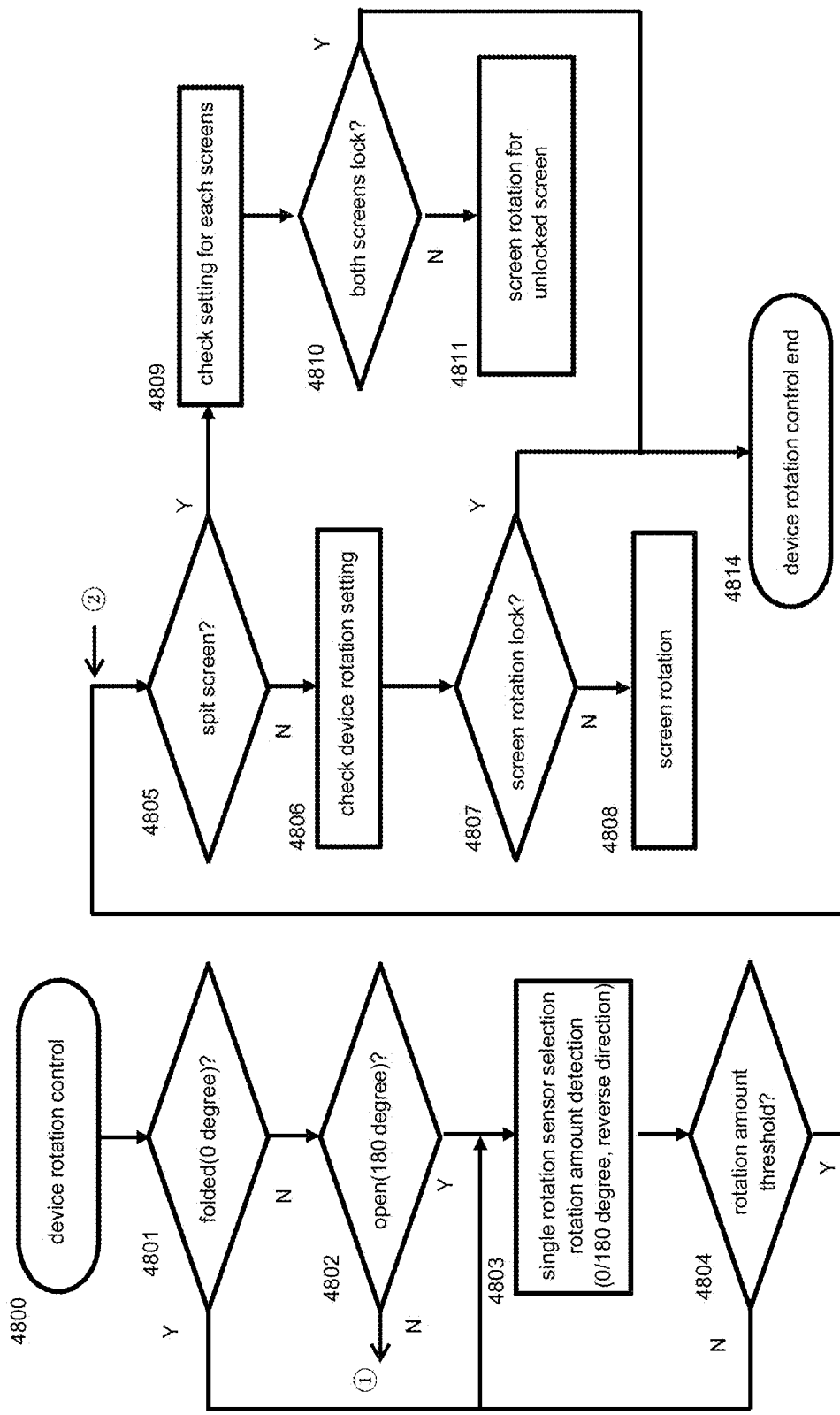

FIGS. 45A-45B illustrate a view of device rotation control of a mobile phone according to an aspect of the present invention. FIG. 45A shows situation in which display 2 divided into a left screen and a right screen while the mobile phone is folded at a predetermined angle. At this time, if the user rotates the mobile phone to the right by a certain angle, as shown in 45B, contents of left device and right device are also rotated. In this case, the amount of rotation of the rotation sensor 1 embedded in the left device and the amount of rotation of the rotation sensor 2 embedded in the right device are sensed respectively. In this scenario, three methods can be used to determine rotation amount of the mobile phone. A first method is to use the larger one between the rotation amount of the rotation sensor 1 and the rotation amount of the rotation sensor 2, and a second method is to calculate the rotation amount for the entire mobile phone by inputting the rotation amount of the rotation sensor 1 and the rotation amount of the rotation sensor 2 to a specific formula (for example, average or equation). A third method is to recognize the user's face using the camera 2 and the camera 3 of the mobile phone and determine which camera confront the user's face more, and base on that reference device between left device and right device is determined.

FIGS. 46A-46D illustrate a device rotation control of the mobile phone according to an aspect of the present invention. FIG. 46A is a situation in which the mobile phone's screens are vertically displayed in a portrait mode on the left and the right screens of the display 2. At this time, if the user rotates the mobile phone to the right by a certain angle (for example, about 60 degree), as shown in FIG. 46B, both the left and the right screens of the display 2 are switched to the landscape mode. This case is performed after the user activates the rotation icon 1 in the setting screen. When the rotation icon 1 is activated, the content of the screen can be rotated in response to the rotation of the mobile phone by a certain angle. If the user does not activate the rotation icon 1 on the setting screen, the screen rotation does not occur even if the amount of rotation of the mobile phone is detected over a certain level.

The characteristic part here is that the setting of rotation icon can be performed independently for each of the left and right screens of the display 2. If the user rotates the mobile phone in the state of FIG. 46A to the right side while activating (or unlocking) the rotation icon 1 on the left screen of the display 2 and deactivating (or locking) the rotation icon 2 on the right screen, as shown in FIG. 46C, only the content of the left screen is rotated. By doing so, it is possible to set the screen rotation for each of the left and right screens instead of the all screens of the display 2. FIG. 46D illustrates a situation in which the mobile phone of FIG. 46A is rotated to the right side while deactivating (or locking) the rotation icon 1 on the left screen of the display 2 and activating (or unlocking) the rotation icon 2 on the right screen, as shown in FIG. 46D, only the content of the right screen is rotated.

FIGS. 47A-47D is another aspect of the device rotation control of the mobile phone according to the present invention. FIG. 47A illustrates a situation in which the left screen and the right screen of the display 2 are displayed with a portrait mode when the mobile phone is standing vertically. Thereafter, when the user rotates the mobile phone to the right by a predetermined angle (for example, 60 degree), the left screen and the right screen are switched to the landscape mode as shown in FIG. 47B. In this case, both the rotation icon 1 for the left screen and the rotation icon for the right screen of the display 2 are set to be activated according to a rotation of the device. In FIG. 47C, the left screen of the display 2 is in a state where the rotation icon 3 is activated, and the right screen is a state in which the rotation icon 2 is activated. When the rotation icon 3 is activated, in response to the rotation of the mobile phone, not only corresponding screen is rotated but also a left-right direction and an up-down direction of the corresponding screen is reversed. FIG. 47D illustrates the situation in which the rotation icon 1 for the left screen is activated and the rotation icon 3 for the right screen is activated, thus, in response to the rotation of the mobile phone in FIG. 47A to the right side, the left screen is rotated, but the right screen is not only rotated but also the left-right direction and the up-down direction of the corresponding screen is reversed.

FIGS. 48A-48D illustrate an embodiment of a device rotation control method of a mobile phone according to the present invention. First, when the device rotation control starts in step 4800 enters step 4801 to determine whether the folding angle of the mobile phone is 0 degrees (folded state). If yes, go to step 4803; if no, go to step 4802; In step 4802, it is determined whether the folding angle of the mobile phone is 180 degrees (open state). If yes, go to step 4803. If no, go to step 4811, 4814, or 4817. In this case, when the folding angle of the mobile phone is 0 degrees or 180 degrees, it is not necessary to use all the built-in rotation sensors on the left and right devices of the mobile phone to control the device rotation. But the folding angle of the mobile phone is another angle, there are cases where both the rotation sensor within the left and right device and rotation sensor within the right device must be used to control the device rotation.

In step 4803, when the folding angle of the mobile phone is 0 degree or 180 degree, selection of any one of the rotation sensor 1 embedded within the left device and rotation sensor 2 embedded within the right device, and detecting of the rotation amount of the selected rotation sensor is performed. When the rotation sensor 1 embedded within the left device is selected, the rotation direction of the mobile phone when the folding angle is 0 degree and the rotation direction of the mobile phone when the folding angle is 180 degree is set to be opposite each other. But when the rotation sensor 2 embedded within the right device is selected, the rotation direction of the mobile phone when the folding angle is 0 degree and the rotation direction of the mobile phone when the folding angle is 180 degree is set to be same each other. Thereafter, the process proceeds to step 4804 to determine whether the calculated amount of rotation exceeds a predetermined threshold. If it is determined as yes, the process proceeds to step 4805, and if no, enters step 4803 again.

The 4811 step of FIG. 48B is the first embodiment to be entered when the mobile phone's folding angle is determined other than 0 degree or 180 degree in step 4802. In step 4811, the camera 2 and the camera 3 built in the display 2 are turned on and the image capturing is performed. Based on the captured images, the user's face recognition is performed.

For example, if the device rotates while the mobile phone is folded about 90 degree, the user's face is included in the image taken by the camera 2 but the user's face is not included in the image taken by the camera 3. In this case, mobile phone can determine that user is looking at the left screen. When the user's face is photographed in both the camera 2 and the camera 3, the analysis may be performed by analyzing user's eye constituting the user's face. Thereafter, the process proceeds to step 4812 and selects the reference rotation sensor according to the screen viewed by the user. For example, if the user is looking at the left screen the rotation sensor 1 is selected, if the user is looking at the right screen, the rotation sensor 2 is selected. In step 4813, it is determined whether the rotation amount detected in step 4812 has exceeded the predetermined threshold. If it is determined as no, the process returns to step 4812. If it is determined as yes, the process proceeds to step 4805.

The step 4814 of FIG. 48C is the second embodiment to be entered when the mobile phone folding angle is determined other than 0 degrees or 180 degrees in step 4802. In step 4814, the amount of rotation of the rotation sensor 1 and the rotation sensor 2 is compared and the process proceeds to step 4815. In step 4815, a rotation sensor having a large or small rotation amount is selected as the reference rotation sensor and the rotation amount of the selected rotation sensor is detected. Thereafter, the process proceeds to step 4816 to determine whether the amount of rotation detected in the previous step exceeds a predetermined threshold. If it is determined as no, the process proceeds to step 4815 again.

The step 4817 of FIG. 48D, in the third embodiment to be entered when the mobile phone folding angle is determined other than 0 degree or 180 degree in step 4802. In step 4817, the amount of rotation of the rotation sensor 1 and the amount of rotation of the rotation sensor 2 are detected. Thereafter, process proceeds to step 4818. In step 4818, the rotation amounts of each sensor detected in the previous step are imputed into the calculation formula. The formula for calculating the amount of rotation may be a formula for calculating an average of two inputs or a formula for applying different weights to two inputs. Thereafter, in step 4819, it is determined whether the amount of rotation calculated in the previous step exceeds a predetermined threshold. If it is determined as no, the process returns to step 4818. If it is determined as yes, the process proceeds to step 4805.

In step 4805, it is determined whether the screen of the mobile phone display 2 is a split screen or not. The split screen shows a state in which the left screen and the right screen of the display 2 are separated from each other. If the determination result is determined to be no, go to step 4806 to check the settings related to device rotation, and then enter step 4807 to determine whether the screen rotation setting is lock or not. If the result of the determination is yes, the process proceeds to step 4814 to end the device rotation control. If the result of the determination is no, the process proceeds to step 4808 to perform screen rotation. If it is determined in step 4805 that the screen is divided, go to step 4809 and check the settings related to device rotation for each screen described above. Thereafter, the process proceeds to step 4810 to determine whether the screen rotation setting for the both separated screens are lock. If the result of the determination is yes, the process proceeds to step 4814 to end the device rotation control. If the determination is no, the process proceeds to the step 4811.

FIG. 49 is a functional block diagram of a mobile phone according to the present invention. Recently, the mobile phone's main chip performs various functions. Among the main functions of the mobile phone's main chip, the AI engine block has a dedicated processor and works as a voice assistant for the user by interworking with a voice recognition server connected to the network. The RF front-end block is responsible for processing the signal received through the antenna before feeding it to the modem block, and before sending the signal from the modem to the antenna. The 5G modem block can handle sub-6 GHZ and mm Wave, and the 4G modem block can support both LTE FDD and LTE TDD.

The image block performs image processing, slow motion video capture, HEVC video capture, 4K HDR video capture, and real-time object classification, segmentation and replacement of images captured by a plurality of cameras described above. The audio block plays a role of processing an audio signal in the multimedia content or a voice signal during a call and operates in conjunction with a voice assistant. The video block incorporates a GPU and processes signals of various video specifications (including H.265). The display block performs processing for displaying content on the display 1 in the folded state and the display 2 in the open state described above. The security block performs biometric authentication procedures such as payment through a mobile phone or fingerprint recognition, iris recognition, voice and face recognition using an ultrasonic sensor. It also plays a role in various security keys, content protection and malware detection. The internal memory block can temporarily store data came from the external memory block or can play a role of storing and supplying data when needed in other blocks within the main chip.

The connectivity block is compatible with the standards of Wi-Fi, Bluetooth, NFC, USB, GPS, DNSS, etc., and exchanges data with external devices. In this case, Wi-Fi is compatible with standards such as 802.11ax-ready, 802.11ac Wave 2, 802.11a/b/g, and 802.11n. The charging block performs processing for battery wired and wireless charging. The CPU block controls the entire main chip and controls the execution of various applications executed in the mobile phone. The CPU also supplies data necessary for the operation of each block.

For example, data of various sensors received from an external sensor block can be delivered to a required functional block. Various additional functional blocks may be additionally included in addition to the functional blocks of the mobile phone main chip described above. Outside the mobile phone main chip, as shown in the figure, a camera block including a lens and an image sensor, a speaker block, a microphone block, an external memory block, a sensor block, a battery block, an input device block, an output device block, a display device 1 and a display device 2 blocks, etc. are connected. The sensor block includes an RGB sensor, a brightness sensor, a temperature sensor, a humidity sensor, a proximity sensor, a gyro sensor, an acceleration sensor, a GPS sensor, a folding sensor (detecting the folding angle of the left and right devices of the mobile phone), grip sensor, magnetic sensor, ultrasonic sensor (s), heart rate sensor, and iris sensor for fingerprint recognition are included.

Proximity sensors are sensors that sense motion approaching without directly contacting the display surface. Proximity sensor forms a high frequency magnetic field, high frequency oscillation type for detecting current induced by magnetic field characteristics changed when approaching an object, magnetic type using magnet, and capacitance type for detecting capacitance changed due to object's approach. It can be implemented by various types of sensors such as. The grip sensor is a sensor that is disposed at the edge of the foldable display device or the handle part separately from the pressure sensor to sense the user's grip. The grip sensor may be implemented as a pressure sensor or a touch sensor.

First of all, in relation to camera shooting, the pixel data photographed from the camera block outside the main chip is supplied to the external display 1 block or the display 2 block through the image block, video block, audio block, and the display block. In relation to the ultrasonic fingerprint recognition, among the various sensors included in the sensor block outside the main chip, the data supplied from the ultrasonic sensor is transferred to the security block through the CPU block for authentication. Regarding the telephone call, the signal received through the antenna passes through the RF front-end and passes through the 4G modem or the 5G modem according to the communication standard, and is then delivered to and processed by the application related to the telephone reception. On the other hand, although each block and necessary circuits and sensor are expressed in singular, a plurality of blocks may be configured in some cases.

According to aspect of the present invention, a data processing system in which illustrative embodiments may be implemented. Network data processing system is a network of computers in which the illustrative embodiments may be implemented. Network data processing system contains network, which is the medium used to provide communications links between various devices and computers connected together within network data processing system. Network may include connections, such as wire, wireless communication links, or fiber optic cables.

The short-range communication module is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module in general supports wireless communications between the mobile terminal and a wireless communication system, communications between the mobile terminal and another mobile terminal, or communications between the mobile terminal and a network where another mobile terminal (or an external server) is located, via wireless area networks. One example of the wireless area networks is a wireless personal area networks.

Indoor positioning technologies developed so far may be described in brief as follows. With infrared-based positioning technology, infrared sensors are installed on the ceiling of the building, infrared generators in the form of badges called active badges are attached to persons, and corresponding signals are sensed by the infrared sensors to identify the position. With ultrasonic-based positioning technology, an ultrasonic wave generated from an ultrasonic generator attached to a person or an object is received by an ultrasonic receiver attached to the ceiling of the building to identify the position. With Wi-Fi-based positioning technology, the position is measured by using the strength or transmission delay of a radio frequency (RF) signal emitted by the access point (AP) of a wireless LAN. With radio frequency identification (RFID) based positioning technique, the reception strength of a received RF signal is measured, and the location is identified by measuring the signal transmission distance based on signal attenuation. With ultra wide band (UWB) based positioning technology, the position of a target is located using a wide frequency band signal.

In the depicted example, a server and another server connect to network along with storage unit. In addition, a plurality of clients a connect to network. The plurality of clients may be, for example, personal computers or network computers. In the depicted example, server provides data, such as boot files, operating system images, and applications to plurality of clients. The plurality of clients are clients to server as an example. A Network data processing system may include additional servers, clients, and other devices not shown.

A progress of a technology makes a virtual world possible to display objects vivid in a Rich Internet Application (RIA). The RIA are web applications, which have most of properties of mobile phone applications, delivered by one or more of Macromedia® Flash™, Microsoft® Silverlight™, JavaFX™, etc. These objects in a virtual world could be viewed, controlled and even be changed by a user's command (e.g., a touch screen, or voice command).

A physical device in a real world may be a component to perform a function. For example, watching a movie using the foldable phone requires a display device, a sound player and a signal source. To watch the movie, a user may utilize a foldable phone display.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a read-only memory (ROM), a random-access memory (RAM), a USB memory, a memory card, a Blu-Ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

According to various embodiments of the present disclosure, an electronic device may include a mobile phone body, a left device positioned on a first portion of the mobile phone; a right device positioned on a second portion of the mobile phone body in separation from the left device, a communication circuit positioned inside the mobile phone body, a control circuit positioned inside the mobile phone and electrically connected to the left device, the right device, and the communication circuit, and a memory positioned inside the mobile phone body and electrically connected to the control circuit, wherein the memory may store instructions that, when executed, cause the control circuit to provide a first screen image to the left body, provide a second screen image to the right body at least partially simultaneously with displaying the first screen image on the left device, provide data associated with one of the first screen image and the second screen image to the communication circuit, and cause the communication circuit to transmit the data to an external device having a display such that a screen image at least partially identical to one of the first screen image and the second screen image is output on the display of the external device.

In an embodiment of the present disclosure, the right device of the mobile phone is foldable or bendable from the left body of the mobile phone.

In an embodiment of the present disclosure, the right device of the mobile phone may be positioned in the opposite direction to the left device of the mobile phone.

It is also understood that an upper device of the mobile phone may be positioned in the opposite direction to a lower device of the mobile phone according to an aspect of the present invention, i.e., a clamshell phone. It is also possible to be implemented to a expandable phone.

In an embodiment of the present disclosure, the electronic device may further include a first interface to provide the first screen image to a left device; and a second interface to provide the second screen image to the right device of the first screen image.

In an embodiment of the present disclosure, the electronic device may further include a first interface to provide the first screen image to an upper device; and a second interface to provide the second screen image to the lower device of the first screen image.

In an embodiment of the present disclosure, the electronic device may further include an audio processing circuit positioned inside the mobile phone and electrically connected to the control circuit. The control circuit may control the communication circuit to send the external device data associated with one of a first audio corresponding to the first screen image and a second audio corresponding to the second screen image, and may provide the other of the first audio and the second audio to the audio processing circuit.

In an embodiment of the present disclosure, the communication circuit may be configured to send and receive data through at least two frequency bands. The control circuit may control the communication circuit to send data associated with one of the first screen image and the second screen image to the external device through one of the at least two frequency bands, and receive data associated with the other of the first screen image and the second screen image through the other of the at least two frequency bands.

In an embodiment of the present disclosure, when a specified input is detected on the first display or the second display, the control circuit may output a menu for an image sharing function on the display where the input is detected.

In an embodiment of the present disclosure, when the image sharing function is initiated through the menu, the control circuit may control the communication circuit to send the external device data associated with one of the first screen image and the second screen image corresponding to the display where the input is detected.

In an embodiment of the present disclosure, to display a popup window for a specific event, the control circuit may control one of the first display and the second display corresponding to the other of the first screen image and the second screen image associated with the data destined for the external device to display the popup window.

In an embodiment of the present disclosure, to display a menu for controlling one of the first screen image and the second screen image associated with the data destined for the external device, the control circuit may control one of the first display and the second display corresponding to the other of the first screen image and the second screen image to display the menu.

In an embodiment of the present disclosure, when a specified input is detected on one of the first display and the second display, the control circuit may control the communication circuit to stop sending data associated with one of the first screen image and the second screen image to the external device and to send data associated with the other of the first screen image and the second screen image to the external device.

For example, a non-transitory computer readable medium, which stores a program to perform determining a foldable angle and received image from cameras installed on the foldable phone, and displaying the received image on the display 1 and/or the display 2 based upon the detected angle, may be provided. Also, a non-transitory computer readable medium, which stores a program to perform various methods to determine a screen activation region according to the above-described various exemplary embodiments of the present general inventive concept, may be provided. Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A foldable mobile phone, comprising:
   a first device configured to form a first portion of the foldable phone and has a first side and a second side, which is an opposite side of the first side;
   a second device configured to form a second portion of the foldable phone and has a first side and a second side, which is an opposite side of the first side;
wherein the first device and the second device can be folded into each other;
   a folding angle, formed by the first device and the second device, which varies if the folding mobile phone is opened from a folding state to an unfolding state;
   a first display is installed at the first side of the first device;
   a second display is installed at the second side of the first device and the second side of the second device;
   wherein the second display is made of foldable material,
   a first camera is placed at the first side of the first device;
   a second camera is placed at the first side of the second device;
   a third camera is placed at the second side of the second device;
   one or more sensors;
   one or more processors; and
   a memory storing one or more programs configured to be executed by the one or more processors, the one or more programs including instructions for controlling:
      to display a first preview image captured by the first camera on the first display if the foldable mobile phone is in the folding state;
      to display a second preview image captured by the second camera on the first display while turning off the second display if the foldable mobile phone is in the folding state;
      to display the second preview image captured by the second camera on both a first half portion of the second display corresponding to the first device and a second half portion of the second display corresponding to the second device if the phone is in the unfolding state; and
      to display a third preview image captured by the third camera on the first half portion of the second display corresponding to the first device and/or the second half portion of the second display corresponding to the second device if the phone is in the unfolding state,
      adjusting the second preview image captured by the second camera for displaying on the first half portion of the second display and/or the second half portion of the second display, while capturing an image through the second camera if the mobile phone is opened from the folding state to the unfolding state,
   adjusting the third preview image captured by the third camera for displaying on the first half portion of the second display and/or the second half portion of the second display, while capturing an image through the third camera, if the mobile phone is opened from the folding state to the unfolding state.

2. The foldable mobile phone of claim 1, wherein both the first camera and the third camera are display-through type cameras placed at the first display and the second portion of the second display, respectively, and both lenses of the first camera and the third camera are placed at the same distance from the top surface of the phone.

3. The foldable phone of claim 1, wherein, while the first preview image captured by the first camera is being displayed on the first display in the folding state, if the folding state is changed to the unfolding state, the third preview image captured by the third camera is automatically displayed on both a first half portion of second display corresponding to the first device and a second half portion of the second display corresponding to the second device.

4. The foldable phone of claim 1, wherein, while the second preview image captured by the second camera is being displayed on the first display in the folding state, if the folding state is changed into the unfolding state, the second preview image captured by the second camera is automatically displayed on both the first half portion of the second display corresponding to the first device and the second half portion of the second display corresponding to the second device.

5. The foldable phone of claim 1, wherein the foldable phone is in the folding state if the second side of the first device and the second side of the second device face each other and the folding angle between the first device and second device forms substantially 0 degree,
wherein the phone is in the unfolding state if the second side of the first device and the second side of the second device face the same direction parallelly and the folding angle between the first device and second device forms substantially 180 degrees.

6. A foldable mobile phone, comprising:
a first device configured to form a first portion of the phone and has a first side and a second side, which is an opposite side of the first side;
a second device configured to form a second portion of the phone and has a first side and a second side, which is an opposite side of the first side;
wherein the first device and the second device can be folded into each other,
a folding angle formed by the first device and the second device,
a first display is installed at the first side of the first device;
a second display is installed at the second side of the first device and the second side of the second device;
wherein the second display is made of foldable material,
a first camera is placed at the first side of the first device;
a second camera is placed at the first side of the second device;
a third camera is placed at the second side of the second device;
one or more processors; and
a memory storing one or more programs configured to be executed by the one or more processors, the one or more programs including instructions for controlling:
to display a first preview image captured by the first camera on the first display if the foldable mobile phone is in the folding state;
to display a second preview image captured by the second camera on the first display if the foldable mobile phone is in the folding state;
to display the second preview image captured by the second camera on both a first half portion of the second display corresponding to the first device and a second half portion of the second display corresponding to the second device if the foldable mobile phone is in the unfolding state; and
to display a third preview image captured by the third camera on both the first half portion of the second display corresponding to the first device and the half second portion of the second display corresponding to the second device while turning off the first display if the foldable mobile phone is in the unfolding state,
wherein, while the first preview image captured by the first camera is being displayed on the first display in the folding state, if the folding state is changed into the unfolding state, the third preview image captured by the third camera is displayed on both a first half portion of the second display corresponding to the first device and a second half portion of the second display corresponding to the second device,
wherein, while the second preview image captured by the second camera is being displayed on the first display in the folding state, if the folding state is changed into the unfolding state, the second preview image captured by the second camera is displayed on both the first half portion of second display corresponding to the first device and the second half portion of the second display corresponding to the second device.

7. The foldable mobile phone of claim 1, wherein both the first camera and the third camera are display-through cameras placed at the first display and the second portion of the second display, respectively, and a first lens of the first camera and a second lens of the third camera are placed at the same distance from the top surface of the foldable phone.

8. The foldable mobile phone of claim 6, wherein the phone is in the folding state if the second side of the first device and the second side of the second device face each other and the folding angle between the first device and second device forms substantially 0 degree,
wherein the phone is in the unfolding state if the folding angle between the first device and second device forms substantially 180 degrees.

9. The foldable mobile phone, as claimed in claim 1, wherein the folding state is determined by the one or more processors.

10. A method for operating a foldable mobile phone, which includes a first device and a second device, wherein the first device configured to form a first portion of the phone and has a first side and a second side, which is an opposite side of the first side, wherein the second device configured to form a second portion of the phone and has a first side and a second side, which is an opposite side of the first side, wherein the first device and the second device can be unfolded each other for changing the foldable mobile phone from a folding state into a unfolding state, a first display is installed at the first side of the first device, a second display is installed at the second side of the first device and the second side of the second device, wherein the second display is made of foldable material, a first camera is placed at the first side of the first device, a second camera is placed at the first side of the second device, a third camera is placed at the second side of the second device, the method comprising:
displaying a first preview image captured by the first camera on the first display if the foldable mobile phone is in the folding state;
displaying a second preview image captured by the second camera on the first display while turning off the second display if the foldable mobile phone is in the folding state;
displaying the second preview image captured by the second camera on a first portion of the second display corresponding to the first device and/or a second portion of the second display corresponding to the second device if changing the foldable mobile phone from the folding state into the unfolding state;

adjusting the second preview image captured by the second camera to be displayed on the first portion of the second display and/or the second portion of the second display if changing the folding state into the unfolding state; and adjusting a third preview image captured by the third camera on the first portion of the second display and/or the second portion of the second display if changing the folding state into the unfolding state.

11. The method for operating a foldable mobile phone, as claimed in claim 10, comprising: wherein both the first camera and the third camera are display-through type cameras placed at the first display and the second portion of the second display, respectively.

12. The method for operating a foldable mobile phone, as claimed in claim 10, further comprising: while capturing an image through the second camera, adjusting a size of the second preview captured by the second camera is to be displayed on one of the first half portion or the second half portions of the second display if the folding angle between the first device and second device reaches a predetermined value between 0 degree and 180 degrees.

13. The method for operating a foldable mobile phone, as claimed in claim 10, further comprising: while capturing an image through the third camera, if the folding angle between the first device and second device reaches a predetermined value between 0 degree and 180 degree, a size of the third preview captured by the third camera is adjusted to be displayed on one of the first or second half portions of the second display.

14. The method for operating a foldable mobile phone, as claimed in claim 10, further comprising: wherein the foldable phone is in the folding state if the second side of the first device and the second side of the second device face each other and the folding angle between the first device and second device forms substantially 0 degree, wherein the phone is in the unfolding state when the second side of the first device and the second side of the second device face the same direction parallelly and the folding angle between the first device and second device forms substantially 180 degrees.

15. The method for operating a foldable mobile phone, as claimed in claim 10, further comprising: deactivating the second display while displaying the first preview image captured by the first camera on the first display if the foldable mobile phone is in the folding state.

16. The method for operating a folding mobile phone, as claimed in claim 10, wherein the second display is provided a non-separated single body through the second side of the first device and the second side of the second device.

17. The method for operating a foldable mobile phone, as claimed in claim 10, further comprising: adjusting a size of the second preview image if the foldable phone is opened from the folding state to unfolding state so that the phone folding angle is changed from a first folding angle, substantially 0 degree into a second folding angle, which is larger than the first folding angle.

18. The method for operating a foldable mobile phone, as claimed in claim 17, further comprising: adjusting a size of the third preview image if the phone folding angle is a third folding angle, which is larger than the second folding angle.

19. The method for operating a foldable mobile phone, as claimed in claim 10, wherein the folding state is determined by the one or more processors.

\* \* \* \* \*